(12) United States Patent
Fuji et al.

(10) Patent No.: US 10,473,685 B2
(45) Date of Patent: Nov. 12, 2019

(54) SENSOR AND SENSOR PACKAGE

(71) Applicant: KABUSHIKI KAISHA TOSHIBA, Tokyo (JP)

(72) Inventors: Yoshihiko Fuji, Kawasaki Kanagawa (JP); Michiko Hara, Yokohama Kanagawa (JP); Kei Masunishi, Kawasaki Kanagawa (JP); Yoshihiro Higashi, Komatsu Ishikawa (JP); Shiori Kaji, Kawasaki Kanagawa (JP); Akiko Yuzawa, Kawasaki Kanagawa (JP); Tomohiko Nagata, Yokohama Kanagawa (JP); Kenji Otsu, Yokohama Kanagawa (JP); Kazuaki Okamoto, Yokohama Kanagawa (JP); Shotaro Baba, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 367 days.

(21) Appl. No.: 15/445,748

(22) Filed: Feb. 28, 2017

(65) Prior Publication Data
US 2018/0080953 A1 Mar. 22, 2018

(30) Foreign Application Priority Data
Sep. 21, 2016 (JP) ................. 2016-184197

(51) Int. Cl.
*G01C 19/5607* (2012.01)
*G01P 15/09* (2006.01)
(Continued)

(52) U.S. Cl.
CPC .......... *G01P 15/09* (2013.01); *G01C 19/5607* (2013.01); *G01P 3/44* (2013.01); *G01P 15/105* (2013.01)

(58) Field of Classification Search
CPC ........ G01P 3/44; G01P 15/09; G01P 15/0922; G01P 15/097; G01P 15/105; G01C 19/5607
See application file for complete search history.

(56) References Cited

U.S. PATENT DOCUMENTS

| 6,065,339 A | 5/2000 | Takeuchi et al. |
| 2005/0029606 A1 | 2/2005 | Nakanishi et al. |

(Continued)

FOREIGN PATENT DOCUMENTS

| JP | 07-301536 | 11/1995 |
| JP | 2001-4380 A | 1/2001 |

(Continued)

OTHER PUBLICATIONS

D. Meyners et al. "Pressure Sensor Based on Magnetic Tunnel Junctions", Journal of Applied Physics, vol. 105, 07C914, (2009) pp. 1-3.

(Continued)

*Primary Examiner* — Herbert K Roberts
(74) *Attorney, Agent, or Firm* — Finnegan, Henderson, Farabow, Garrett & Dunner, L.L.P.

(57) ABSTRACT

According to one embodiment, a sensor includes a first support portion, a first movable portion, a first piezoelectric element, and a first magnetic element. The first movable portion extends in a first extension direction and is connected to the first support portion. The first piezoelectric element is fixed to the first movable portion. The first piezoelectric element includes a first electrode, a second electrode provided between the first electrode and the first movable portion, and a first piezoelectric layer provided between the first electrode and the second electrode. The first magnetic element is fixed to the first movable portion. The first magnetic element includes a first magnetic layer, a second magnetic layer, and a first intermediate layer pro- (Continued)

vided between the first magnetic layer and the second magnetic layer.

11 Claims, 55 Drawing Sheets

(51) Int. Cl.
  *G01P 15/105* (2006.01)
  *G01P 3/44* (2006.01)

(56) References Cited

U.S. PATENT DOCUMENTS

| | | |
|---|---|---|
| 2011/0295128 A1 | 12/2011 | Yuasa et al. |
| 2013/0170669 A1 | 7/2013 | Fukuzawa et al. |
| 2013/0255393 A1 | 10/2013 | Fukuzawa et al. |
| 2015/0082886 A1 | 3/2015 | Fukuzawa et al. |
| 2015/0082901 A1 | 3/2015 | Fuji et al. |
| 2016/0003697 A1 | 1/2016 | Okamoto et al. |
| 2019/0072387 A1* | 3/2019 | Takayama .......... G01C 19/5628 |

FOREIGN PATENT DOCUMENTS

| | | |
|---|---|---|
| JP | 2001-066141 | 3/2001 |
| JP | 2002-148132 | 5/2002 |
| JP | 2002-257548 A | 9/2002 |
| JP | 2009-58462 A | 3/2009 |
| JP | 2011-244938 | 12/2011 |
| JP | 2013-072712 | 4/2013 |
| JP | 2013-178117 A | 9/2013 |
| JP | 2013-205403 | 10/2013 |
| JP | 2015-059925 | 3/2015 |
| JP | 2015-061070 | 3/2015 |
| JP | 2016-14581 A | 1/2016 |
| JP | 2016-17768 A | 2/2016 |
| WO | WO 97/37195 A1 | 8/1998 |
| WO | WO 2004/015370 | 8/2003 |

OTHER PUBLICATIONS

M. Londorf et al, "Highly Sensitive Strain Sensors Based on Magnetic Tunneling Junctions", Applied Physics Letters, vol. 181, 313 (2002), pp. 313-315.

* cited by examiner

FIG. 5
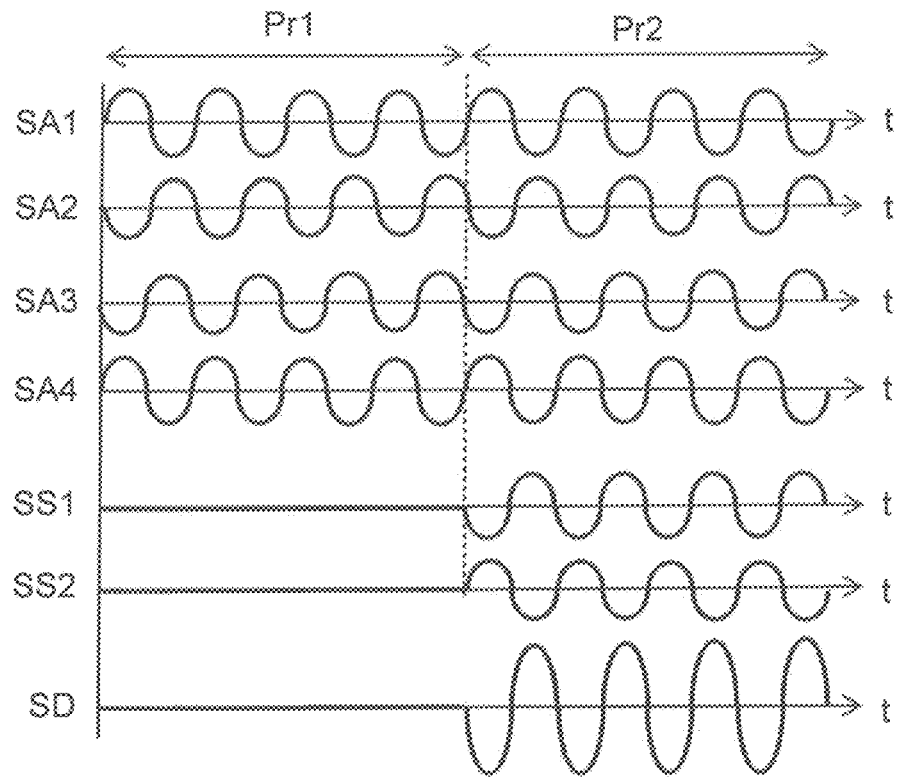
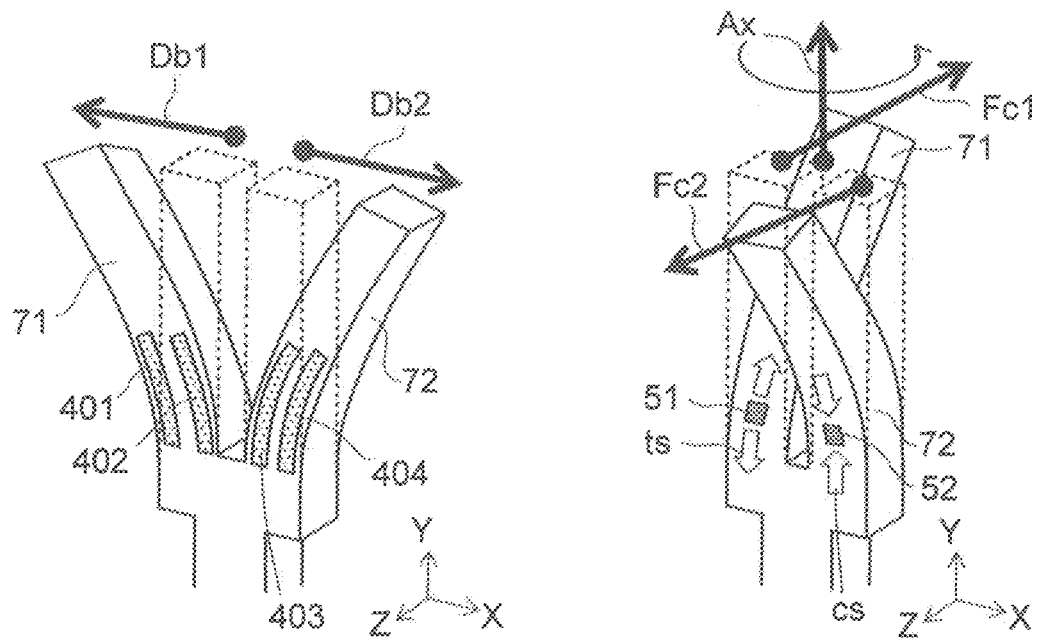
FIG. 6A            FIG. 6B

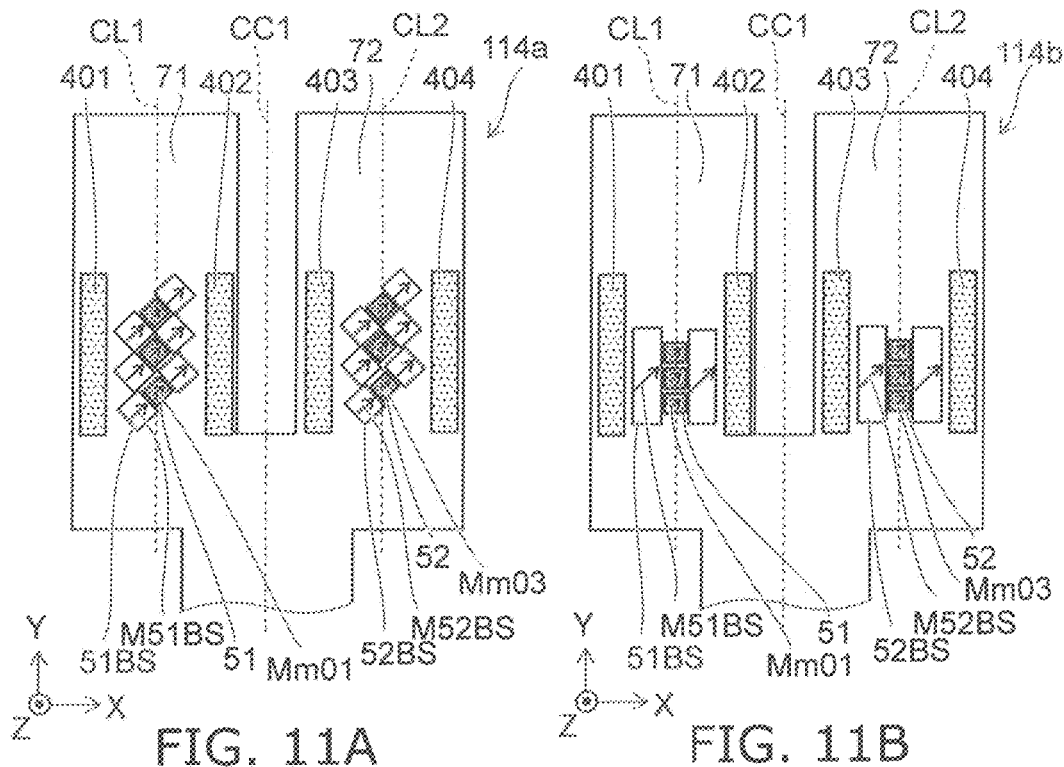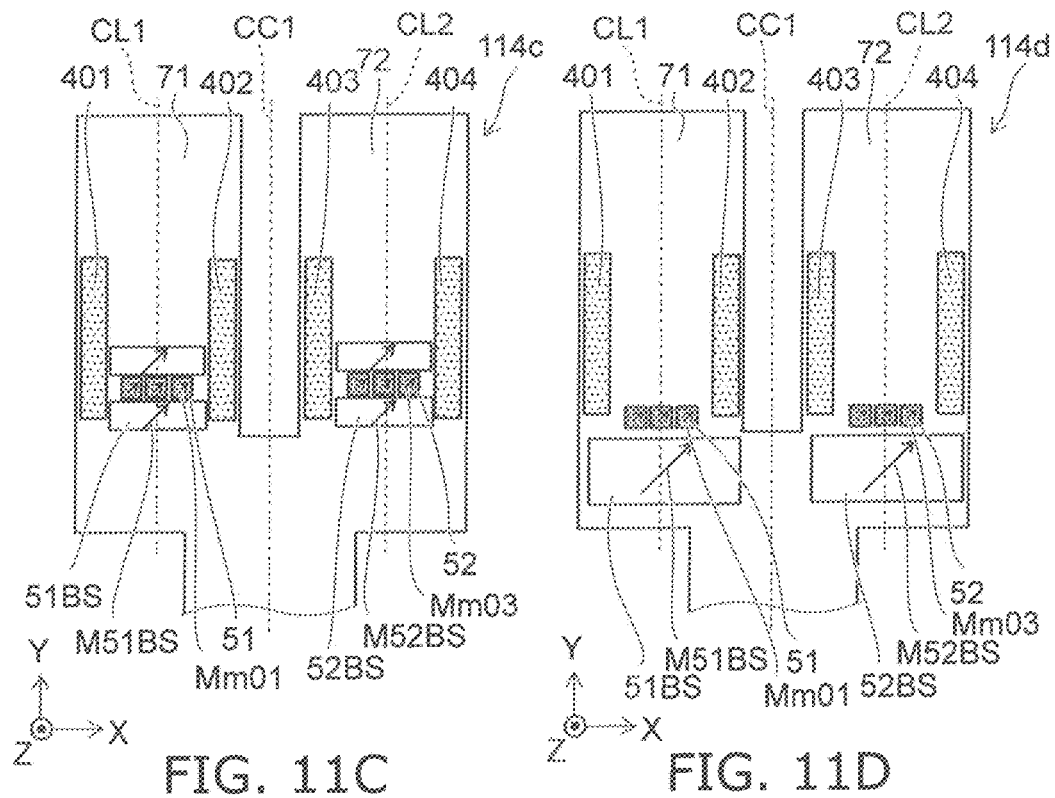

FIG. 27A
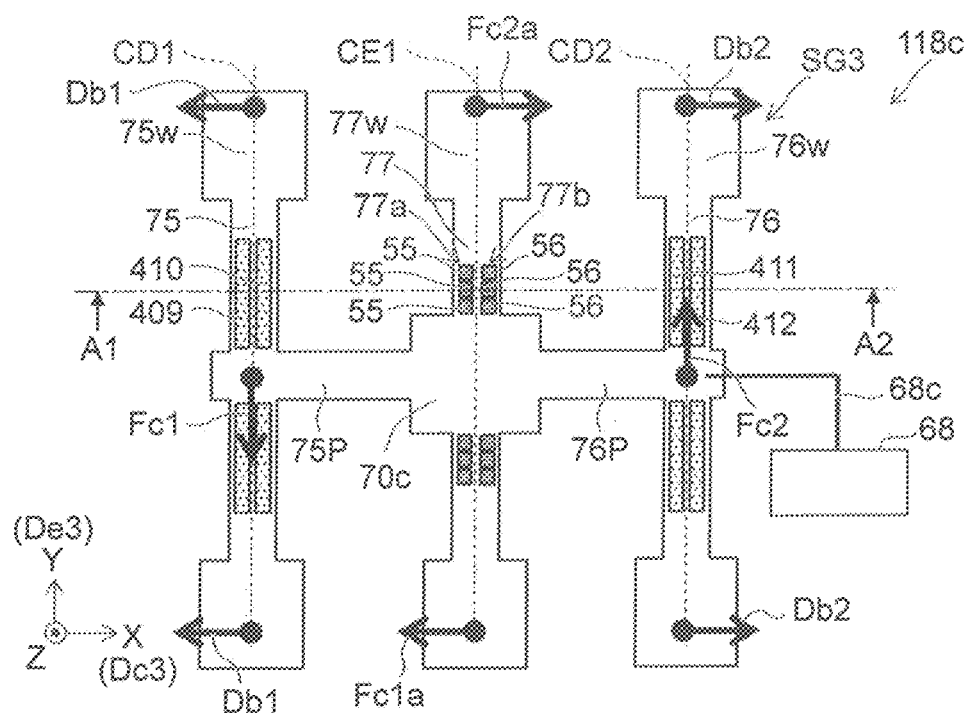
FIG. 27B
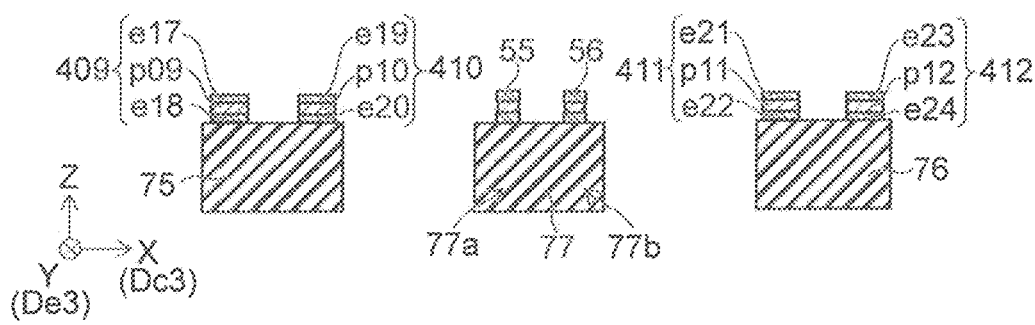
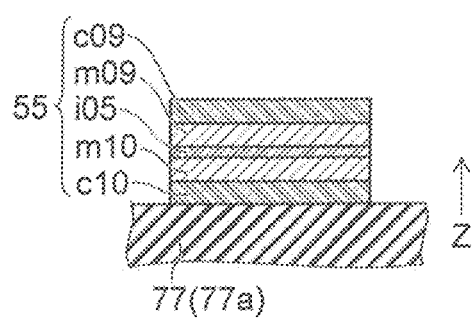
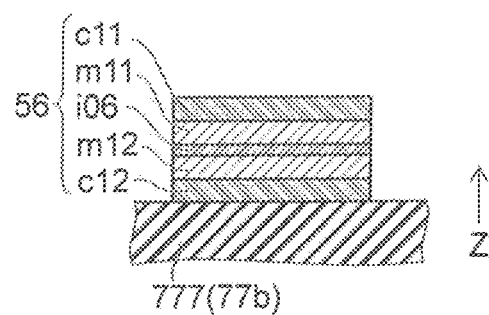
FIG. 27C          FIG. 27D

SENSOR AND SENSOR PACKAGE

CROSS-REFERENCE TO RELATED APPLICATIONS

This application is based upon and claims the benefit of priority from Japanese Patent Application No. 2016-184197, filed on Sep. 21, 2016; the entire contents of which are incorporated herein by reference.

FIELD

Embodiments described herein relate generally to a sensor and a sensor package.

BACKGROUND

There is a sensor that senses an angular velocity, etc. It is desirable to increase the sensitivity of such a sensor.

BRIEF DESCRIPTION OF THE DRAWINGS

FIG. 5 is a schematic view illustrating signals of the sensor according to the first embodiment;

FIG. 6A and FIG. 6B are schematic views illustrating operations of the sensor according to the first embodiment;

FIG. 11A to FIG. 11D are schematic plan views illustrating other sensors according to the first embodiment;

FIG. 27A to FIG. 27D are schematic views illustrating another sensor according to the first embodiment;

DETAILED DESCRIPTION

Figure 1A:
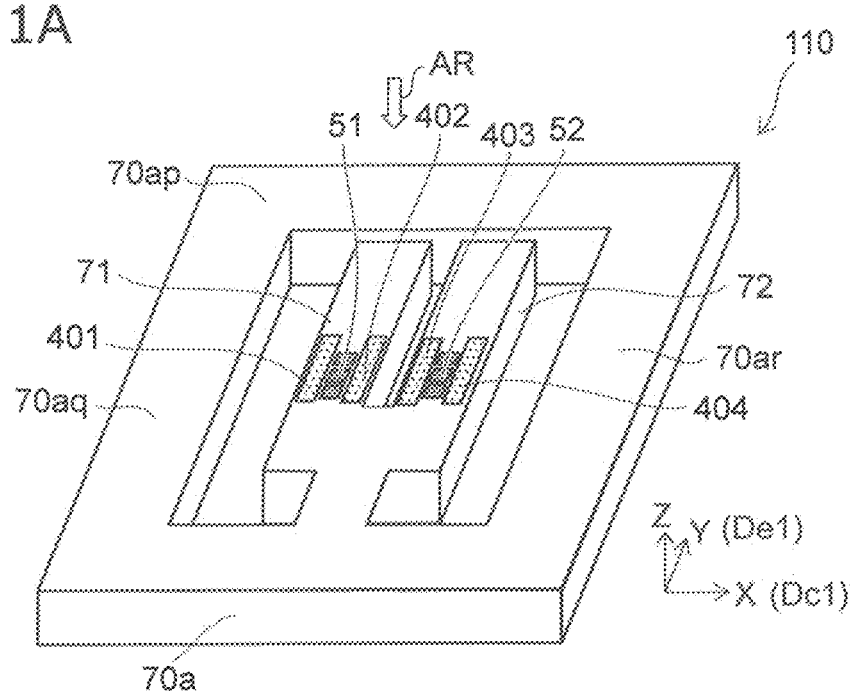
FIG. 1A and FIG. 1B are schematic views illustrating a sensor according to a first embodiment.

According to one embodiment, a sensor includes a first support portion, a first movable portion, a first piezoelectric element, and a first magnetic element. The first movable portion is connected to the first support portion and extends in a first extension direction. The first piezoelectric element is fixed to the first movable portion. The first piezoelectric element includes a first electrode, a second electrode provided between the first electrode and the first movable portion, and a first piezoelectric layer provided between the first electrode and the second electrode. The first magnetic element is fixed to the first movable portion. The first magnetic element includes a first magnetic layer, a second magnetic layer, and a first intermediate layer provided between the first magnetic layer and the second magnetic layer.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1A, FIG. 1B, FIG. 2A to FIG. 2E, and FIG. 3A to FIG. 3D are schematic views illustrating a sensor according to a first embodiment.

Figure 1B:
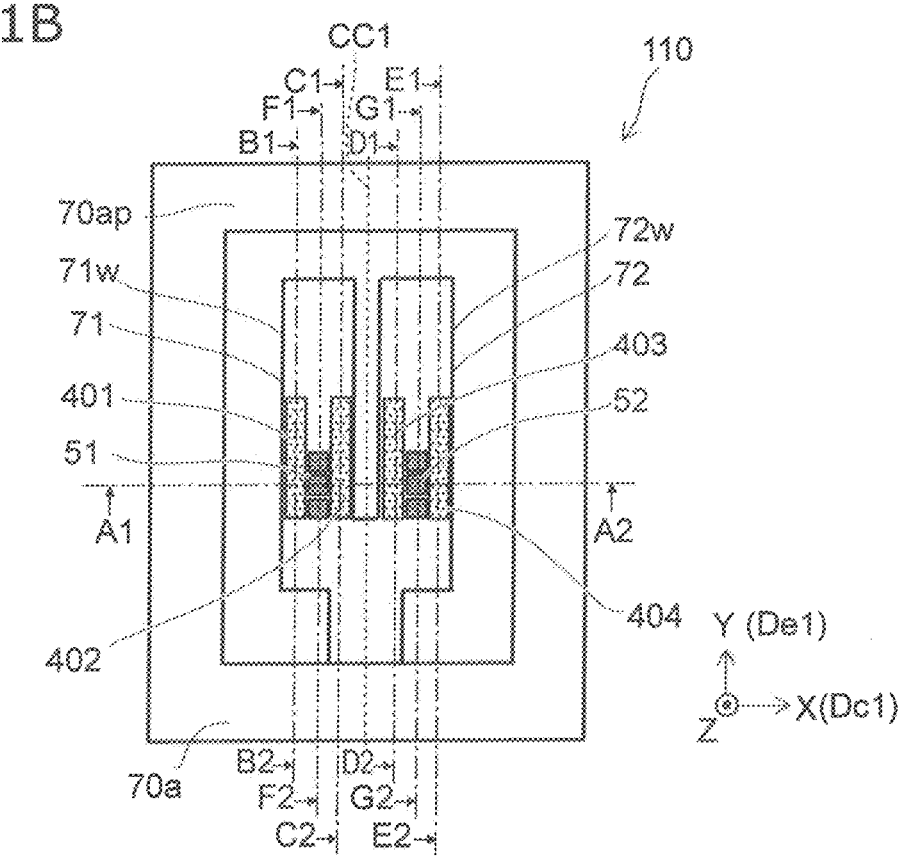
Figure 2A:
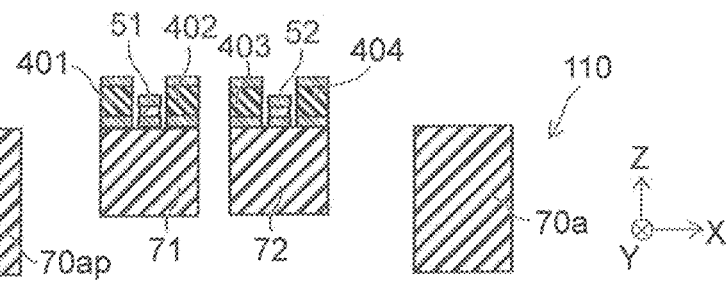
FIG. 2A to FIG. 2E are schematic views illustrating the sensor according to the first embodiment.

FIG. 1A is a perspective view. FIG. 1B is a plan view as viewed along arrow AR of FIG. 1A. FIG. 2A to FIG. 2E are cross-sectional views corresponding respectively to line A1-A2, line B1-B2, line C1-C2, line D1-D2, and line E1-E2 of FIG. 1B. FIG. 3A and FIG. 3B are cross-sectional views corresponding respectively to line F1-F2 and line G1-G2 of FIG. 1B. FIG. 3C and FIG. 3D are cross-sectional views of portions of the sensor.

As shown in FIG. 1A, a sensor 110 according to the embodiment includes a first support portion 70a, a first movable portion 71, a first piezoelectric element 401, and a first magnetic element 51. In the example, a second piezoelectric element 402 is further provided.

The first movable portion 71 is connected to the first support portion 70a and extends in a first extension direction De1. The first support portion 70a supports the first movable portion 71.

The first extension direction De1 is taken as a Y-axis direction. One direction perpendicular to the Y-axis direction is taken as an X-axis direction. A direction perpendicular to the Y-axis direction and the X-axis direction is taken as a Z-axis direction.

The first piezoelectric element 401 is fixed to the first movable portion 71.

Figure 2B:
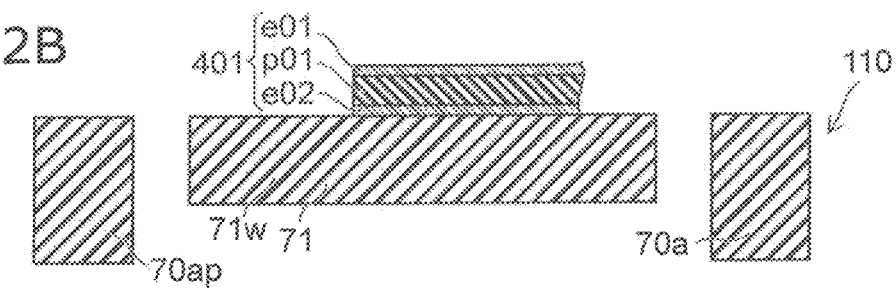
Figure 3A:
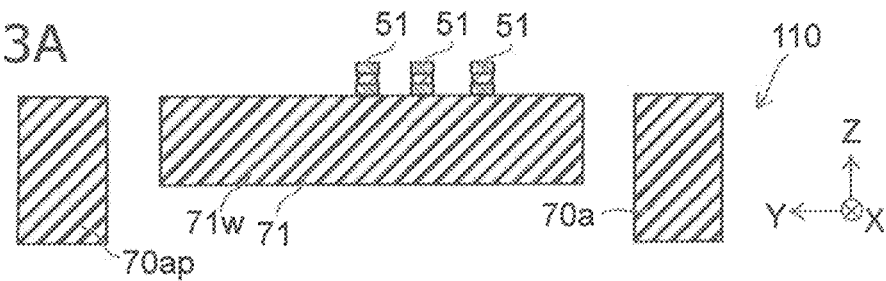
FIG. 3A to FIG. 3D are schematic views illustrating the sensor according to the first embodiment.
Figure 3B:
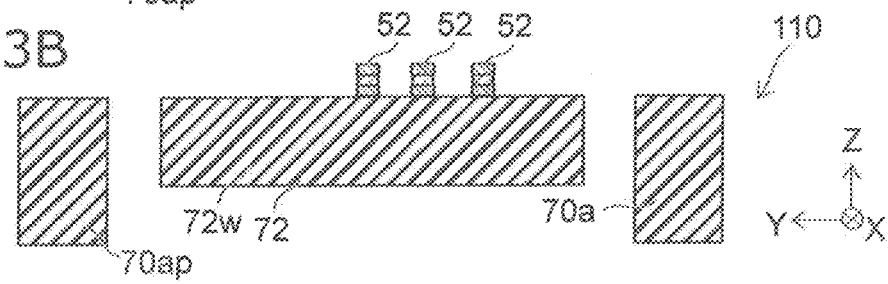
Figure 3C:
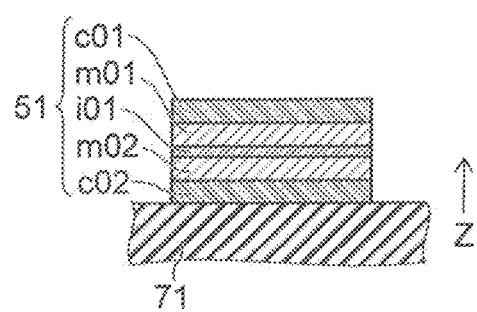
Figure 3D:
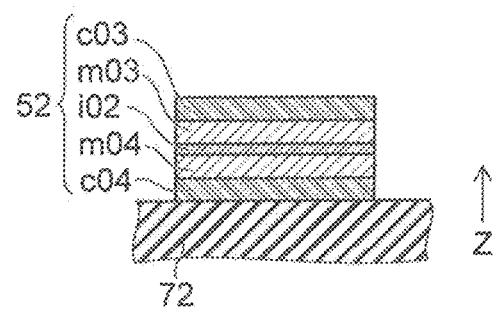

As shown in FIG. 2B, the first piezoelectric element 401 includes a first electrode e01, a second electrode e02, and a first piezoelectric layer p01. The second electrode e02 is provided between the first electrode e01 and the first movable portion 71. The first piezoelectric layer p01 is provided between the first electrode e01 and the second electrode e02.

As shown in FIG. 1A and FIG. 1B, the first magnetic element 51 is fixed to the first movable portion 71. For example, the direction connecting the first magnetic element 51 and the first piezoelectric element 401 is aligned with a first crossing direction Dc1. The first crossing direction Dc1 crosses the first extension direction De1. In the example, the first crossing direction Dc1 is the X-axis direction.

As shown in FIG. 1A and FIG. 1B, the second piezoelectric element 402 is separated from the first piezoelectric element 401 in the first crossing direction Dc1.

The second piezoelectric element 402 is fixed to the first movable portion 71.

Figure 2C:
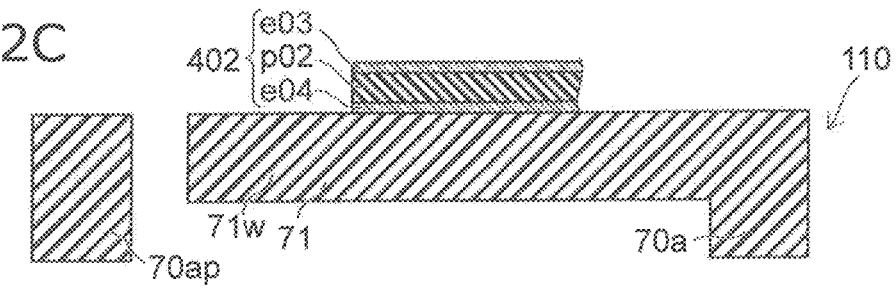

As shown in FIG. 2C, the second piezoelectric element 402 includes a third electrode e03, a fourth electrode e04, and a second piezoelectric layer p02. The fourth electrode e04 is provided between the third electrode e03 and the first movable portion 71. The second piezoelectric layer p02 is provided between the third electrode e03 and the fourth electrode e04.

As shown in FIG. 1B, etc., the first movable portion 71 may include a portion (a first end portion 71w) where the first piezoelectric element 401, the second piezoelectric element 402, and the first magnetic element 51 are not provided.

As shown in FIG. 1A, structure bodies 70ap, 70aq, and 70ar are provided in the example. For example, the first support portion 70a and the structure bodies 70ap, 70aq, and 70ar surround the movable portions in the X-Y plane. The structure bodies 70ap, 70aq, and 70ar are continuous with the first support portion 70a. By providing these structure bodies, for example, the mechanical strength of the first support portion 70a is increased. For example, deformation of the first support portion 70a is suppressed. The structure bodies 70ap, 70aq, and 70ar may be omitted.

As shown in FIG. 1A and FIG. 1B, the first magnetic element 51 is provided between the first piezoelectric element 401 and the second piezoelectric element 402 in the first crossing direction Dc1.

As shown in FIG. 3C, the first magnetic element 51 includes a first magnetic layer m01, a second magnetic layer m02, and a first intermediate layer i01. The first intermediate layer i01 is provided between the first magnetic layer m01 and the second magnetic layer m02. The first intermediate layer i01 is, for example, a nonmagnetic layer.

The direction connecting the first magnetic layer m01 and the second magnetic layer m02 is aligned with the Z-axis direction. In the example, the second magnetic layer m02 is provided between the first magnetic layer m01 and the first movable portion 71. In the embodiment, the first magnetic layer m01 may be provided between the second magnetic layer m02 and the first movable portion 71.

For example, as described below, a voltage is applied between the first electrode e01 and the second electrode e02 and between the third electrode e03 and the fourth electrode e04. Thereby, the first movable portion 71 deforms. The deformation is based on the piezoelectric effect. For example, in the case where the voltage recited above is alternating current, the first movable portion 71 vibrates. The vibration includes, for example, an X-axis direction component. On the other hand, when an external force (e.g., an angular velocity or an angular acceleration) is applied to such a first movable portion 71, the first movable portion 71 deforms along, for example, the Z-axis direction. The deformation due to the external force is based on, for example, the Coriolis force. The resistance of the first magnetic element 51 changes according to the deformation due to the external force. The external force (e.g., the angular velocity or the angular acceleration) that is applied can be sensed by sensing a value (at least one of a resistance, a voltage, or a current) corresponding to the change of the resistance.

As shown in FIG. 3C, the first magnetic element 51 includes a first conductive layer c01 and a second conductive layer c02. The first magnetic layer m01, the second magnetic layer m02, and the first intermediate layer 101 are provided between the first conductive layer c01 and the second conductive layer c02. For example, the first conductive layer c01 is electrically connected to the first magnetic layer m01. For example, the second conductive layer c02 is electrically connected to the second magnetic layer m02. For example, the electrical resistance recited above corresponds to the electrical resistance between the first magnetic layer m01 and the second magnetic layer m02. The electrical resistance recited above may correspond to the electrical resistance between the first conductive layer c01 and the second conductive layer c02.

For example, strain is generated in the first magnetic element 51 according to the deformation due to the external force. The strain is due to the stress. When the strain is generated, for example, the direction of at least one of the magnetization of the first magnetic layer m01 or the magnetization of the second magnetic layer m02 changes. This change of the direction is based on, for example, the inverse magnetostrictive effect. As a result, the angle changes between these magnetizations. The electrical resistance changes according to the change of the angle. The change of the electrical resistance is based on the magnetoresistance effect. Thus, in the sensor 110, the electrical resistance of the first magnetic element 51 changes according to the external force.

In the sensor 110 according to the embodiment as recited above, the driving to deform the first movable portion 71 is performed by the first piezoelectric element 401 and the second piezoelectric element 402. On the other hand, the sensing of the external force is performed by the first magnetic element 51. The precision of the sensing is high. Thereby, a sensor can be provided in which the sensitivity can be increased.

In the embodiment, the driving of the first movable portion 71 is implemented based on the piezoelectric effect due to the first piezoelectric element 401 and the second piezoelectric element 402. On the other hand, the sensing of the external force is implemented based on an effect (e.g., the inverse magnetostrictive effect and the magnetoresistance effect) of a magnetic body. The driving and the sensing are separated by using two different types of effects. For example, appropriate conditions for the driving can be employed. Also, appropriate conditions for the sensing can be employed. Thereby, high sensitivity is obtained.

In the example as shown in FIG. 1B, the length in the first extension direction De1 (the Y-axis direction) of the first piezoelectric element 401 is longer than the length in the first extension direction De1 of the first magnetic element 51. The length in the first extension direction De1 of the second piezoelectric element 402 is longer than the length in the first extension direction De1 of the first magnetic element 51. For example, the sizes of the piezoelectric elements are larger than the size of the first magnetic element 51. By using the piezoelectric elements having large sizes, the first movable portion 71 efficiently can be caused to have a large deformation. Thereby, the deformation of the first movable portion 71 occurring when the external force is applied also can be large. Because the deformation is large, the strain occurring in the first magnetic element 51 also is large. Thereby, sensing having even higher sensitivity is possible.

A reference example may be considered in which a sensing element (a piezoelectric sensing element) based on the piezoelectric effect is provided between the first piezoelectric element 401 and the second piezoelectric element 402. The sensing sensitivity of a piezoelectric sensing element is lower than the sensing sensitivity of a magnetic element. In the case where high sensing sensitivity is to be obtained in the piezoelectric sensing element, it may be considered to increase the size of the piezoelectric sensing element. However, in such a case, the first piezoelectric element 401 and the second piezoelectric element 402 not only cause the movable portion to deform but also cause the piezoelectric sensing element having the large size to deform. Accordingly, the deformation of the movable portion due to the first piezoelectric element 401 and the second piezoelectric element 402 is insufficient.

Conversely, in the embodiment, the sensing of the external force is performed by the magnetic element. In the magnetic element, highly-sensitive sensing is possible even for a small size. Further, by setting the size of the first magnetic element 51 to be small, the movable portion can be deformed sufficiently by the first piezoelectric element 401 and the second piezoelectric element 402. Thereby, highly-sensitive sensing is possible.

For the magnetic element, the sensing of the strain is possible using a small size compared to the piezoelectric sensing element. For example, it is easy to provide the magnetic element at a position in the movable portion where the strain concentrates. The position where the strain concentrates is, for example, at the vicinity of the support portion. By providing the magnetic element at the position where the strain concentrates, for example, the strain can be sensed efficiently. For example, the external force can be sensed with high sensitivity.

As shown in FIG. 1A and FIG. 1B, multiple first magnetic elements 51 are provided in the example. For example, at least two of the multiple first magnetic elements 51 may be connected in series. By connecting in series, the S/N ratio can be increased. The number of magnetic elements of the multiple magnetic elements connected in series is "N." In such a case, the electrical signal that is obtained is N times that of the case where the number of magnetic elements is 1. The noise is $N^{1/2}$ times. The SN ratio (signal-noise ratio (SNR)) is $N^{1/2}$ times. The SN ratio can be improved by increasing the number of magnetic elements connected in series. For example, highly-sensitive sensing is possible by setting the bias voltage to an appropriate value.

As shown in FIG. 2A, for example, the thickness (the length in the Z-axis direction) of the first magnetic element 51 is thinner than the thickness (the length in the Z-axis direction) of the first piezoelectric element 401. The thickness of the first magnetic element 51 is thinner than the thickness (the length in the Z-axis direction) of the second piezoelectric element 402. Because the first magnetic element 51 is thin, the deformation of the first movable portion 71 is easy. For example, by using a thin first magnetic element 51, the deformation of the first movable portion 71 is easy compared to a reference example in which a thick piezoelectric sensing element is used. Thereby, high sensitivity is obtained easily.

In the example as shown in FIG. 1B and FIG. 3A, the multiple first magnetic elements 51 are arranged along the Y-axis direction (the first extension direction De1). As described below, various modifications of the arrangement of the multiple first magnetic elements 51 are possible.

In the example as shown in FIG. 1A and FIG. 1B, the sensor 110 further includes a second movable portion 72, a third piezoelectric element 403, a fourth piezoelectric element 404, and a second magnetic element 52.

The second movable portion 72 is connected to the first support portion 70a. The second movable portion 72 extends in the first extension direction De1 (e.g., the Y-axis direction). The first support portion 70a supports the second movable portion 72.

The third piezoelectric element 403 is fixed to the second movable portion 72.

Figure 2D:
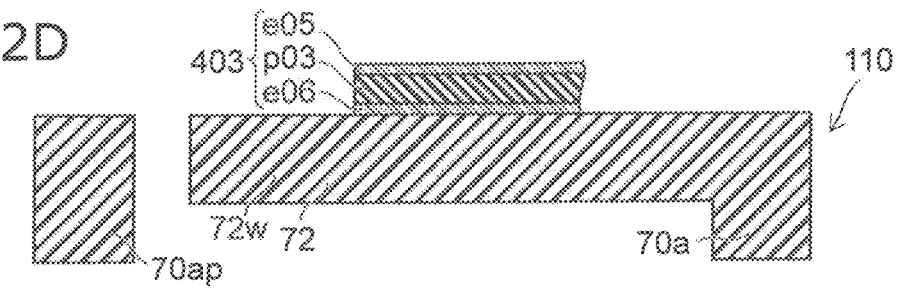

As shown in FIG. 2D, the third piezoelectric element 403 includes a fifth electrode e05, a sixth electrode e06, and a third piezoelectric layer p03. The sixth electrode e06 is provided between the fifth electrode e05 and the second movable portion 72. The third piezoelectric layer p03 is provided between the fifth electrode e05 and the sixth electrode e06.

The fourth piezoelectric element 404 is separated from the third piezoelectric element 403 in the first crossing direction Dc1. The fourth piezoelectric element 404 is fixed to the second movable portion 72.

Figure 2E:
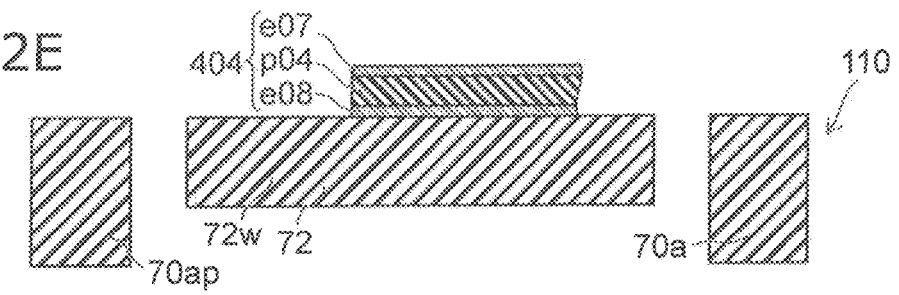

As shown in FIG. 2E, the fourth piezoelectric element 404 includes a seventh electrode e07, an eighth electrode e08, and a fourth piezoelectric layer p04. The eighth electrode e08 is provided between the seventh electrode e07 and the second movable portion 72. The fourth piezoelectric layer p04 is provided between the seventh electrode e07 and the eighth electrode e08.

As shown in FIG. 1A and FIG. 1B, the second magnetic element 52 is provided between the third piezoelectric element 403 and the fourth piezoelectric element 404 in the first crossing direction Dc1. The second magnetic element 52 is fixed to the second movable portion 72.

As shown in FIG. 3D, the second magnetic element 52 includes a third magnetic layer m03, a fourth magnetic layer m04, and a second intermediate layer i02. The second intermediate layer i02 is provided between the third magnetic layer m03 and the fourth magnetic layer m04. The second intermediate layer i02 is, for example, a nonmagnetic layer.

The direction connecting the third magnetic layer m03 and the fourth magnetic layer m04 is aligned with the Z-axis direction. In the example, the fourth magnetic layer m04 is provided between the third magnetic layer m03 and the second movable portion 72. In the embodiment, the third magnetic layer m03 may be provided between the fourth magnetic layer m04 and the second movable portion 72.

The external force can be sensed with high sensitivity also at the portion including the second movable portion 72, the third piezoelectric element 403, the fourth piezoelectric element 404, and the second magnetic element 52.

As shown in FIG. 1B, etc., the second movable portion 72 may include a portion (a second end portion 72w) where the third piezoelectric element 403, the fourth piezoelectric element 404, and the second magnetic element 52 are not provided.

As shown in FIG. 1A and FIG. 1B, multiple second magnetic elements 52 are provided in the example. For example, at least two of the multiple second magnetic elements 52 may be connected in series. The S/N ratio can be increased by connecting in series. Highly-sensitive sensing is possible by setting the bias voltage to an appropriate value.

In the example as shown in FIG. 1B and FIG. 3B, the multiple second magnetic elements 52 are arranged along the Y-axis direction (the first extension direction De1).

As shown in FIG. 3D, the second magnetic element 52 includes a third conductive layer c03 and a fourth conductive layer c04. The third magnetic layer m03, the fourth magnetic layer m04, and the second intermediate layer i02 are provided between the third conductive layer c03 and the fourth conductive layer c04.

As shown in FIG. 1B, for example, the length in the first extension direction De1 of the third piezoelectric element 403 is longer than the length in the first extension direction De1 of the second magnetic element 52. The length in the first extension direction De1 of the fourth piezoelectric element 404 is longer than the length in the first extension direction De1 of the second magnetic element 52. Thereby, the deformation of the second movable portion 72 can be large; and the sensing sensitivity using second magnetic element 52 can be high.

Figure 4:
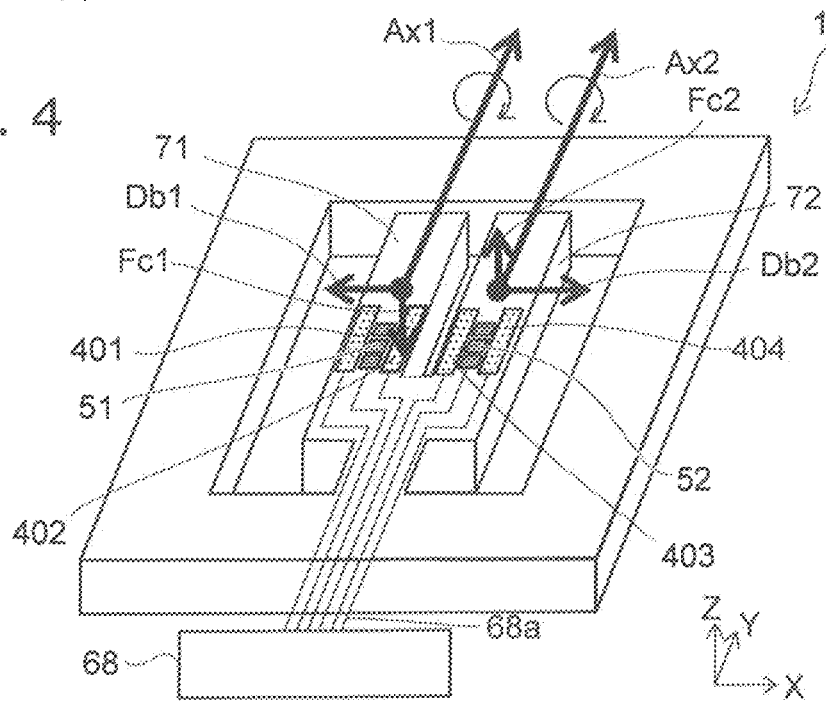
FIG. 4 is a schematic perspective view illustrating the sensor according to the first embodiment.

FIG. 4 is a schematic perspective view illustrating the sensor according to the first embodiment.

As shown in FIG. 4, the sensor 110 may further include a controller 68. The controller 68 is electrically connected to the first to fourth piezoelectric elements 401 to 404, the first magnetic element 51, and the second magnetic element 52. These connections are performed by a first interconnect group 68a.

For example, the controller 68 is electrically connected to the first to eighth electrodes e01 to e08. For example, the controller 68 is electrically connected to the first to fourth magnetic layers m01 to m04. For example, the controller 68 is electrically connected to the first to fourth conductive layers c01 to c04.

Voltages that are described below are applied to the first to eighth electrodes e01 to e05. Thereby, a first drive force Db1 is applied to the first movable portion 71. A second drive force Db2 is applied to the second movable portion 72. These drive forces have, for example, X-axis direction components. The directions of these drive forces are, for example, mutually-reversed. At this time, when a rotational force (an external force) that has a first rotation axis Ax1 and a second rotation axis Ax2 as axes is applied, a first force Fc1 is applied to the first movable portion 71; and a second force Fc2 is applied to the second movable portion 72. For example, the directions of these forces are aligned with the Z-axis direction. The directions of these forces are mutually-reversed. For example, these forces are based on the Coriolis force. Due to these forces, the movable portions deform; and a change of the electrical resistance occurs for the magnetic elements. For example, a value corresponding to the change of the electrical resistance is sensed by the controller 68.

An example of operations of the sensor 110 will now be described.

FIG. 5 is a schematic view illustrating signals of the sensor according to the first embodiment.

FIG. 5 illustrates signals applied to the first to fourth piezoelectric elements 401 to 404 and sense signals generated by the first magnetic element 51 and the second magnetic element 52. The horizontal axis is time t. The vertical axis is the strength of the signal.

As shown in FIG. 5, first to fourth signals SA1 to SA4 are applied respectively to the first to fourth piezoelectric elements 401 to 404. In the example, the first signal SA1 is displayed as a first potential of the first electrode e01 referenced to a second potential of the second electrode e02. The second signal SA2 is displayed as a third potential of the third electrode e03 referenced to a fourth potential of the fourth electrode e04. The third signal SA3 is displayed as a fifth potential of the fifth electrode e05 referenced to a sixth potential of the sixth electrode e06. The fourth signal SA4 is displayed as a seventh potential of the seventh electrode e07 referenced to an eighth potential of the eighth electrode e08.

In the example as shown in FIG. 5, the polarity of the first signal SA1 (the polarity of the first potential of the first electrode e01 referenced to the second potential of the second electrode e02) is the reverse of the polarity of the second signal SA2 (the polarity of the third potential of the third electrode e03 referenced to the fourth potential of the fourth electrode e04). The polarity of the fourth signal SA4 is the reverse of the polarity of the third signal SA3. The polarity of the fourth signal SA4 is the same as the polarity of the first signal SA1. The polarity of the third signal SA3 is the same as the polarity of the second signal SA2.

For example, such signals are supplied by the controller 68. For example, the controller 68 sets the polarity of the first signal SA1 to be the reverse of the polarity of the second signal SA2.

As shown in FIG. 5, signals substantially are not generated for a first sense signal SS1 and a second sense signal SS2 in a first interval Pr1 in which an external force is not applied.

In a second interval Pr2 in which an external force is applied, signals that correspond to the external force are generated for these sense signals. The polarity of the first sense signal SS1 sensed by the first magnetic element 51 is the reverse of the polarity of the second sense signal SS2 sensed by the second magnetic element 52.

For example, in a differential signal SD that corresponds to the difference between the first sense signal SS1 and the second sense signal SS2, an amplitude that is wider than the amplitudes of these sense signals is obtained. For example, the first sense signal SS1 and the second sense signal SS2 are input to a differential circuit. The output of the differential circuit corresponds to the differential signal SD.

The external force (the angular velocity, the angular acceleration, or the like) that is applied to the sensor 110 can be sensed by using the differential signal SD. The effects of a disturbance on the acceleration can be reduced by using the differential signal SD. For example, the effects of a disturbance on the acceleration substantially can be canceled by using the differential signal SD. The external force (the angular velocity, the angular acceleration, or the like) that is to be sensed can be sensed efficiently.

FIG. 6A and FIG. 6B are schematic views illustrating operations of the sensor according to the first embodiment.

FIG. 6A corresponds to the state in which an external force is not applied to the sensor 110, and voltages are applied to the piezoelectric elements. FIG. 6B corresponds to the state in which an external force is applied to the sensor 110.

As shown in FIG. 6A, the first to fourth signals SA1 to SA4 illustrated in FIG. 5 are applied respectively to the first to fourth piezoelectric elements 401 to 404. Thereby, the first drive force Db1 is applied to the first movable portion 71. The second drive force Db2 is applied to the second movable portion 72. For example, these drive forces are aligned with the X-axis direction. For example, the directions of these drive forces are mutually-reversed.

As illustrated in FIG. 5, the first to fourth signals SA1 to SA4 are alternating current. The directions of the drive forces change temporally. For example, vibrations are generated along the X-axis direction in the first movable portion 71 and the second movable portion 72.

As shown in FIG. SB, when a rotational force (an external force) having rotation axis Ax (the first rotation axis Ax1 and the second rotation axis Ax2) as an axis is applied, the first force Fc1 is applied to the first movable portion 71; and the second force Fc2 is applied to the second movable portion 72. For example, the directions of these forces are aligned with the Z-axis direction. The directions of these forces are mutually-reversed. For example, these forces are based on the Coriolis force.

The directions of these forces change temporally. The movable portions are deformed by these forces. For example, vibrations are generated along the Z-axis direction in the first movable portion 71 and the second movable portion 72.

Strain is generated in the magnetic elements by the first force Fc1 and the second force Fc2. In the state shown in FIG. 6B, tensile strain ts is generated in the first magnetic element 51. On the other hand, compressive strain cs is generated in the second magnetic element 52. The tensile strain ts and the compressive strain cs change temporally and are interchanged with each other. The electrical resistances of these magnetic elements change due to these strains. The signals that correspond to the changes of the electrical resistances correspond to the first sense signal SS1 and the second sense signal SS2 illustrated in FIG. 5. The changes of these electrical resistances are based on, for example, the inverse magnetostrictive effect and the magnetoresistance effect.

As described in reference to FIG. 5, the disturbance (the noise) that is applied to the two magnetic elements substantially is canceled by using the differential signal SD corresponding to the difference between the first sense signal SS1 and the second sense signal SS2. By using the differential signal SD, sensing with higher sensitivity is possible.

In the embodiment, the first support portion 70a includes, for example, silicon (Si). The first support portion 70a includes, for example, a monocrystalline silicon substrate. The first support portion 70a includes a semiconductor substrate, etc.

At least one of the first movable portion 71 or the second movable portion 72 includes silicon. The thicknesses (the lengths in the Z-axis direction) of the first movable portion 71 and the second movable portion 72 are, for example, not less than 1 µm and not more than 500 µm. The lengths (the lengths in the Y-axis direction) of the first movable portion 71 and the second movable portion 72 are, for example, not less than 50 µm and not more than 10000 µm. The widths (the lengths in the X-axis direction) of the first movable portion 71 and the second movable portion 72 are, for example, not less than 1 µm and not more than 500 µm.

At least one of the first to eighth electrodes e01 to e08 includes, for example, molybdenum (Mo). At least one of the first to eighth electrodes e01 to e08 includes, for example, at least one selected from the group consisting of molybdenum (Mo), platinum (Pt), gold (Au), copper (Cu), aluminum (Al), titanium (Ti), and tantalum (Ta). At least one of the first to eighth electrodes e01 to e08 includes, for example, an alloy including at least one selected from the group. The thicknesses (the lengths in the Z-axis direction) of the first to eighth electrodes e01 to e08 are, for example, not less than 30 nm and not more than 1000 nm.

At least one of the first to fourth piezoelectric layers p01 to p04 includes, for example, lead zirconate titanate (Pb($Zr_xTi_{1-x}$)$O_3$ (PZT)), aluminum nitride (Al—N), etc. At least one of the first to fourth piezoelectric layers p01 to p04 includes, for example, at least one selected from the group consisting of barium titanate ($BaTiO_3$), lead titanate (Pb$TiO_3$), potassium niobate ($KNbO_3$), lithium niobate ($LiNbO_3$), lithium tantalate ($LiTaO_3$), sodium tungstate ($NaWO_3$), sodium titanate ($NaTiO_3$), bismuth titanate (Bi$TiO_3$ or $Bi_4Ti_3O_{12}$), sodium potassium niobate ((K,Na)$NbO_3$), sodium niobate ($NaNbO_3$), bismuth ferrite ($BiFeO_3$), bismuth sodium titanate ($Na_{0.5}Bi_{0.5}TiO_3$), zinc oxide (Zn—O), $Ba_2NaNb_5O_5$, $Pb_2KNbO_{15}$, and lithium tetraborate ($Li_2B_4O_7$). At least one of the first to fourth piezoelectric layers p01 to p04 includes, for example, quartz (crystal: Si—O), gallium phosphate ($GaPO_4$), gallium arsenide (Ga—As), langasite ($La_3Ga_5SiO_{14}$), etc. The thicknesses (the lengths in the Z-axis direction) of the first to fourth piezoelectric layers p01 to p04 are, for example, not less than 30 nm and not more than 5000 nm.

At least one of the first to fourth magnetic layers m01 to m04 includes, for example, at least one selected from the group consisting of Fe, Co, and Ni. Examples of these magnetic layers are described below. The thicknesses (the lengths in the Z-axis direction) of the first to fourth magnetic layers m01 to m04 are, for example, not less than 1 nm and not more than 100 nm.

At least one of the first intermediate layer i01 or the second intermediate layer i02 includes, for example, $MgO_x$, $AlO_x$, $ZnO_x$, etc. Examples of these intermediate layers are described below. The thicknesses (the lengths in the Z-axis direction) of the first intermediate layer i01 and the second intermediate layer i02 are, for example, not less than 1 nm and not more than 10 nm.

At least one of the first to fourth conductive layers c01 to c04 includes, for example, at least one selected from the group consisting of copper (Cu), aluminum (Al), gold (Au), titanium (Ti), and tantalum (Ta). The thicknesses (the lengths in the Z-axis direction) of the first to fourth conductive layers c01 to c04 are, for example, not less than 30 nm and not more than 1000 nm.

For example, the length in the first extension direction De1 (the Y-axis direction) of the first piezoelectric element 401 is not less than 1.5 times and not more than 100 times the length in the first extension direction De1 of the first magnetic element 51. For example, the length in the first extension direction De1 (the Y-axis direction) of the second piezoelectric element 402 is not less than 1.5 times and not more than 100 times the length of the first extension direction De1 of the second magnetic element 52.

As shown in FIG. 1B, line F1-F2 corresponds to the central axis of the first movable portion 71. Line G1-G2 corresponds to the central axis of the second movable portion 72. These central axes extend along the first extension direction De1. The first movable portion 71 is substantially symmetric with respect to the central axis. The second movable portion 72 is substantially symmetric with respect to the central axis.

For example, the first magnetic element 51 is provided on the central axis of the first movable portion 71. For example, the first magnetic element 51 is substantially symmetric with respect to the central axis of the first movable portion 71. The second magnetic element 52 is provided on the central axis of the second movable portion 72. For example, the second magnetic element 52 is substantially symmetric with respect to the central axis of the second movable portion 72.

By providing the magnetic element on the central axis, for example, the strain that is generated by the drive vibration is smaller than the strain generated by the external force (e.g., the strain generated by the Coriolis force based on the external force). For example, the strain that is generated by the external force can be sensed efficiently. If the magnetic element is substantially symmetric with respect to the central axis, for example, the driving is stable.

As shown in FIG. 1B, for example, the first movable portion 71 and the second movable portion 72 are substantially symmetric with respect to a first movable central axis CC1. The first movable central axis CC1 extends along the first extension direction De1. For example, the distance between the first movable portion 71 and the first movable central axis CC1 is substantially the same as the distance between the second movable portion 72 and the first movable central axis CC1.

If the first movable portion 71 and the second movable portion 72 are substantially symmetric with respect to the first movable central axis CC1, for example, these movable portions vibrate with substantially the same amplitude with reversed phases. For example, high sensitivity is obtained by using the signal (e.g., the differential signal SD) that is obtained by the processing of the signal obtained from the first magnetic element 51 and the signal obtained from the second magnetic element 52.

Several examples of the sensor according to the embodiment will now be described.

FIG. 7A to FIG. 7F are schematic cross-sectional views illustrating another sensor according to the first embodiment.

Figure 7A:
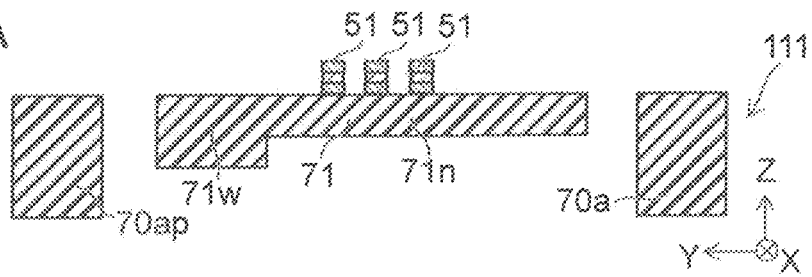
FIG. 7A to FIG. 7F are schematic cross-sectional views illustrating another sensor according to the first embodiment.
Figure 7B:
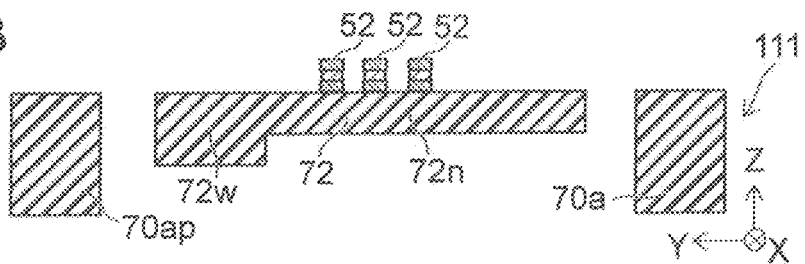

FIG. 7A and FIG. 7B are cross-sectional views corresponding to line F1-F2 and line G1-G2 of FIG. 1B. FIG. 7C to FIG. 7F are cross-sectional views corresponding respectively to line B1-B2, line C1-C2, line D1-D2, and line E1-E2 of FIG. 1B.

The portions of the sensor 111 that are different from those of the sensor 110 will now be described. Otherwise, a configuration similar to that of the sensor 110 is applied to the sensor 111.

Figure 7C:
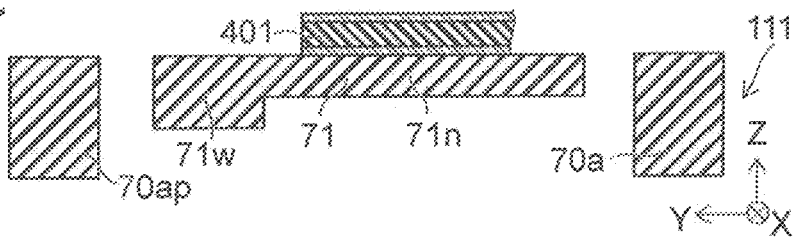
Figure 7D:
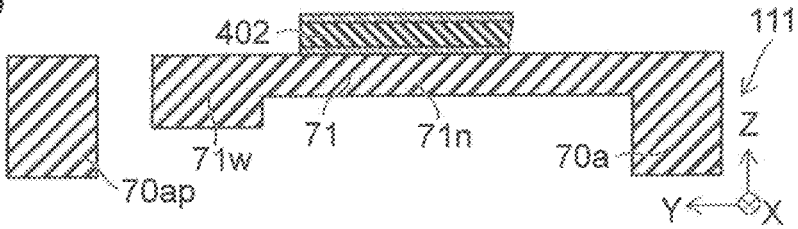

As shown in FIG. 7A, FIG. 7C, and FIG. 7D, the first movable portion 71 includes the first end portion 71w and a first movable extension portion 71n. The position of the first movable extension portion 71n in the Y-axis direction (the first extension direction De1) is between the position of the first end portion 71w in the Y-axis direction and the position of the first support portion 70a in the Y-axis direction. The first piezoelectric element 401, the second piezoelectric element 402, and the first magnetic element 51 are provided at the first movable extension portion 71n. On the other hand, as described above, the first piezoelectric element 401, the second piezoelectric element 402, and the first magnetic element 51 are not provided at the first end portion 71w.

Figure 7E:
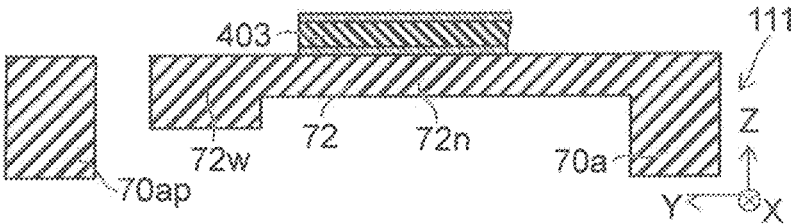
Figure 7F:
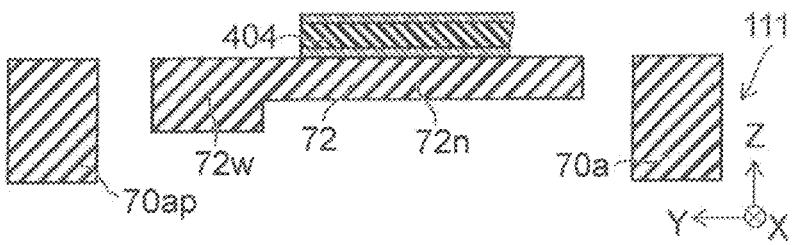

As shown in FIG. 7B, FIG. 7E, and FIG. 7F, the second movable portion 72 includes the second end portion 72w and a second movable extension portion 72n. The position of the second movable extension portion 72n in the Y-axis direction (the first extension direction De1) is between the position of the second end portion 72w in the Y-axis direction and the position of the first support portion 70a in the Y-axis direction. The third piezoelectric element 403, the fourth piezoelectric element 404, and the second magnetic element 52 are provided at the second movable extension portion 72n. On the other hand, as described above, the third piezoelectric element 403, the fourth piezoelectric element 404, and the second magnetic element 52 are not provided at the second end portion 72w.

For example, the first end portion 71w and the second end portion 72w function as weight portions. For example, the first movable extension portion 71n and the second movable extension portion 72n function as deforming portions. For example, the first movable extension portion 71n deforms more easily than the first end portion 71w. For example, the second movable extension portion 72n deforms more easily than the second end portion 72w.

In the example as shown in FIG. 7A, FIG. 7C, and FIG. 7D, the thickness (the length in the Z-axis direction) of the first movable extension portion 71n is thinner (shorter) than the thickness (the length in the Z-axis direction) of the first end portion 71w.

In the example as shown in FIG. 7B, FIG. 7E, and FIG. 7F, the thickness (the length in the Z-axis direction) of the second movable extension portion 72n is thinner (shorter) than the thickness (the length in the Z-axis direction) of the second end portion 72w.

Due to such a difference of the thicknesses, the movable extension portion deforms more easily. The function as the weight portion of the end portion improves. For example, the deformation of the movable portion occurs effectively and easily; and the sensitivity of the sensing improves further.

Figure 8:
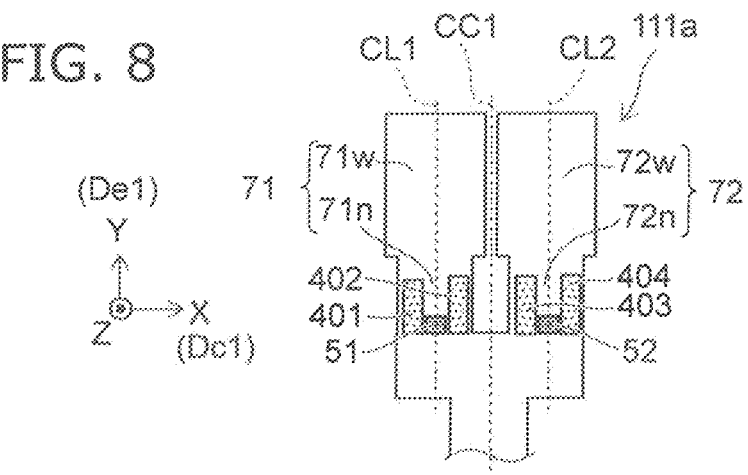
FIG. 8 is a schematic plan view illustrating another sensor according to the first embodiment.

FIG. 8 is a schematic plan view illustrating another sensor according to the first embodiment.

The portions of the sensor 111a different from those of the sensor 110 will now be described. Otherwise, a configuration similar to that of the sensor 110 is applied to the sensor 111a.

The first movable portion 71 includes the first end portion 71w and the first movable extension portion 71n. In the example, the width (the length in the X-axis direction, i.e., the length in the first crossing direction Dc1) of the first movable extension portion 71n is smaller (shorter) than the width (the length in the X-axis direction, i.e., the length in the first crossing direction Dc1) of the first end portion 71w.

The second movable portion 72 includes the second end portion 72w and the second movable extension portion 72n. In the example, the width (the length in the X-axis direction, i.e., the length in the first crossing direction) of the second movable extension portion 72n is smaller (shorter) than the width (the length in the X-axis direction, i.e., the length in the first crossing direction) of the second end portion 72w.

Due to such a difference of the widths, the movable extension portion deforms more easily. The function as the weight of the end portion improves. For example, the deformation of the movable portion occurs effectively and easily; and the sensitivity of the sensing improves further.

In the example, the multiple first magnetic elements 51 are provided at positions that are symmetric around a central axis CL1 along the Y-axis direction of the first movable portion 71 as an axis. The multiple second magnetic elements 52 are provided at positions that are symmetric around a central axis CL2 along the Y-axis direction of the second movable portion 72 as an axis. For example, the strain that is generated by the external force can be sensed efficiently. For example, the driving is stable. In the example, the first movable portion 71 and the second movable portion 72 are substantially symmetric with respect to the first movable central axis CC1. These movable portions vibrate with substantially the same amplitude with reversed phases. For example, high sensitivity is obtained.

Figure 9A:
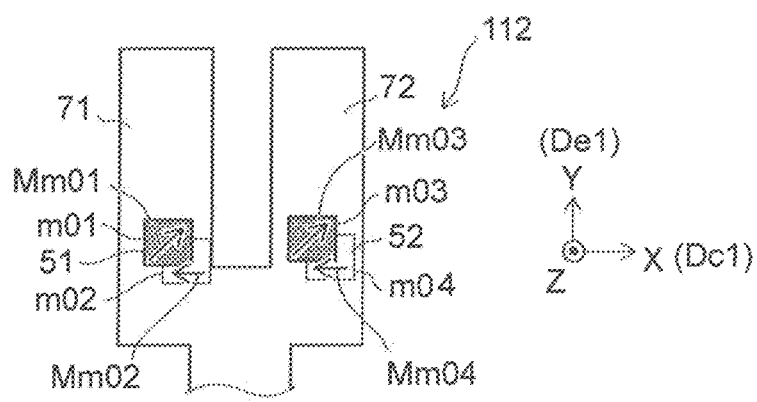
FIG. 9A to FIG. 9C are schematic plan views illustrating another sensor according to the first embodiment.
Figures 9B, 9C:
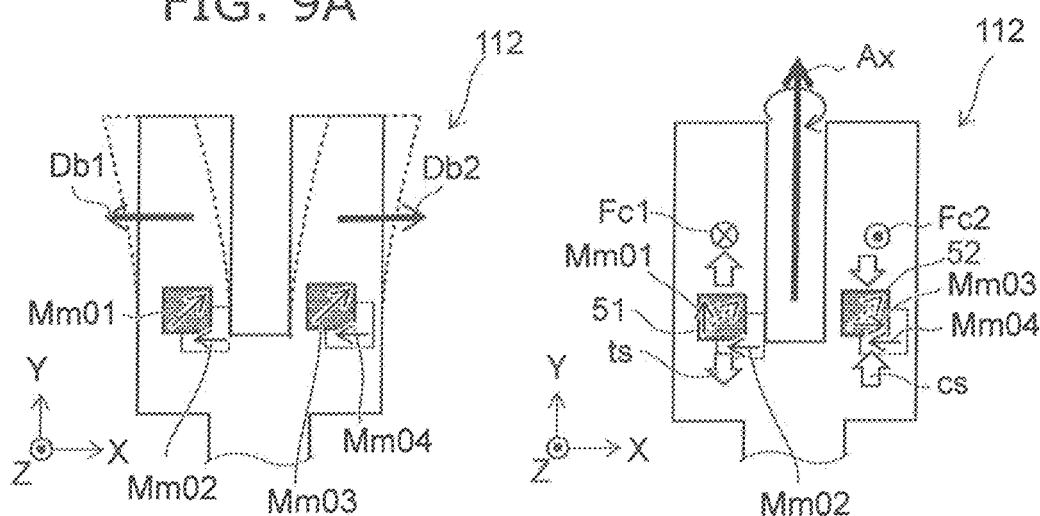

FIG. 9A to FIG. 9C are schematic plan views illustrating another sensor according to the first embodiment.

In the sensor 112 of the example as shown in FIG. 9A, a first magnetization Mm01 of the first magnetic layer m01 is tilted with respect to the first extension direction De1 (the Y-axis direction) and the first crossing direction Dc1 (the X-axis direction). On the other hand, a second magnetization Mm02 of the second magnetic layer m02 is aligned with the first crossing direction Dc1 (the X-axis direction). The second magnetization Mm02 of the second magnetic layer m02 may be aligned with the first extension direction De1 (the Y-axis direction).

A third magnetization Mm03 of the third magnetic layer m03 is tilted with respect to the first extension direction De1 (the Y-axis direction) and the first crossing direction Dc1 (the X-axis direction). On the other hand, a fourth magnetization Mm04 of the fourth magnetic layer m04 is aligned with the first crossing direction Dc1 (the X-axis direction). The fourth magnetization Mm04 of the fourth magnetic layer m04 may be aligned with the first extension direction Dc1 (the Y-axis direction). For example, the third magnetization Mm03 is aligned with the first magnetization Mm01. For example, the fourth magnetization Mm04 is aligned with the second magnetization Mm02.

In the example, the first magnetic layer m01 and the third magnetic layer m03 are free magnetic layers. The second magnetic layer m02 and the fourth magnetic layer m04 are reference layers.

As shown in FIG. 9B, the first drive force Db1 and the second drive force Db2 are applied respectively to the first movable portion 71 and the second movable portion 72. These drive forces are due to the piezoelectric elements.

As shown in FIG. 9C, an external force (an angular velocity or an angular acceleration) is applied. For example, the external force has a component rotating with the rotation axis Ax as the center. The first force Fc1 and the second force Fc2 are applied respectively to the first movable portion 71 and the second movable portion 72. For example, strain is generated in the first magnetic element 51 and the second magnetic element 52.

In the example shown in FIG. 9C, tensile strain is generated in the first magnetic layer m01. For example, the first magnetization Mm01 of the first magnetic layer m01 rotates toward the Y-axis direction. Compressive strain is generated in the third magnetic layer m03. On the other hand, for example, the third magnetization Mm03 of the third magnetic layer m03 rotates toward the X-axis direction.

For example, the angle between the first magnetization Mm01 and the second magnetization Mm02 changes according to the applied external force. The electrical resistance of the first magnetic element 51 changes according to the applied external force. Similarly, the angle between the third magnetization Mm03 and the fourth magnetization Mm04 changes according to the applied external force. The electrical resistance of the second magnetic element 52 changes according to the applied external force.

In the sensor 112, the first magnetization Mm01 is tilted with respect to the first extension direction De1 (the Y-axis direction) and the first crossing direction Dc1 (the X-axis direction) in the state in which the external force substantially is not applied. Similarly, the third magnetization Mm03 is tilted with respect to the first extension direction De1 (the Y-axis direction) and the first crossing direction Dc1 (the X-axis direction) in the state in which the external force substantially is not applied. For example, the orientations of these magnetizations change due to the strain (the tensile strain ts or the compressive strain cs) generated according to the external force.

On the other hand, the first magnetic layer m01 and the third magnetic layer m03 may be reference layers; and the second magnetic layer m02 and the fourth magnetic layer m04 may be free magnetic layers. In such a case, for example, the second magnetization Mm02 is tilted with respect to the first extension direction De1 (the Y-axis direction) and the first crossing direction Dc1 (the X-axis direction) in the state in which the external force substantially is not applied. Similarly, the fourth magnetization Mm04 is tilted with respect to the first extension direction De1 (the Y-axis direction) and the first crossing direction Dc1 (the X-axis direction) in the state in which the external force substantially is not applied.

When the external force is not applied, the angle between the first magnetization Mm01 and the second magnetization Mm02 is, for example, not less than 15 degrees and not more than 75 degrees. This angle is, for example, about 45 degrees. The angle between the third magnetization Mm03 and the fourth magnetization Mm04 is, for example, not less than 15 degrees and not more than 75 degrees. This angle is, for example, about 45 degrees. By such angles, the change of the electrical resistance for the generated strain can be effectively set to be large.

By causing the first magnetization Mm01 to be tilted with respect to the X-direction and the Y-direction, for example, the first magnetic element 51 can be caused to respond to both the first force Fc1 and the second force Fc2. For example, the third magnetization Mm03 can be caused to respond to both the first force Fc1 and the second force Fc2 in the X-axis direction and the Y-axis direction. For example, the second magnetic element 52 can be caused to respond to both the first force Fc1 and the second force Fc2. For example, the sensing of reverse polarities is performed by the first magnetic element 51 and the second magnetic element 52.

Thus, in the embodiment, it is favorable for at least one of the first magnetization Mm01 of the first magnetic layer m01 or the second magnetization Mm02 of the second magnetic layers m02 to be tilted with respect to the first extension direction De1.

FIG. 10A to FIG. 10D are schematic plan views illustrating other sensors according to the first embodiment.

Figure 10A:
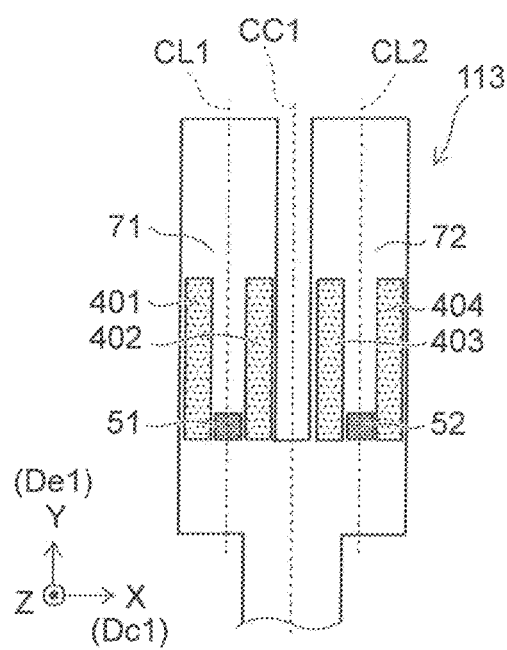
FIG. 10A to FIG. 10D are schematic plan views illustrating other sensors according to the first embodiment.

In a sensor 113a as shown in FIG. 10A, one first magnetic element 51 is provided between the first piezoelectric element 401 and the second piezoelectric element 402. One second magnetic element 52 is provided between the third piezoelectric element 403 and the fourth piezoelectric element 404.

Figure 10B:
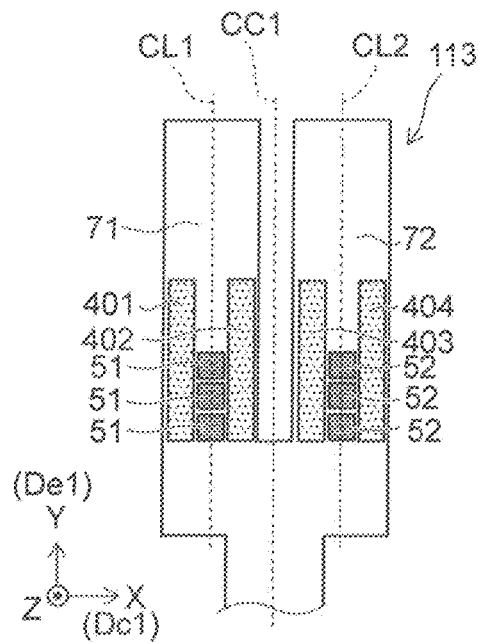
Figure 10C:
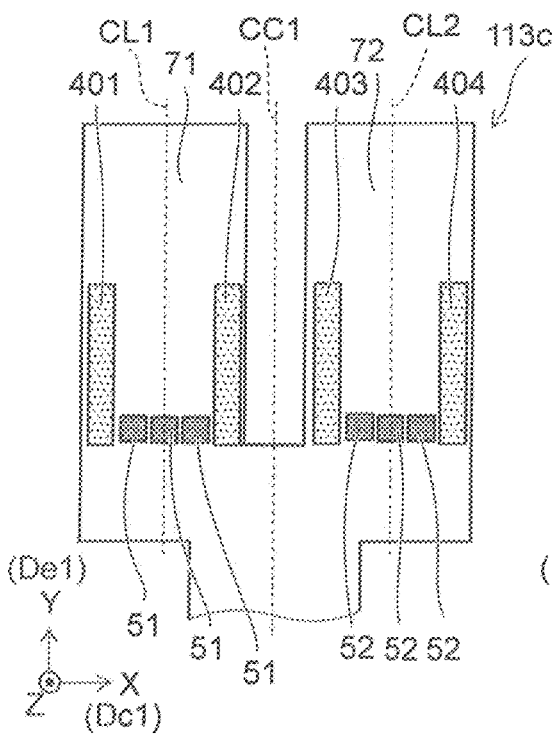
Figure 10D:
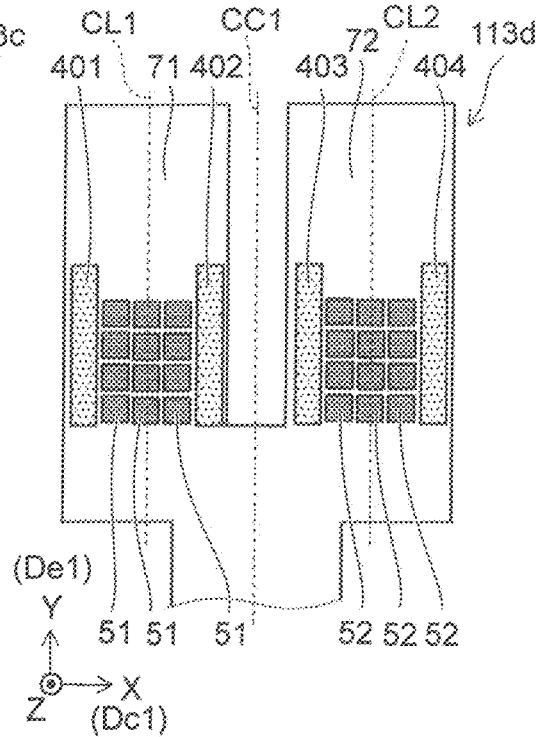

In sensors 113b to 113d as shown in FIG. 10B to FIG. 10D, the multiple first magnetic elements 51 are provided between the first piezoelectric element 401 and the second piezoelectric element 402. The multiple second magnetic elements 52 are provided between the third piezoelectric element 403 and the fourth piezoelectric element 404.

In the sensor 113b, the multiple first magnetic elements 51 are arranged along the Y-axis direction (the first extension direction De1). The multiple second magnetic elements 52 also are arranged along the Y-axis direction (the first extension direction De1).

In the sensor 113c, the multiple first magnetic elements 51 are arranged along the X-axis direction (the first crossing direction Dc1). The multiple second magnetic elements 52 also are arranged along the X-axis direction (the first crossing direction Dc1).

In the sensor 113d, the multiple first magnetic elements 51 are arranged along the Y-axis direction (the first extension direction De1) and the X-axis direction (the first crossing direction Dc1). The multiple second magnetic elements 52 also are arranged along the Y-axis direction (the first extension direction De1) and the X-axis direction (the first crossing direction Dc1).

FIG. 11A to FIG. 11D are schematic plan views illustrating other sensors according to the first embodiment.

As shown in FIG. 11A to FIG. 11D, a first magnetic portion 51BS and a second magnetic portion 52BS are provided in the sensors 114a to 114d. The first magnetic portion 51BS is fixed to the first movable portion 71. The second magnetic portion 52BS is fixed to the second movable portion 72.

In the sensors 114a to 114c, the first magnetic portion 51BS is provided between the first piezoelectric element 401 and the second piezoelectric element 402. The second magnetic portion 52BS is provided between the third piezoelectric element 403 and the fourth piezoelectric element 404.

In the sensor 114a, one first magnetic element 51 is provided between two first magnetic portions 51BS. One second magnetic element 52 is provided between two second magnetic portions 52BS. The configuration that includes the two first magnetic portions 51BS and the one first magnetic element 51 is multiply provided. The configuration that includes the two second magnetic portions 52BS and the one second magnetic element 52 is multiply provided. The direction connecting the two first magnetic portions 51BS and the one first magnetic element 51 is tilted with respect to the Y-axis direction (the first extension direction De1) and the X-axis direction (the first crossing direction Dc1). The direction connecting the two second magnetic portions 52BS and the one second magnetic element 52 is tilted with respect to the Y-axis direction (the first extension direction De1) and the X-axis direction (the first crossing direction Dc1).

In the sensor 114*b* and the sensor 114*c*, the multiple first magnetic elements 51 are provided between the two first magnetic portions 51BS. The multiple second magnetic elements 52 are provided between the two second magnetic portions 52BS.

In the sensor 114*b*, the direction connecting the two first magnetic portions 51BS and one first magnetic element 51 is aligned with the X-axis direction (the first crossing direction Dc1). The direction connecting the two second magnetic portions 52BS and one second magnetic element 52 is aligned with the X-axis direction (the first crossing direction Dc1).

In the sensor 114*c*, the direction connecting the two first magnetic portions 51BS and one first magnetic element 51 is aligned with the Y-axis direction (the first extension direction De1). The direction connecting the two second magnetic portions 52BS and one second magnetic element 52 is aligned with the Y-axis direction (the first extension direction De1).

In the sensor 114*d*, the first magnetic portion 51BS is not provided between the first piezoelectric element 401 and the second piezoelectric element 402. In the example, a portion of the first magnetic portion 51BS overlaps the first piezoelectric element 401 in the Y-axis direction. Another portion of the first magnetic portion 51BS overlaps the second piezoelectric element 402 in the Y-axis direction. Another portion of the first magnetic portion 51BS overlaps the first magnetic element 51 in the Y-axis direction. The second magnetic portion 52BS is not provided between the third piezoelectric element 403 and the fourth piezoelectric element 404. In the example, a portion of the second magnetic portion 52BS overlaps the third piezoelectric element 403 in the Y-axis direction. Another portion of the second magnetic portion 52BS overlaps the fourth piezoelectric element 404 in the Y-axis direction. Another portion of the second magnetic portion 52BS overlaps the second magnetic element 52 in the Y-axis direction.

For example, the first magnetic portion 51BS and the second magnetic portion 52BS are provided at portions that substantially do not move (do not deform). Thereby, compared to the case where magnetic portions are provided on the movable portions, the movable portions move easily. For example, the sensitivity improves.

In the sensors 114*a* to 114*d*, a magnetization M51BS of the first magnetic portion 51BS is tilted with respect to the Y-axis direction (the first extension direction De1) and the X-axis direction (the first crossing direction Dc1). The first magnetic portion 51BS functions as a magnetizing bias layer. For example, the first magnetization Mm01 of the first magnetic layer m01 is aligned with the magnetization M51BS of the first magnetic portion 51BS.

Similarly, a magnetization M52BS of the second magnetic portion 52BS is tilted with respect to the Y-axis direction (the first extension direction De1) and the X-axis direction (the first crossing direction Dc1). The second magnetic portion 52BS functions as a magnetizing bias layer. For example, the third magnetization Mm03 of the third magnetic layer m03 is aligned with the magnetization M52BS of the second magnetic portion 52 BS.

In the examples of the sensors 114*b* to 114*d*, the size (e.g., the length in one direction in the X-Y plane) of one first magnetic portion 51BS is larger (longer) than the size (e.g., the length in the one direction in the X-Y plane) of one first magnetic element 51. The size (e.g., the length in one direction in the X-Y plane) of one second magnetic portion 52BS is larger (longer) than the size (e.g., the length in the one direction in the X-Y plane) of one second magnetic element 52. By providing the magnetic portions having the large sizes, stable bias magnetic fields can be applied to the magnetic elements.

The first magnetic portion 51BS and the second magnetic portion 52BS include, for example, a Co—Pt alloy, etc.

Figures 12A, 12B:
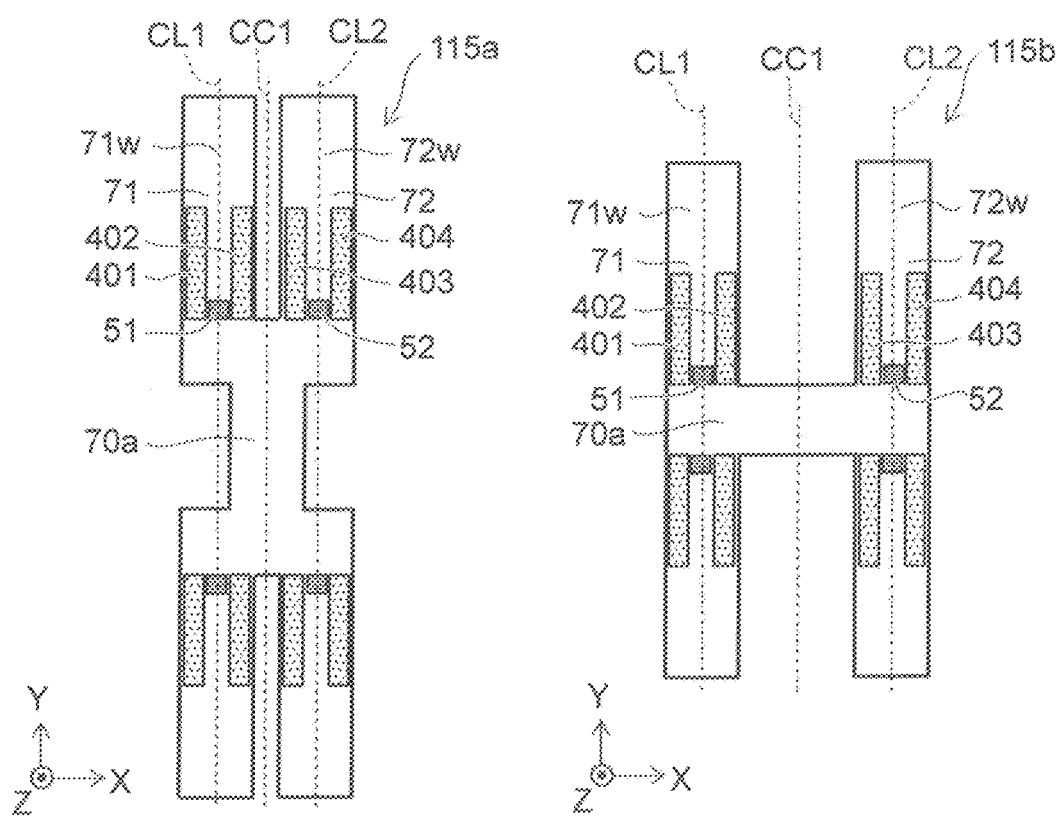
FIG. 12A and FIG. 12B are schematic plan views illustrating other sensors according to the first embodiment.

FIG. 12A and FIG. 12B are schematic plan views illustrating other sensors according to the first embodiment.

As shown in FIG. 12A and FIG. 12B, a set that includes the first movable portion 71, the second movable portion 72, the first to fourth piezoelectric elements 401 to 404, the first magnetic element 51, and the second magnetic element 52 is multiply provided in the sensors 115*a* and 115*b*. The multiple sets are supported by the first support portion 70*a*. The first support portion 70*a* is provided between one of the multiple sets and one other of the multiple sets.

In the sensors 112, 113*a* to 113*d*, 114*a* to 114*d*, 115*a*, and 115*b* as well, one or multiple first magnetic elements 51 are provided at positions that are symmetric around the central axis CL1 along the Y-axis direction of the first movable portion 71 as an axis. One or multiple second magnetic elements 52 are provided at positions that are symmetric around the central axis CL2 along the Y-axis direction of the second movable portion 72 as an axis. For example, the strain that is generated by the external force can be sensed efficiently. For example, the driving is stable. In the example, the first movable portion 71 and the second movable portion 72 are substantially symmetric with respect to the first movable central axis CC1. These movable portions vibrate with substantially the same amplitude with reversed phases. For example, high sensitivity is obtained.

In the sensors 114*b* and 114*c*, for example, the first magnetic portion 51BS is substantially symmetric with respect to the central axis CC1. Thereby, for example, the driving is stable.

In the sensors 114*b* and 114*c*, for example, the first magnetic portion 51BS is substantially symmetric with respect to the first movable central axis CC1. Thereby, these movable portions vibrate with substantially the same amplitude with reversed phases.

The first support portion 70*a*, the first movable portion 71, the second movable portion 72, the first to fourth piezoelectric elements 401 to 404, the first magnetic element 51, and the second magnetic element 52 are provided in the sensors 111, 111*a*, 112, 113*a* to 113*d*, 114*a* to 114*d*, 115*a*, and 115*b* as well. The configuration, materials, etc., described in reference to the sensor 110 are applicable to these components. The sensitivity can be increased in these sensors as well.

FIG. 13, FIG. 14A to FIG. 14E, and FIG. 15A to FIG. 15D are schematic views illustrating another sensor according to the first embodiment.

Figure 13:
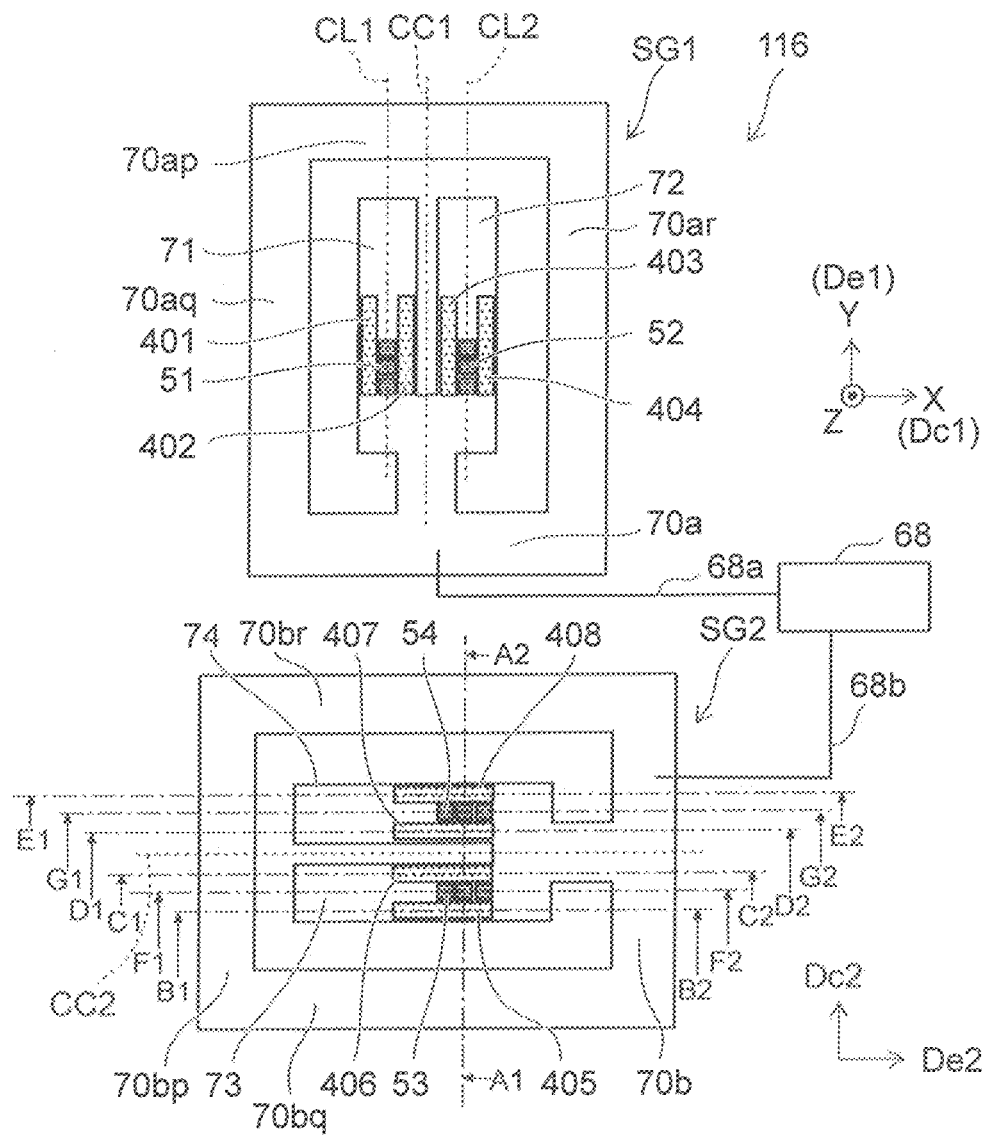
FIG. 13 is a schematic view illustrating another sensor according to the first embodiment.
Figure 14A:
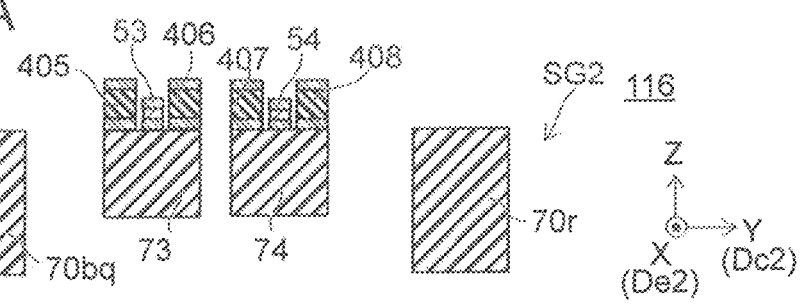
FIG. 14A to FIG. 14E are schematic views illustrating the other sensor according to the first embodiment.

FIG. 13 is a plan view, FIG. 14A to FIG. 14E are cross-sectional views corresponding respectively to line A1-A2, line B1-B2, line C1-C2, line D1-D2 and line E1-E2 of FIG. 13. FIG. 15A and FIG. 15B are cross-sectional views corresponding respectively to line F1-F2 and line G1-G2 of FIG. 13, FIG. 15C and FIG. 15D are cross-sectional views of portions of the sensor.

As shown in FIG. 13, the sensor 116 includes a first sensing group SG1 and a second sensing group SG2. The first sensing group SG1 includes the first support portion 70*a*, the first movable portion 71, the second movable portion 72, the first to fourth piezoelectric elements 401 to 404, the first magnetic element 51, and the second magnetic element 52. The first sensing group SG1 is similar to the sensor 110.

The second sensing group SG2 includes a second support portion 70b, a third movable portion 73, a fourth movable portion 74, fifth to eighth piezoelectric elements 405 to 408, a third magnetic element 53, and a fourth magnetic element 54, An example of the second sensing group SG2 will now be described.

In the example, the second support portion 70b is separated from the first support portion 70a. The direction connecting the first support portion 70a and the second support portion 70b is arbitrary. The second support portion 70b may be continuous with the first support portion 70a. A portion of the structure body used to form the first support portion 70a may be used to form the second support portion 70b.

The third movable portion 73 is connected to the second support portion 70b. The second support portion 70b supports the third movable portion 73. The third movable portion 73 extends along a second extension direction De2. The second extension direction De2 crosses the first extension direction Dc1 (e.g., the Y-axis direction). In the example, the second extension direction De2 is the X-axis direction.

The fifth piezoelectric element 405 is fixed to the third movable portion 73.

Figure 14B:
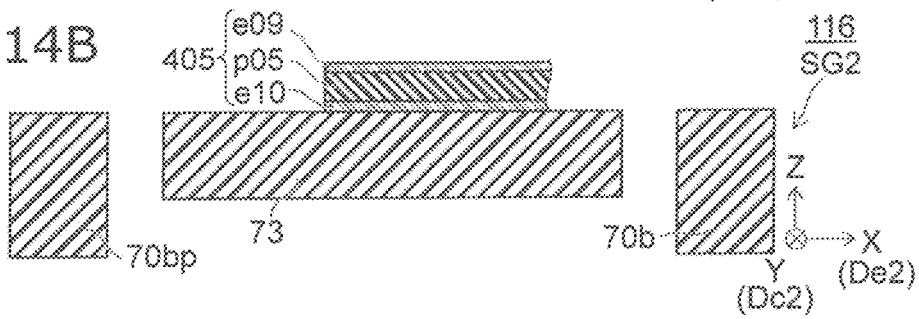
Figure 15A:
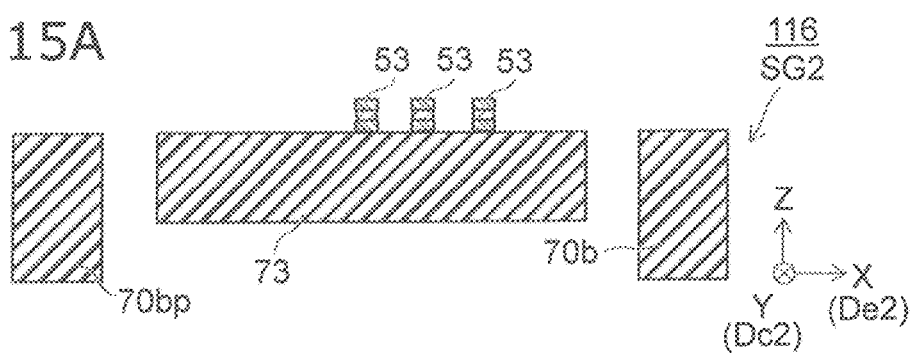
FIG. 15A to FIG. 15D are schematic views illustrating the other sensor according to the first embodiment.
Figure 15B:
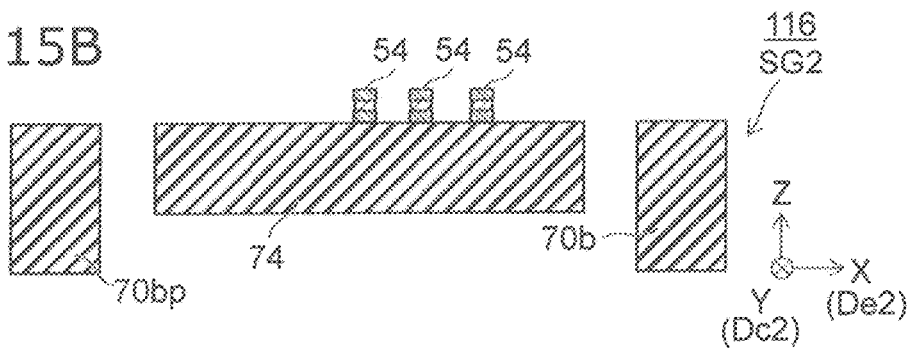
Figure 15C:
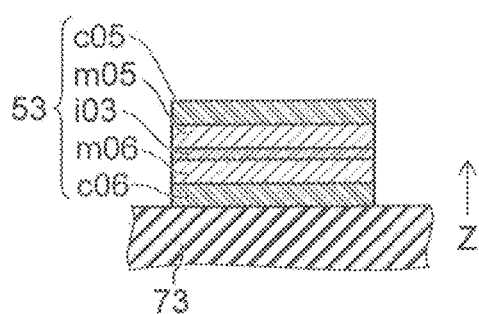
Figure 15D:
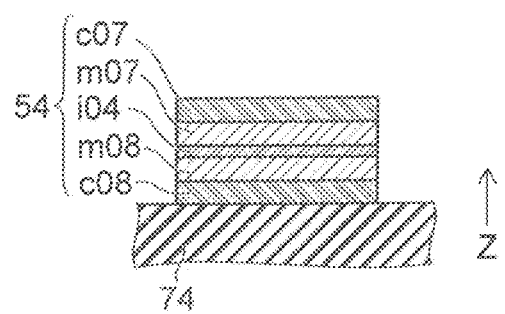

As shown in FIG. 14B, the fifth piezoelectric element 405 includes a ninth electrode e09, a tenth electrode e10, and a fifth piezoelectric layer p05. The tenth electrode e10 is provided between the ninth electrode e05 and the third movable portion 73. The fifth piezoelectric layer p05 is provided between the ninth electrode e09 and the tenth electrode e10.

As shown in FIG. 13, a sixth piezoelectric element 406 is separated from the fifth piezoelectric element 405 in a second crossing direction Dc2. The second crossing direction Dc2 crosses the second extension direction De2. In the example, the second crossing direction Dc2 is the Y-axis direction. The sixth piezoelectric element 406 is fixed to the third movable portion 73.

Figure 14C:
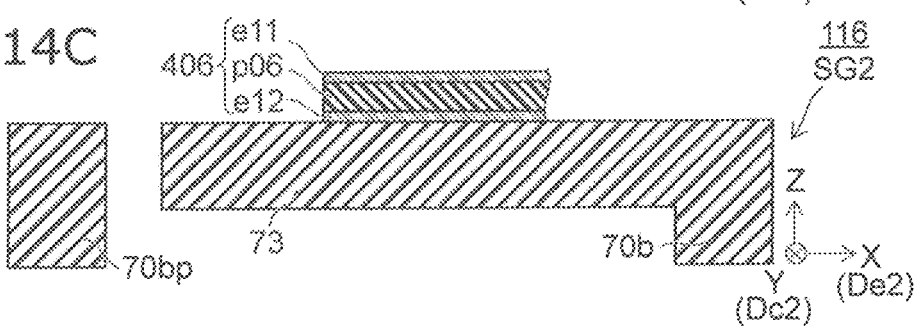

As shown in FIG. 14C, the sixth piezoelectric element 406 includes an eleventh electrode e11, a twelfth electrode e12, and a sixth piezoelectric layer p06. The twelfth electrode e12 is provided between the eleventh electrode e11 and the third movable portion 73. The sixth piezoelectric layer p06 is provided between the eleventh electrode e11 and the twelfth electrode e12.

As shown in FIG. 13 and FIG. 14A, the third magnetic element 53 is provided between the fifth piezoelectric element 405 and the sixth piezoelectric element 406 in the second crossing direction Dc2. The third magnetic element 53 is fixed to the third movable portion 73.

As shown in FIG. 15C, the third magnetic element 53 includes a fifth magnetic layer m05, a sixth magnetic layer m06, and a third intermediate layer i03. The third intermediate layer i03 is provided between the fifth magnetic layer m05 and the sixth magnetic layer m06. The third intermediate layer i03 is, for example, a nonmagnetic layer. The direction connecting the fifth magnetic layer m05 and the sixth magnetic layer m06 is aligned with the Z-axis direction. In the example, the third magnetic element 53 further includes a fifth conductive layer c05 and a sixth conductive layer c06. The magnetic layers recited above and the intermediate layers recited above are provided between these conductive layers.

As shown in FIG. 13, the fourth movable portion 74 is connected to the second support portion 70b. The second support portion 70b supports the fourth movable portion 74. The fourth movable portion 74 extends in the second extension direction De2 (in the example, the X-axis direction).

A seventh piezoelectric element 407 is fixed to the fourth movable portion 74.

Figure 14D:
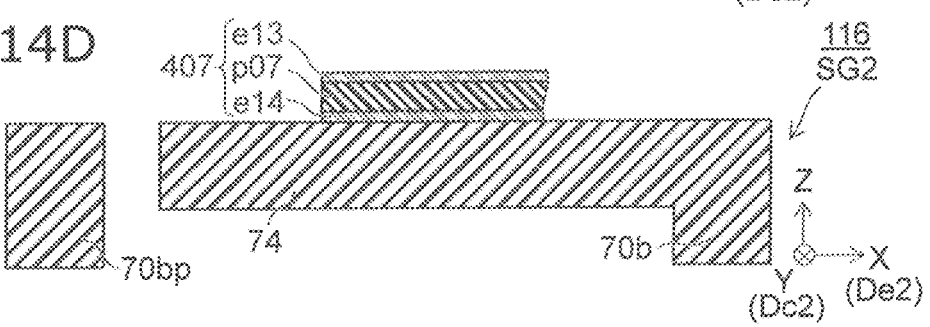

As shown in FIG. 14D, the seventh piezoelectric element 407 includes a thirteenth electrode e13, a fourteenth electrode e14, and a seventh piezoelectric layer p07. The fourteenth electrode e14 is provided between the thirteenth electrode e13 and the fourth movable portion 74. The seventh piezoelectric layer p07 is provided between the thirteenth electrode e13 and the fourteenth electrode e14.

As shown in FIG. 13, the eighth piezoelectric element 408 is separated from the seventh piezoelectric element 407 in the second crossing direction Dc2 (in the example, the Y-axis direction). The eighth piezoelectric element 408 is fixed to the fourth movable portion 74.

Figure 14E:
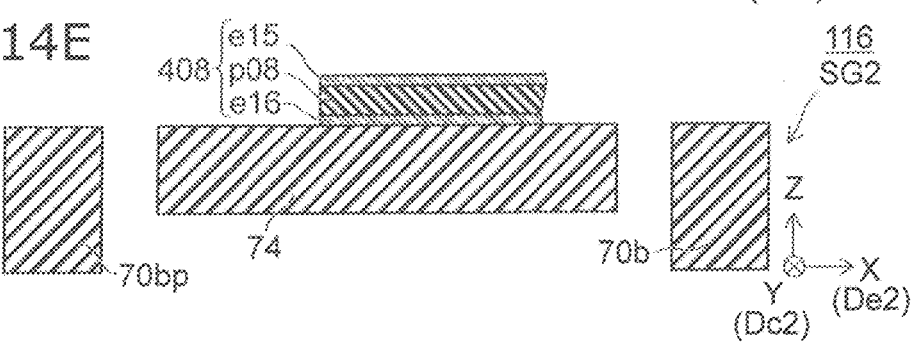

As shown in FIG. 14E, the eighth piezoelectric element 408 includes a fifteenth electrode e15, a sixteenth electrode e16, and an eighth piezoelectric layer p08. The sixteenth electrode e16 is provided between the fifteenth electrode e15 and the fourth movable portion 74. The eighth piezoelectric layer p08 is provided between the fifteenth electrode e15 and the sixteenth electrode e16.

As shown in FIG. 13 and FIG. 14A, the fourth magnetic element 54 is provided between the seventh piezoelectric element 407 and the eighth piezoelectric element 408 in the second crossing direction Dc2 (in the example, the Y-axis direction). The fourth magnetic element 54 is fixed to the fourth movable portion 74.

As shown in FIG. 15B, the fourth magnetic element 54 includes a seventh magnetic layer m07, an eighth magnetic layer m08, and a fourth intermediate layer i04. The fourth intermediate layer i04 is provided between the seventh magnetic layer m07 and the eighth magnetic layer m03. The fourth intermediate layer i04 is, for example, a nonmagnetic layer. The direction connecting the seventh magnetic layer m07 and the eighth magnetic layer m08 is aligned with the Z-axis direction. In the example, the fourth magnetic element 54 further includes a seventh conductive layer c07 and an eighth conductive layer c08. The magnetic layers recited above and the intermediate layers recited above are provided between these conductive layers.

As shown in FIG. 13, for example, the controller 68 is electrically connected to the fifth to eighth piezoelectric elements 405 to 408, the third magnetic element 53, and the fourth magnetic element 54 by a second interconnect group 68b. For example, the controller 68 is electrically connected by the second interconnect group 68b to an electrode included in each of the fifth to eighth piezoelectric elements 405 to 408, a conductive layer included in the third magnetic element 53, and a conductive layer included in the fourth magnetic element 54.

In the sensor 116, the first sensing group SG1 senses an external force (an angular velocity or an angular acceleration) rotating around the first extension direction De1 (in the example, the Y-axis direction) as an axis. On the other hand, the second sensing group SG2 senses an external force (an angular velocity or an angular acceleration) rotating around the second extension direction De2 (in the example, the X-axis direction) as an axis. In the sensor 116, the sensing of two axes is possible.

The configuration, materials, etc., described in reference to the first support portion 70a, the first movable portion 71, the second movable portion 72, the first to fourth piezoelectric elements 401 to 404, the first magnetic element 51, and the second magnetic element 52 are applicable respectively to the second support portion 70b, the third movable portion 73, the fourth movable portion 74, the fifth to eighth piezoelectric elements 405 to 408, the third magnetic element 53, and the fourth magnetic element 54. The operations described in reference to the first to fourth piezoelectric elements 401 to 404, the first magnetic element 51, and the second magnetic element 52 are applicable to the fifth to eighth piezoelectric elements 405 to 408, the third magnetic element 53, and the fourth magnetic element 54.

A sensor in which the sensitivity can be increased can be provided by the sensor 116 as well.

In the example as shown in FIG. 13 and FIG. 15A, the multiple third magnetic elements 53 are arranged along the X-axis direction. The multiple third magnetic elements 53 may be connected in series to each other. High sensitivity is obtained. The direction in which the multiple third magnetic elements 53 are arranged is arbitrary.

In the example as shown in FIG. 13 and FIG. 15B, the multiple fourth magnetic elements 54 are arranged along the X-axis direction. The multiple fourth magnetic elements 54 may be connected in series to each other. High sensitivity is obtained. The direction in which the multiple fourth magnetic elements 54 are arranged is arbitrary.

Structure bodies 70bp, 70bq, and 70br are provided in the example as shown in FIG. 13. For example, the second support portion 70b and the structure bodies 70bp, 70bq, and 70br surround the movable portions in the X-Y plane. The structure bodies 70bp, 70bq, and 70br are continuous with the second support portion 70b. By providing these structure bodies, for example, the mechanical strength of the second support portion 70b increases. For example, the deformation of the second support portion 70b is suppressed.

As shown in FIG. 13, line F1-F2 corresponds to the central axis of the third movable portion 73. Line G1-G2 corresponds to the central axis of the fourth movable portion 74. These central axes extend along the second extension direction De2. The third movable portion 73 is substantially symmetric with respect to the central axis. The fourth movable portion 74 is substantially symmetric with respect to the central axis.

For example, the third magnetic element 53 is provided on the central axis of the third movable portion 73. For example, the third magnetic element 53 is substantially symmetric with respect to the central axis of the third movable portion 73. The fourth magnetic element 54 is provided on the central axis of the fourth movable portion 74. For example, the fourth magnetic element 54 is substantially symmetric with respect to the central axis of the fourth movable portion 74. For example, the strain that is generated by the external force can be sensed efficiently. For example, the driving is stable.

As shown in FIG. 13, for example, the third movable portion 73 and the fourth movable portion 74 are substantially symmetric with respect to a second movable central axis CC2. The second movable central axis CC2 extends along the second extension direction De2. For example, the distance between the third movable portion 73 and the second movable central axis CC2 is substantially the same as the distance between the fourth movable portion 74 and the second movable central axis CC2.

If the third movable portion 73 and the fourth movable portion 74 are substantially symmetric with respect to the second movable central axis CC2, for example, these movable portions vibrate with substantially the same amplitude with reversed phases. For example, high sensitivity is obtained.

FIG. 16, FIG. 17A to FIG. 17E, FIG. 18A, and FIG. 18B are schematic views illustrating another sensor according to the first embodiment.

Figure 16:
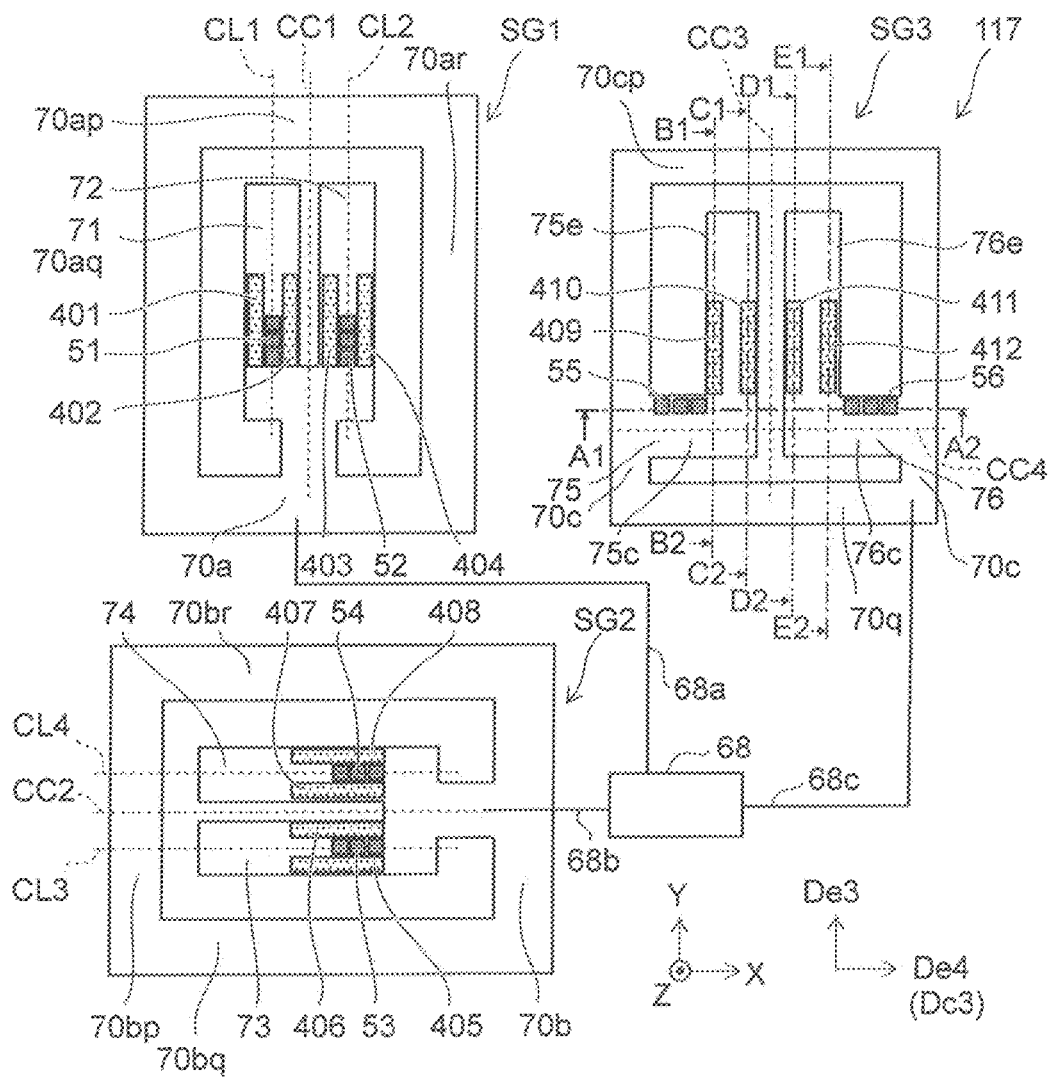
FIG. 16 is a schematic view illustrating another sensor according to the first embodiment.
Figure 17A:
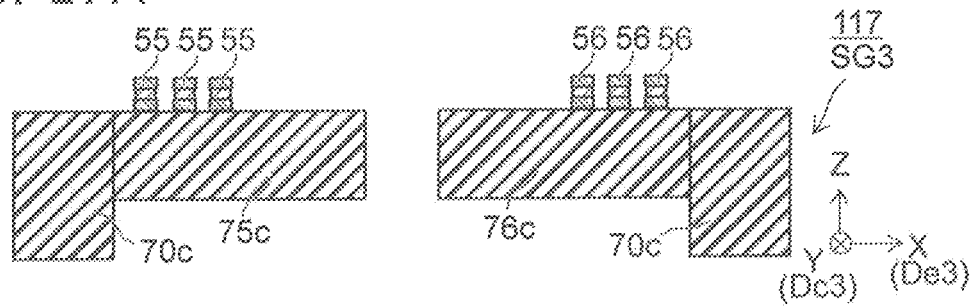
FIG. 17A to FIG. 17E are schematic views illustrating the other sensor according to the first embodiment.

FIG. 16 is a plan view. FIG. 17A to FIG. 17E are cross-sectional views corresponding respectively to line A1-A2, line B1-B2, line C1-C2, line D1-D2, and line E1-E2 of FIG. 16. FIG. 15A and FIG. 18B are cross-sectional views of portions of the sensor.

As shown in FIG. 16, the sensor 117 includes a third sensing group SG3 in addition to the first sensing group SG1 and the second sensing group SG2. The first sensing group SG1 and the second sensing group SG2 are similar to those of the sensor 116. An example of the third sensing group SG3 will now be described.

As shown in FIG. 16, the third sensing group SG3 includes a third support portion 70c, a fifth movable portion 75, a sixth movable portion 76, ninth to twelfth piezoelectric elements 409 to 412, a fifth magnetic element 55, and a sixth magnetic element 56.

In the example, the third support portion 70c is separated from the first support portion 70a and the second support portion 70b. The direction connecting the first support portion 70a and the third support portion 70c and the direction connecting the second support portion 70b and the third support portion 70c are arbitrary. The third support portion 70c may be continuous with at least one of the first support portion 70a or the second support portion 70b. A portion of the structure body used to form at least one of the first support portion 70a or the second support portion 70b may be used to form the third support portion 70c.

The fifth movable portion 75 is connected to the third support portion 70c. The third support portion 70c supports the fifth movable portion 75. The fifth movable portion 75 includes a first extension portion 75e and a first connection portion 75c. The first extension portion 75e extends in a third extension direction De3. In the example, the third extension direction De3 is aligned with the Y-axis direction. The first connection portion 75c is connected to the first extension portion 75e. In the example, the first connection portion 75c connects the first extension portion 75e to the third support portion 70c. The first connection portion 75c extends in a fourth extension direction De4. The fourth extension direction De4 crosses the third extension direction De3. In the example, the fourth extension direction De4 is the X-axis direction.

The ninth piezoelectric element 409 is fixed to the first extension portion 75e.

Figure 17B:
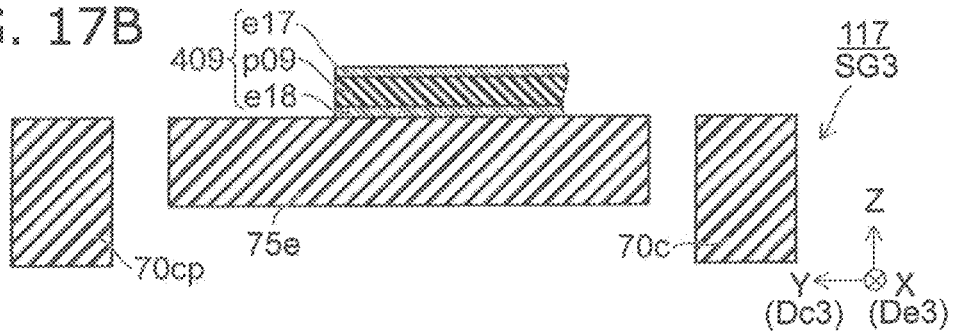
Figure 18A:
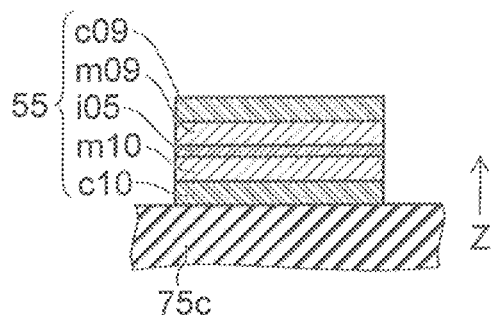
FIG. 18A and FIG. 18B are schematic views illustrating the other sensor according to the first embodiment.
Figure 18B:
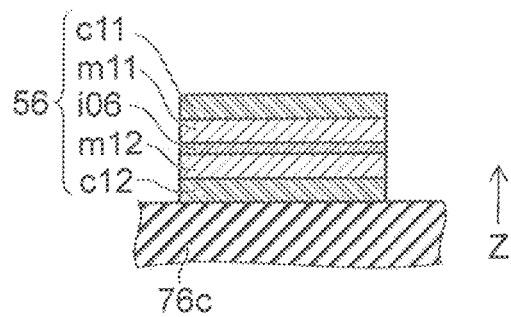

As shown in FIG. 17B, the ninth piezoelectric element 409 includes a seventeenth electrode e17, an eighteenth electrode e18, and a ninth piezoelectric layer p09. The eighteenth electrode e18 is provided between the seventeenth electrode e17 and the first extension portion 75e. The ninth piezoelectric layer p09 is provided between the seventeenth electrode e17 and the eighteenth electrode e18.

As shown in FIG. 16, a tenth piezoelectric element 410 is separated from the ninth piezoelectric element 409 in a third crossing direction Dc3. The third crossing direction Dc3 crosses the third extension direction De3. The tenth piezoelectric element 410 is fixed to the first extension portion 75e.

Figure 17C:
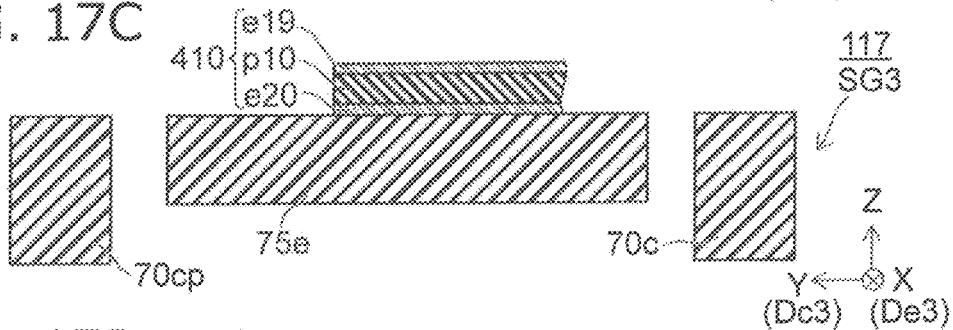

As shown in FIG. 17C, the tenth piezoelectric element 410 includes a nineteenth electrode e19, a twentieth electrode e20, and a tenth piezoelectric layer p10. The twentieth electrode e20 is provided between the nineteenth electrode e19 and the first extension portion 75e. The tenth piezoelectric layer p10 is provided between the nineteenth electrode e19 and the twentieth electrode e20.

As shown in FIG. 16 and FIG. 17A, the fifth magnetic element 55 is fixed to the first connection portion 75c.

As shown in FIG. 15A, the fifth magnetic element 55 includes a ninth magnetic layer m09, a tenth magnetic layer m10, and a fifth intermediate layer i05. The fifth intermediate layer i05 is provided between the ninth magnetic layer m09 and the tenth magnetic layer m10. The fifth intermediate layer i05 is, for example, a nonmagnetic layer. In the example, the fifth magnetic element 55 includes a ninth conductive layer c09 and a tenth conductive layer t10. The magnetic layers recited above and the intermediate layers recited above are provided between these conductive layers. In the example, the direction connecting the ninth magnetic layer m09 and the tenth magnetic layer m10 is aligned with the Z-axis direction.

As shown in FIG. 16, the sixth movable portion 76 is connected to the third support portion 70c. The third support portion 70c supports the sixth movable portion 76. The sixth movable portion 76 includes a second extension portion 76e and a second connection portion 76c. The second extension portion 76e extends in the third extension direction De3. The second connection portion 76c is connected to the second extension portion 76e. In the example, the second connection portion 76c connects the second extension portion 76e to the third support portion 70c. The second connection portion 76c extends in the fourth extension direction De4 (in the example, the X-axis direction).

An eleventh piezoelectric element 411 is fixed to the second extension portion 76e.

Figure 17D:
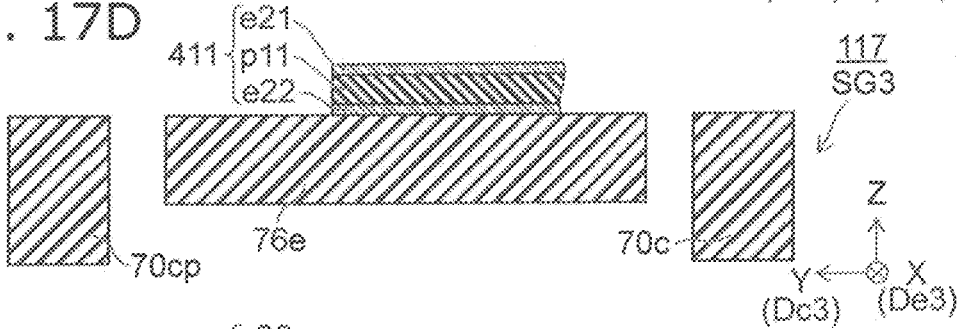

As shown in FIG. 17D, the eleventh piezoelectric element 411 includes a twenty-first electrode e21, a twenty-second electrode e22, and an eleventh piezoelectric layer p11. The twenty-second electrode e22 is provided between the twenty-first electrode e21 and the second extension portion 76e. The eleventh piezoelectric layer p11 is provided between the twenty-first electrode e21 and the twenty-second electrode e22.

As shown in FIG. 16, the twelfth piezoelectric element 412 is separated from the eleventh piezoelectric element 411 in the third crossing direction Dc3 (in the example, the X-axis direction). The twelfth piezoelectric element 412 is fixed to the second extension portion 76e.

Figure 17E:
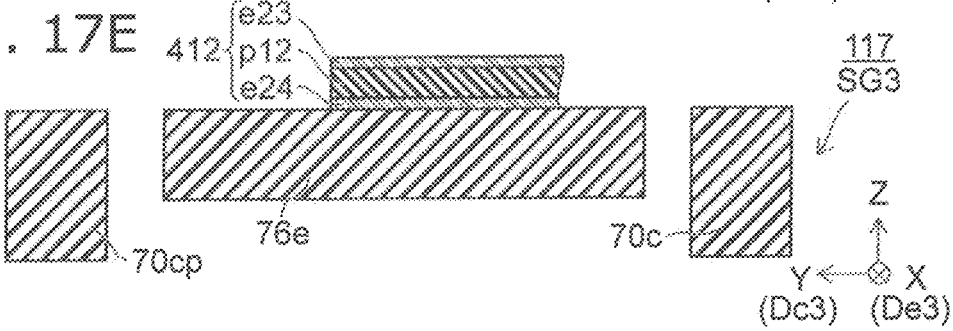

As shown in FIG. 17E, the twelfth piezoelectric element 412 includes a twenty-third electrode e23, a twenty-fourth electrode e24, and a twelfth piezoelectric layer p11. The twenty-fourth electrode e24 is provided between the twenty-third electrode e23 and the second extension portion 76e. The twelfth piezoelectric layer p12 is provided between the twenty-third electrode e23 and the twenty-fourth electrode e24.

As shown in FIG. 16 and FIG. 17A, the sixth magnetic element 56 is fixed to the second connection portion 76c.

As shown in FIG. 18B, the sixth magnetic element 56 includes an eleventh magnetic layer m11, a twelfth magnetic layer m12, and a sixth intermediate layer i06. The sixth intermediate layer i06 is provided between the eleventh magnetic layer m11 and the twelfth magnetic layer m12. The sixth intermediate layer i06 is, for example, a nonmagnetic layer. In the example, the sixth magnetic element 56 includes an eleventh conductive layer e11 and a twelfth conductive layer c12. The magnetic layers recited above and the intermediate layers recited above are provided between these conductive layers. In the example, the direction connecting the eleventh magnetic layer m11 and the twelfth magnetic layer m12 is aligned with the 2-axis direction.

Figure 19:
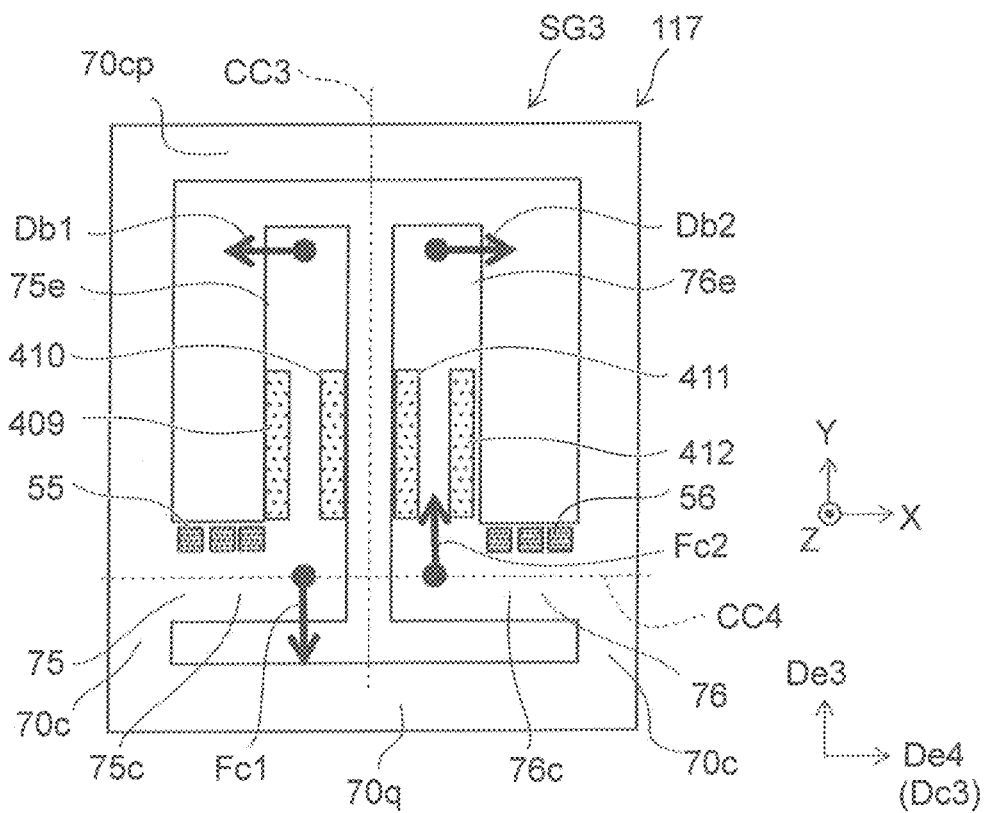
FIG. 19 is a schematic view illustrating operations of the sensor according to the first embodiment.

FIG. 19 is a schematic view illustrating operations of the sensor according to the first embodiment.

In the third sensing group SG3, when an external force (an angular velocity or an angular acceleration) rotating around the Z-axis direction as an axis is applied, changes of the electrical resistances corresponding to the external force occur in the fifth magnetic element 55 and the sixth magnetic element 56. It is possible to sense the external force by sensing the values corresponding to the changes of the electrical resistances. For example, the first drive force Db1 and the second drive force Db2 have X-axis direction components. For example, the first force Fc1 and the second force Fc2 have Y-axis direction components.

In the sensor 117, forces (angular velocities and angular accelerations) in three axes are sensible. In the sensor 117 as well, high sensitivity is obtained.

The configuration, materials, etc., described in reference to the first support portion 70a, the first movable portion 71, the second movable portion 72, the first to fourth piezoelectric elements 401 to 404, the first magnetic element 51, and the second magnetic element 52 are applicable respectively to the third support portion 70c, the fifth movable portion 75, the sixth movable portion 76, the ninth to twelfth piezoelectric elements 409 to 412, the fifth magnetic element 55, and the sixth magnetic element 56. The operations described in reference to the first to fourth piezoelectric elements 401 to 404, the first magnetic element 51, and the second magnetic element 52 are applicable to the ninth to twelfth piezoelectric elements 409 to 412, the fifth magnetic element 55, and the sixth magnetic element 56.

For example, as shown in FIG. 16, the controller 68 may be provided in the sensor 117. The controller 68 is electrically connected to the ninth to twelfth piezoelectric elements 409 to 412, the fifth magnetic element 55, and the sixth magnetic element 56 via a third interconnect group 68c.

Structure bodies 70cp and 70cq are provided in the example as shown in FIG. 16. For example, the third support portion 70c and the structure bodies 70cp and 70cq surround the movable portions in the X-Y plane. The structure bodies 70cp and 70cq are continuous with the third support portion 70c. For example, the mechanical strength of the third support portion 70c is increased by providing these structure bodies. For example, the deformation of the third support portion 70c is suppressed.

In the embodiment, the third sensing group SG3 may be provided without providing the first sensing group SG1. The third sensing group SG3 may be provided without providing the second sensing group SG2.

In the example as shown in FIG. 16 and FIG. 19, in the third sensing group SG3, for example, the first extension portion 75e and the second extension portion 76e are substantially symmetric with respect to a third movable central axis CC3. The third movable central axis CC3 extends along the third extension direction De3. For example, the distance between the first extension portion 75e and the third movable central axis CC3 is substantially the same as the distance between the second extension portion 76e and the third movable central axis CC3.

If the first extension portion 75e and the second extension portion 76e are substantially symmetric with respect to the third movable central axis CC3, for example, these movable portions vibrate with substantially the same amplitude with reversed phases. For example, high sensitivity is obtained.

In the third sensing group SG3 as shown in FIG. 16 and FIG. 19, the first connection portion 75c and the second connection portion 76c are aligned with a connection portion central axis CC4. The connection portion central axis CC4 extends along the fourth extension direction De4 (e.g., the third crossing direction Dc3). For example, the first connection portion 75c is substantially symmetric with respect to the connection portion central axis CC4. The second connection portion 76c is substantially symmetric with respect to the connection portion central axis CC4.

For example, the fifth magnetic element 55 and the sixth magnetic element 56 are provided at positions shifted from the connection portion central axis CC4. For example, the first connection portion 75c has two end portions in the Y-axis direction. The connection portion central axis CC4 is positioned between the two end portions. For example, the second connection portion 76c also has two end portions in the Y-axis direction. The connection portion central axis CC4 is positioned between the two end portions. When the external force is applied, a large strain is generated in these end portions. For example, the first force Fc1 and the second force Fc2 that are based on the external force are aligned with the Y-axis direction (referring to FIG. 19). By these forces, a large strain is generated in the end portions of the first connection portion 75c and the second connection portion 76c.

In the example, the fifth magnetic element 55 is provided at one of the two end portions of the first connection portion 75c. The sixth magnetic element 56 is provided at one of the two end portions of the second connection portion 76c, High sensitivity is obtained by providing the magnetic elements at positions where a large strain is generated.

Figure 20:
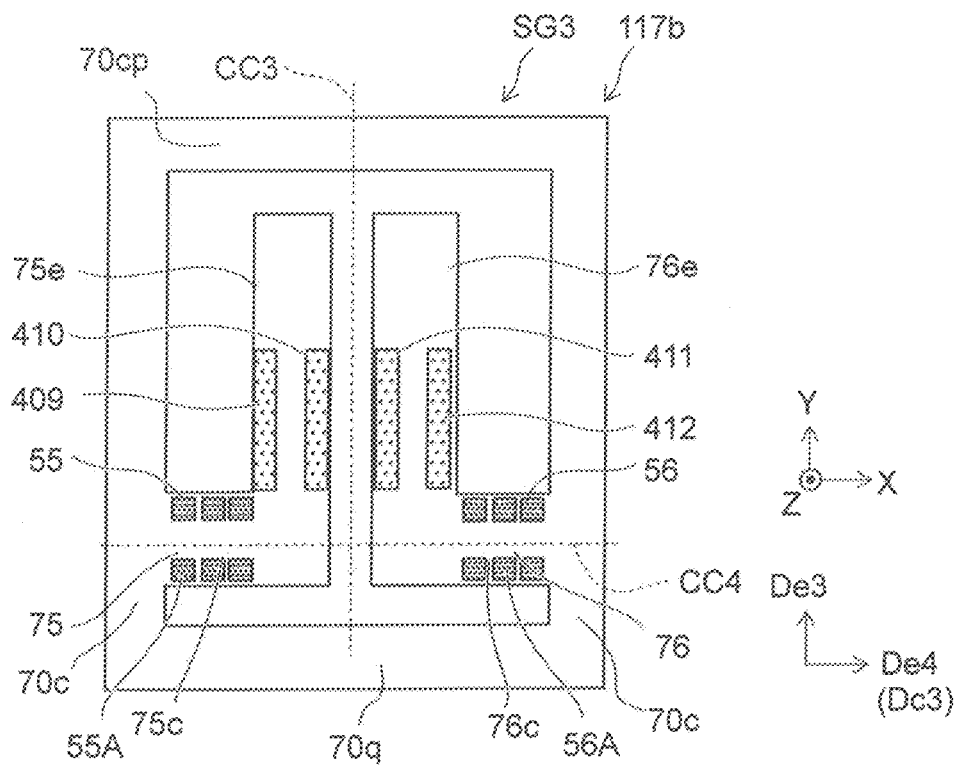
FIG. 20 is a schematic plan view illustrating another sensor according to the first embodiment.

FIG. 20 is a schematic plan view illustrating another sensor according to the first embodiment.

FIG. 20 illustrates the third sensing group SG3 of the other sensor 117b according to the embodiment. The portions of the sensor 117b other than the third sensing group SG3 are similar to those of the sensor 117. For example, the first sensing group SG1, the second sensing group SG2, the controller 68, etc., may be provided in the sensor 117b.

In the sensor 117b, a magnetic element 55A is provided at the first connection portion 75c in addition to the fifth magnetic element 55. A magnetic element 56A is provided at the second connection portion 76c in addition to the sixth magnetic element 56.

The fifth magnetic element 55 is provided at one end portion in the Y-axis direction of the first connection portion 75c, The magnetic element 55A is provided at the other end portion in the Y-axis direction of the first connection portion 75c. The sixth magnetic element 56 is provided at one end portion in the Y-axis direction of the second connection portion 76c. The magnetic element 56A is provided at the other end portion in the Y-axis direction of the second connection portion 76c. A large strain is generated according to the external force at the positions where these magnetic elements are provided. High sensitivity is obtained.

For example, the polarity of the signal obtained by the fifth magnetic element 55 is the reverse of the polarity of the signal obtained by the magnetic element 55A. High sensitivity is obtained by utilizing the difference of these signals. For example, the polarity of the signal obtained by the sixth magnetic element 56 is the reverse of the polarity of the signal obtained by the magnetic element 56A. High sensitivity is obtained by utilizing the difference of these signals.

Figures 21A, 21B:
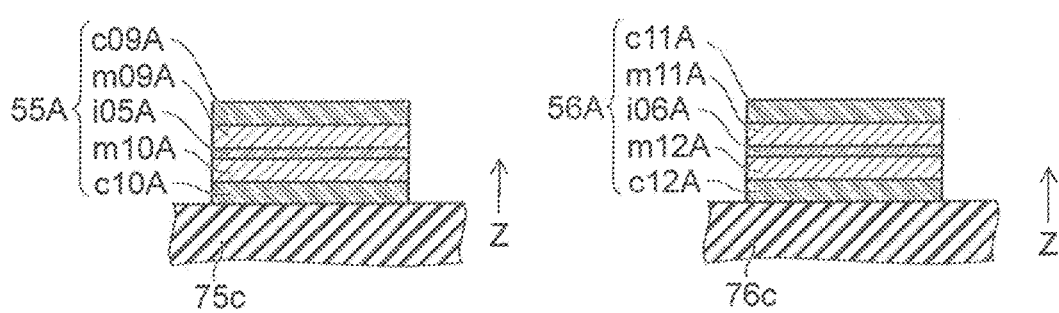
FIG. 21A and FIG. 21B are schematic cross-sectional views illustrating the other sensor according to the first embodiment.

FIG. 21A and FIG. 21B are schematic cross-sectional views illustrating the other sensor according to the first embodiment.

As shown in FIG. 21A, the magnetic element 55A is fixed to the first connection portion 75c. The magnetic element 55A includes a magnetic layer m09A, a magnetic layer m10A, and an intermediate layer i05A. The intermediate layer i05A is provided between the magnetic layer m09A and the magnetic layer m10A. The intermediate layer i05A is, for example, a nonmagnetic layer. In the example, the magnetic element 55A includes a conductive layer c09A and a conductive layer c10A. The magnetic layers recited above and the intermediate layers recited above are provided between these conductive layers. In the example, the direction connecting the magnetic layer m09A and the magnetic layer m10A is aligned with the Z-axis direction.

As shown in FIG. 21B, the magnetic element 56A is fixed to the second connection portion 76c. The magnetic element 56A includes a magnetic layer m11A, a magnetic layer m12A, and an intermediate layer 106A. The intermediate layer i06A is provided between the magnetic layer m11A and the magnetic layer m12A. The intermediate layer i06A is, for example, a nonmagnetic layer. In the example, the magnetic element 56A includes a conductive layer c11A and a conductive layer c12A, The magnetic layers recited above and the intermediate layers recited above are provided between these conductive layers. In the example, the direction connecting the magnetic layer m11A and the magnetic layer m12A is aligned with the Z-axis direction.

FIG. 22, FIG. 23A to FIG. 23F, and FIG. 24A to FIG. 24D are schematic views illustrating another sensor according to the first embodiment.

Figure 22:
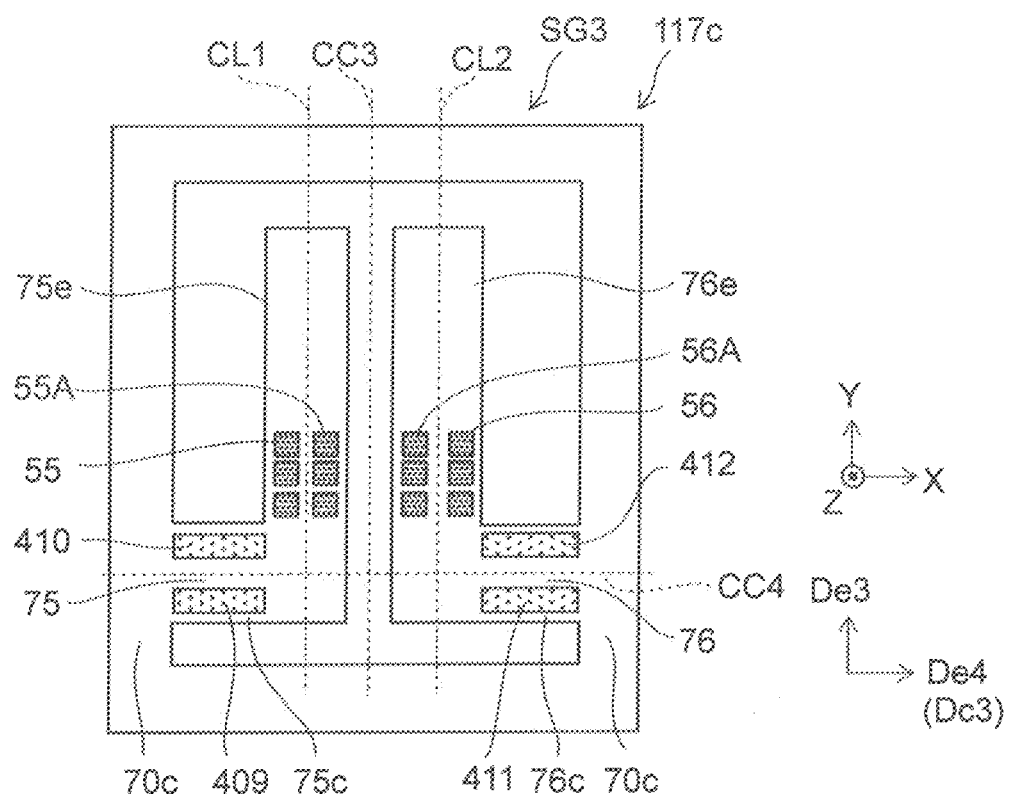
FIG. 22 is a schematic view illustrating another sensor according to the first embodiment.

FIG. 22 is a plan view, FIG. 23A to FIG. 23F are cross-sectional views, FIG. 24A to FIG. 24D are cross-sectional views of portions of the sensor.

FIG. 22 illustrates the third sensing group SG3 of the other sensor 117c according to the embodiment. The first sensing group SG1, the second sensing group SG2, and the controller 68 may be provided in the sensor 117c. These components are similar to those of the sensor 116. An example of the third sensing group SG3 will now be described.

As shown in FIG. 22, the third sensing group SG3 includes the third support portion 70c, the fifth movable portion 75, the sixth movable portion 76, the ninth to twelfth piezoelectric elements 409 to 412, the fifth magnetic element 55, and the sixth magnetic element 56. The magnetic element 55A and the magnetic element 56A are provided in the example. The magnetic element 55A and the magnetic element 56A may be omitted.

The fifth movable portion 75 is connected to the third support portion 70c. The third support portion 70c supports the fifth movable portion 75. The fifth movable portion 75 includes the first extension portion 75e and the first connection portion 75c.

The ninth piezoelectric element 409 is fixed to the first connection portion 75c.

Figure 23A:
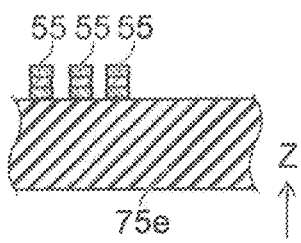
FIG. 23A to FIG. 23F are schematic views illustrating the other sensor according to the first embodiment.
Figure 23B:
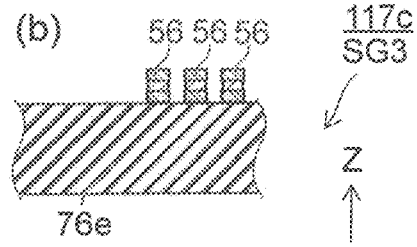
Figure 23C:
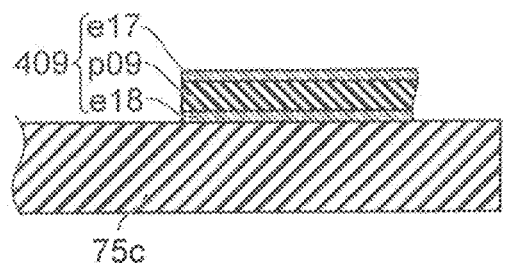

As shown in FIG. 23C, the ninth piezoelectric element 409 includes the seventeenth electrode e17, the eighteenth electrode e18, and the ninth piezoelectric layer p09. The eighteenth electrode e18 is provided between the seventeenth electrode e17 and the first connection portion 75c. The ninth piezoelectric layer p09 is provided between the seventeenth electrode e11 and the eighteenth electrode e18.

As shown in FIG. 22, the tenth piezoelectric element 410 is separated from the ninth piezoelectric element 409 in the third extension direction De3. The tenth piezoelectric element 410 is fixed to the first connection portion 75c.

Figure 23D:
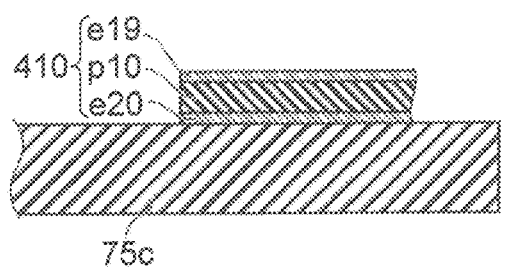

As shown in FIG. 23D, the tenth piezoelectric element 410 includes the nineteenth electrode e19, the twentieth electrode e20, and the tenth piezoelectric layer p10. The twentieth electrode e20 is provided between the nineteenth electrode e19 and the first connection portion 75c. The tenth piezoelectric layer p10 is provided between the nineteenth electrode e19 and the twentieth electrode e20.

As shown in FIG. 22 and FIG. 23A, the fifth magnetic element 55 is fixed to the first extension portion 75e.

Figure 24A:
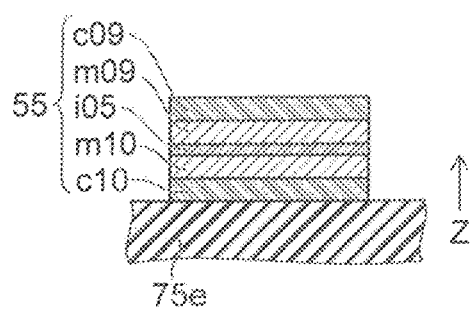
FIG. 24A to FIG. 24D are schematic views illustrating the other sensor according to the first embodiment.

As shown in FIG. 24A, the fifth magnetic element 55 includes the ninth magnetic layer m09, the tenth magnetic layer m10, and the fifth intermediate layer 105. The fifth intermediate layer i05 is provided between the ninth magnetic layer m09 and the tenth magnetic layer m10. The fifth Intermediate layer i05 is, for example, a nonmagnetic layer. In the example, the fifth magnetic element 55 includes the ninth conductive layer c09 and the tenth conductive layer c10. The magnetic layers recited above and the intermediate layers recited above are provided between these conductive layers. In the example, the direction connecting the ninth magnetic layer m09 and the tenth magnetic layer m10 is aligned with the Z-axis direction.

As shown in FIG. 22, the sixth movable portion 76 is connected to the third support portion 70c. The third support portion 70c supports the sixth movable portion 76. The sixth movable portion 76 includes the second extension portion 76e and the second connection portion 76c.

The eleventh piezoelectric element 411 is fixed to the second connection portion 76c.

Figure 23E:
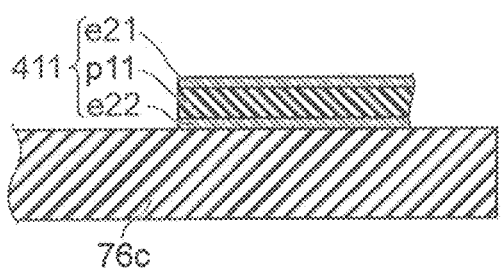

As shown in FIG. 23E, the eleventh piezoelectric element 411 includes the twenty-first electrode e21, the twenty-second electrode e22, and the eleventh piezoelectric layer p11. The twenty-second electrode e22 is provided between the twenty-first electrode e21 and the second connection portion 76c. The eleventh piezoelectric layer p11 is provided between the twenty-first electrode e21 and the twenty-second electrode e22.

As shown in FIG. 22, the twelfth piezoelectric element 412 is separated from the eleventh piezoelectric element 411 in the third extension direction De3 (in the example, the Y-axis direction). The twelfth piezoelectric element 412 is fixed to the second connection portion 76c.

Figure 23F:
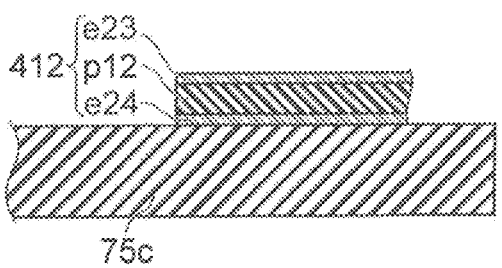

As shown in FIG. 23F, the twelfth piezoelectric element 412 includes the twenty-third electrode e23, the twenty-fourth electrode e24, and the twelfth piezoelectric layer p12. The twenty-fourth electrode e24 is provided between the twenty-third electrode e23 and the second connection portion 76c. The twelfth piezoelectric layer p12 is provided between the twenty-third electrode e23 and the twenty-fourth electrode e24.

Figure 24B:
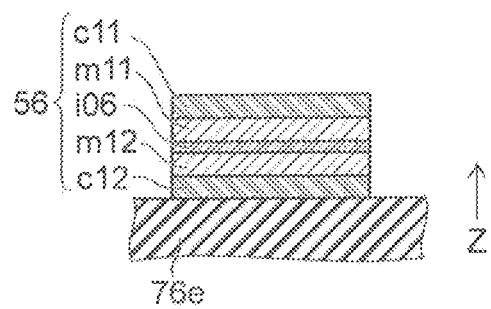

As shown in FIG. 22 and FIG. 24B, the sixth magnetic element 56 is fixed to the second extension portion 76e.

As shown in FIG. 248, the sixth magnetic element 56 includes the eleventh magnetic layer m11, the twelfth magnetic layer m12, and the sixth intermediate layer 106. The sixth intermediate layer 106 is provided between the eleventh magnetic layer m11 and the twelfth magnetic layer m12. The sixth intermediate layer 106 is, for example, a nonmagnetic layer. In the example, the sixth magnetic element 56 includes the eleventh conductive layer e11 and the twelfth conductive layer c12. The magnetic layers recited above and the intermediate layers recited above are provided between these conductive layers. In the example, the direction connecting the eleventh magnetic layer m11 and the twelfth magnetic layer m12 is aligned with the Z-axis direction.

As shown in FIG. 22, the magnetic element 55A is fixed to the first extension portion 75e. The direction from the fifth magnetic element 55 toward the magnetic element 55A is aligned with the third crossing direction Dc3. The first extension portion 75e has two end portions in the third crossing direction Dc3. The fifth magnetic element 55 is provided at one of the two end portions. The magnetic element 55A is provided at the other of the two end portions.

Figure 24C:
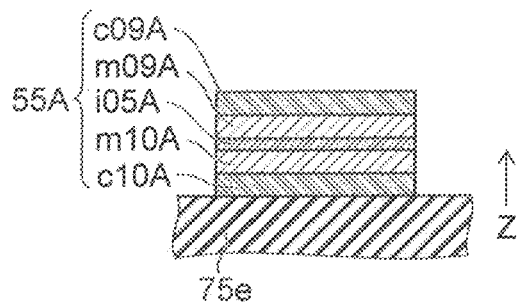

As shown in FIG. 24C, the magnetic element 55A includes the magnetic layer m09A, the magnetic layer m10A, and the intermediate layer i05A. The intermediate layer i05A is provided between the magnetic layer m09A and the magnetic layer m10A. The intermediate layer i05A is, for example, a nonmagnetic layer. In the example, the magnetic element 55A includes the conductive layer c09A and the conductive layer c10A. The magnetic layers recited above and the intermediate layers recited above are provided between these conductive layers. In the example, the direction connecting the magnetic layer m09A and the magnetic layer m10A is aligned with the Z-axis direction.

As shown in FIG. 22, the magnetic element 56A is fixed to the second extension portion 76e. The direction from the sixth magnetic element 56 toward the magnetic element 56A is aligned with the third crossing direction Dc3. The second extension portion 76e has two end portions in the third crossing direction Dc3. The sixth magnetic element 56 is provided at one of the two end portions. The magnetic element 56A is provided at the other of the two end portions.

Figure 24D:
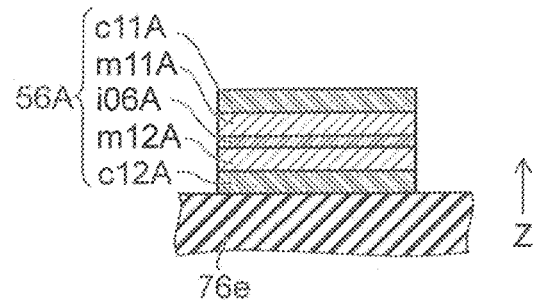

As shown in FIG. 24D, the magnetic element S6A includes the magnetic layer m11A, the magnetic layer m12A, and the intermediate layer i06A. The intermediate layer i06A is provided between the magnetic layer m11A and the magnetic layer m12A. The intermediate layer i06A is, for example, a nonmagnetic layer. In the example, the magnetic element 56A includes the conductive layer c11A and the conductive layer c12A. The magnetic layers recited above and the intermediate layers recited above are provided between these conductive layers. In the example, the direction connecting the magnetic layer m11A and the magnetic layer m12A is aligned with the Z-axis direction.

In the sensor 117c as well, high sensitivity is obtained.

Figure 25:
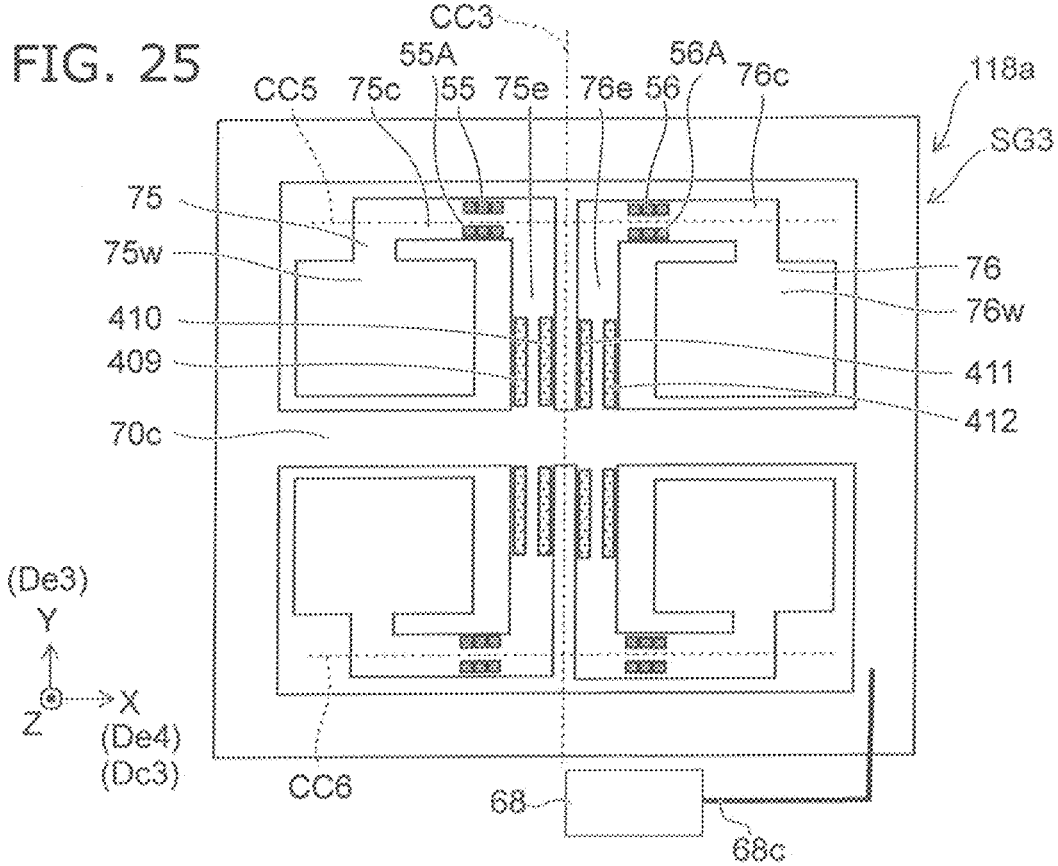
FIG. 25 is a schematic plan view illustrating another sensor according to the first embodiment.

FIG. 25 is a schematic plan view illustrating another sensor according to the first embodiment.

FIG. 25 illustrates the third sensing group SG3. In the sensor 118a, the first extension portion 75e is provided between the first connection portion 75c and the third support portion 70c. The fifth movable portion 75 includes a first weight portion 75w. The first connection portion 75c connects the first weight portion 75w to the first extension portion 75e. The size (the length in the direction of at least one of the X-axis direction, the Y-axis direction, or the Z-axis direction) of the first weight portion 75w is longer than the size (the length in the at least one of the directions) of the first connection portion 75c.

On the other hand, the second extension portion 76e is provided between the second connection portion 76c and the third support portion 70c. The sixth movable portion 76 includes a second weight portion 76w. The second connection portion 76c connects the second weight portion 76w to the second extension portion 76e. The size (the length in the direction of at least one of the X-axis direction, the Y-axis direction, or the Z-axis direction) of the second weight portion 76w is longer than the size (the length in the at least one of the directions) of the second connection portion 76c.

A set that includes the fifth movable portion 75 and the sixth movable portion 76 recited above is multiply provided in the sensor 118a. The third support portion 70c is provided between the multiple sets. The multiple sets have line symmetry having the third support portion 70c as an axis.

In the sensor 118a, when an external force (an angular velocity or an angular acceleration) rotating around the Z-axis direction as an axis is applied, changes of the electrical resistances corresponding to the external force occur in the fifth magnetic element 55 and the sixth magnetic element 56. It is possible to sense the external force by sensing the values corresponding to the changes of the electrical resistances. For example, the first drive force Db1 and the second drive force Db2 have X-axis direction components. For example, the first force Fc1 and the second force Fc2 have Y-axis direction components.

At least one of the first sensing group SG1 or the second sensing group SG2 also may be provided with such a third sensing group SG3.

The magnetic element 55A and the magnetic element 56A are further provided in the sensor 118a. The magnetic element 55A is fixed to the first connection portion 75c. The magnetic element 56A is fixed to the second connection portion 76c.

The first connection portion 75c and the second connection portion 76c are substantially symmetric with respect to a connection portion central axis CC5. The first connection portion 75c has two end portions in the third extension direction De3. The fifth magnetic element 55 is provided at one of the two end portions. The magnetic element 55A is provided at the other of the two end portions. The second connection portion 76c has two end portions in the third extension direction De3. The sixth magnetic element 56 is provided at one of the two end portions. The magnetic element 56A is provided at the other of the two end portions. These magnetic elements are provided at positions where a large strain is generated according to the external force. High sensitivity is obtained.

The polarities of the signals obtained by the fifth magnetic element 55 and the magnetic element 55A are mutually-reversed. The polarities of the signals obtained by the sixth magnetic element 55 and the magnetic element 56A are mutually-reversed. High sensitivity is obtained by utilizing the difference of these signals.

Other connection portions are provided at positions symmetric to the first connection portion 75c and the second connection portion 76c with the X-axis direction as an axis. These connection portions are substantially symmetric with respect to the central axis (a connection portion central axis CC6). Other magnetic elements are provided on two sides of the connection portion central axis CC6.

In the sensor 118a, for example, the first extension portion 75e and the second extension portion 76e are substantially symmetric with respect to the third movable central axis CC3. For example, these movable portions vibrate with substantially the same amplitude with reversed phases. For example, high sensitivity is obtained.

Figure 26:
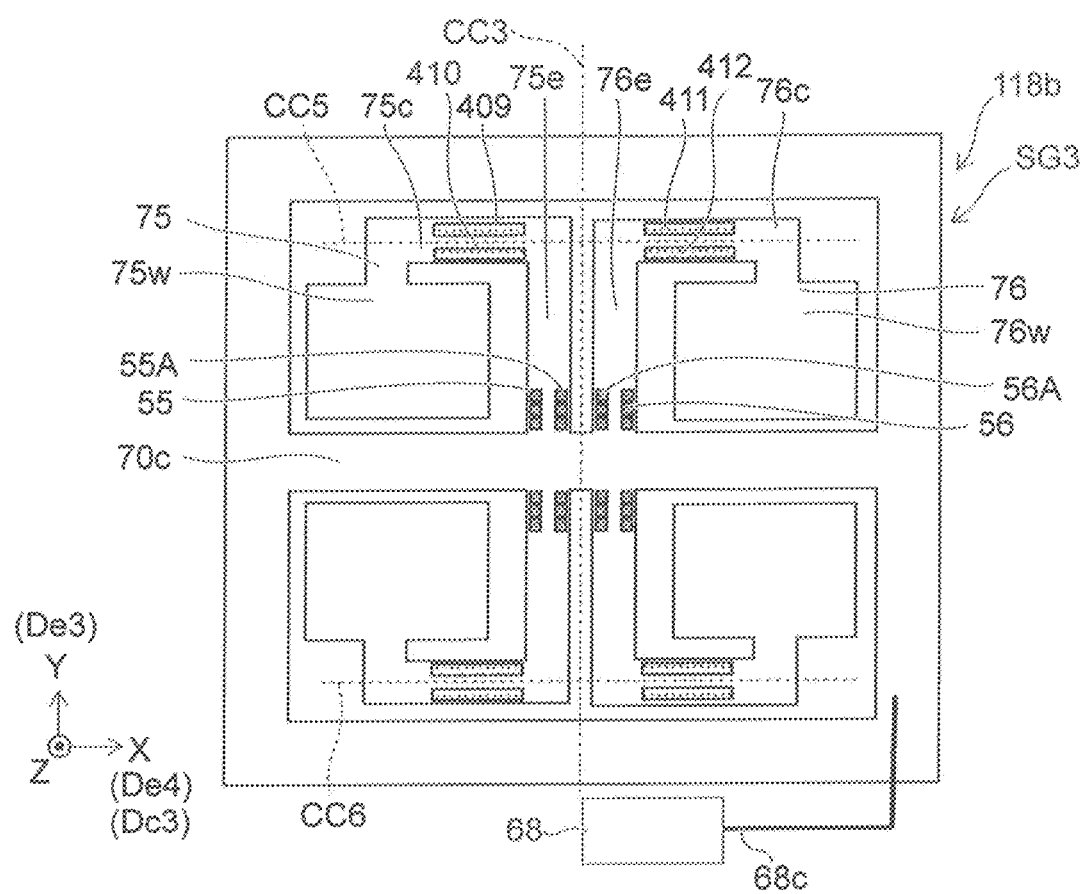
FIG. 26 is a schematic plan view illustrating another sensor according to the first embodiment.

FIG. 26 is a schematic plan view illustrating another sensor according to the first embodiment.

FIG. 26 illustrates the third sensing group SG3. In the sensor 118b, the fifth magnetic element 55 and the magnetic element 55A are provided at the first extension portion 75e. The sixth magnetic element 56 and the magnetic element 56A are provided at the second extension portion 76e. The ninth piezoelectric element 409 and the tenth piezoelectric element 410 are provided at the first connection portion 75c. The eleventh piezoelectric element 411 and the twelfth piezoelectric element 412 are provided at the second connection portion 76c, High sensitivity is obtained in the sensor 118b as well.

FIG. 27A to FIG. 27D are schematic views illustrating another sensor according to the first embodiment.

FIG. 27A is a plan view, FIG. 27B is a line A1-A2 cross-sectional view of FIG. 27A, FIG. 27C and FIG. 27D are cross-sectional views of portions of the sensor.

As shown in FIG. 27A, the third sensing group SG3 is provided in the sensor 118c. In the embodiment, the third sensing group SG3 may be provided without providing the first sensing group SG1. The third sensing group SG3 may be provided without providing the second sensing group SG2.

The third sensing group SG3 of the example includes the third support portion 70c, the fifth to seventh movable portions 75 to 77, a fifth movable connection portion 75P, a sixth movable connection portion 76P, the ninth to twelfth piezoelectric elements 409 to 412, the fifth magnetic element 55, and the sixth magnetic element 56.

The fifth movable portion 75 extends in the third extension direction De3. In the example, the third extension direction De3 is the Y-axis direction.

The fifth movable connection portion 75P extends along the third crossing direction Dc3. The third crossing direction Dc3 crosses the third extension direction De3. The fifth movable connection portion 75P connects the fifth movable portion 75 to the third support portion 70c.

As shown in FIG. 27B, the ninth piezoelectric element 409 is fixed to the fifth movable portion 75. The ninth piezoelectric element 409 includes the seventeenth electrode e17, the eighteenth electrode e18, and the ninth piezoelectric layer p09. The eighteenth electrode e18 is provided between the seventeenth electrode e17 and the fifth movable portion 75. The ninth piezoelectric layer p09 is provided between the seventeenth electrode e17 and the eighteenth electrode e18.

The tenth piezoelectric element 410 is separated from the ninth piezoelectric element 409 in the third crossing direction Dc3. The third crossing direction Dc3 crosses the third extension direction De3. In the example, the third crossing direction Dc3 is the X-axis direction. The tenth piezoelectric element 410 is fixed to the fifth movable portion 75. The tenth piezoelectric element 410 includes the nineteenth electrode e19, the twentieth electrode e20, and the tenth piezoelectric layer p10. The twentieth electrode e20 is provided between the nineteenth electrode e19 and the fifth movable portion 75. The tenth piezoelectric layer p10 is provided between the nineteenth electrode e19 and the twentieth electrode e20.

The sixth movable portion 76 extends in the third extension direction De3 (in the example, the Y-axis direction). In the example, the direction connecting the fifth movable portion 75 and the sixth movable portion 76 is aligned with the X-axis direction.

The sixth movable connection portion 76P extends along the third crossing direction Dc3. The sixth movable connection portion 76P connects the sixth movable portion 76 to the third support portion 70c. At least a portion of the third support portion 70c is positioned between the fifth movable connection portion 75P and the sixth movable connection portion 76P in the third crossing direction Dc3.

As shown in FIG. 27B, the eleventh piezoelectric element 411 is fixed to the sixth movable portion 76. The eleventh piezoelectric element 411 includes the twenty-first electrode e21, the twenty-second electrode e22, and the eleventh piezoelectric layer p11. The twenty-second electrode e22 is provided between the twenty-first electrode e21 and the sixth movable portion 76. The eleventh piezoelectric layer p11 is provided between the twenty-first electrode e21 and the twenty-second electrode e22.

The twelfth piezoelectric element 412 is separated from the eleventh piezoelectric element 411 in the third crossing direction Dc3 (in the example, the X-axis direction). The twelfth piezoelectric element 412 is fixed to the sixth movable portion 76. The twelfth piezoelectric element 412 includes the twenty-third electrode e23, the twenty-fourth electrode e24, and the twelfth piezoelectric layer p12. The twenty-fourth electrode e24 is provided between the twenty-third electrode e23 and the sixth movable portion 76. The twelfth piezoelectric layer p12 is provided between the twenty-third electrode e23 and the twenty-fourth electrode e24.

As shown in FIG. 27A, the seventh movable portion 77 is connected to the third support portion 70c. The third support portion 70c supports the seventh movable portion 77. The seventh movable portion 77 extends in the third extension direction De3 (in the example, the Y-axis direction). The position of the seventh movable portion 77 in the third crossing direction Dc3 (in the example, the X-axis direction) is between the position of the fifth movable portion 75 in the third crossing direction Dc3 and the position of the sixth movable portion 76 in the third crossing direction Dc3. The seventh movable portion 77 includes a first movable region 77a and a second movable region 77b. The second movable region 77b is between the first movable region 77a and the sixth movable portion 76.

As shown in FIG. 27A and FIG. 27B, the fifth magnetic element 55 is fixed to the first movable region 77a.

As shown in FIG. 27C, the fifth magnetic element 5 includes the ninth magnetic layer m09, the tenth magnetic layer m10, and the fifth intermediate layer i05. The fifth intermediate layer i05 is provided between the ninth magnetic layer m09 and the tenth magnetic layer m10. The fifth intermediate layer i05 is, for example, a nonmagnetic layer. In the example, the direction connecting the ninth magnetic layer m09 and the tenth magnetic layer m10 is aligned with the Z-axis direction.

As shown in FIG. 27A and FIG. 27B, the sixth magnetic element 56 is fixed to the second movable region 77b.

As shown in FIG. 27D, the sixth magnetic element 55 includes the eleventh magnetic layer m11, the twelfth magnetic layer m12, and the sixth intermediate layer i06. The sixth intermediate layer i06 is provided between the eleventh magnetic layer m11 and the twelfth magnetic layer m12. The sixth intermediate layer i06 is, for example, a nonmagnetic layer.

The controller 68 may be provided in the example as well. The controller 68 is electrically connected to the ninth to twelfth piezoelectric elements 409 to 412, the fifth magnetic element 55, and the sixth magnetic element 56 via the third interconnect group 68c.

In the sensor 118c, the fifth movable portion 75 and the sixth movable portion 76 deform due to the signals applied to the ninth to twelfth piezoelectric elements 409 to 412. For example, the first drive force Db1 is applied to the fifth movable portion 75; and the second drive force Db2 is applied to the sixth movable portion 76. For example, these drive forces have X-axis direction components. When an external force (an angular velocity or an angular acceleration) rotating around the Y-axis direction as an axis is applied, the first force Fc1 is applied to the fifth movable portion 75; and the second force Fc2 is applied to the sixth movable portion 76. The directions of the first force Fc1 and the second force Fc2 have Y-axis direction components. The direction of the first force Fc1 is the reverse of the direction of the second force Fc2. Thereby, a twisting force (a force Fc2a) is generated in the seventh movable portion 77. Thereby, strain is generated in the fifth magnetic element 55 and the sixth magnetic element 56. The directions of the strain generated in these magnetic elements are mutually-reversed.

In the example, a movable portion that is symmetric with the X-axis direction as an axis of symmetry is provided for each of the fifth to seventh movable portions 75 to 77. A force Fc1a is applied to the movable portion symmetric with the seventh movable portion 77. The force Fc1a and the force Fc2a have X-axis direction components. The direction of the force Fc1a is the reverse of the direction of the force Fc2a.

Highly-sensitive sensing is possible in the sensor 118c as well.

The configuration, materials, etc., described in reference to the first support portion 70a, the first movable portion 71, the second movable portion 72, the first to fourth piezoelectric elements 401 to 404, the first magnetic element 51, and the second magnetic element 52 are applicable respectively to the third support portion 70c, the fifth to seventh movable portions 75 to 77, the ninth to twelfth piezoelectric elements 409 to 412, the fifth magnetic element 55, and the sixth magnetic element 56. The operations described in reference to the first to fourth piezoelectric elements 401 to 404, the first magnetic element 51, and the second magnetic element 52 are applicable to the ninth to twelfth piezoelectric elements 409 to 412, the fifth magnetic element 55, and the sixth magnetic element 56.

In the example, the fifth movable portion 75 is substantially symmetric with respect to a central axis CD1. In the example, the sixth movable portion 76 is substantially symmetric with respect to a central axis CD2. The fifth movable portion 75 and the sixth movable portion 76 are substantially symmetric with respect to a central axis CE1. These movable portions vibrate with substantially the same amplitude with reversed phases. For example, high sensitivity is obtained.

The seventh movable portion 77 has two end portions in the third crossing direction Dc3. The fifth magnetic element 55 is provided at one of the two end portions. The sixth magnetic element 56 is provided at the other of the two end portions. These magnetic elements are provided at positions where a large strain is generated according to the external force. High sensitivity is obtained. The polarities of the signals obtained by these magnetic elements are mutually-reversed. High sensitivity is obtained by utilizing the difference of these signals.

Second Embodiment

FIG. 28, FIG. 29, FIG. 30A to FIG. 30E, FIG. 31A to FIG. 31D, FIG. 32A to FIG. 32D, and FIG. 33A to FIG. 33H are schematic views illustrating a sensor according to a second embodiment.

Figure 28:
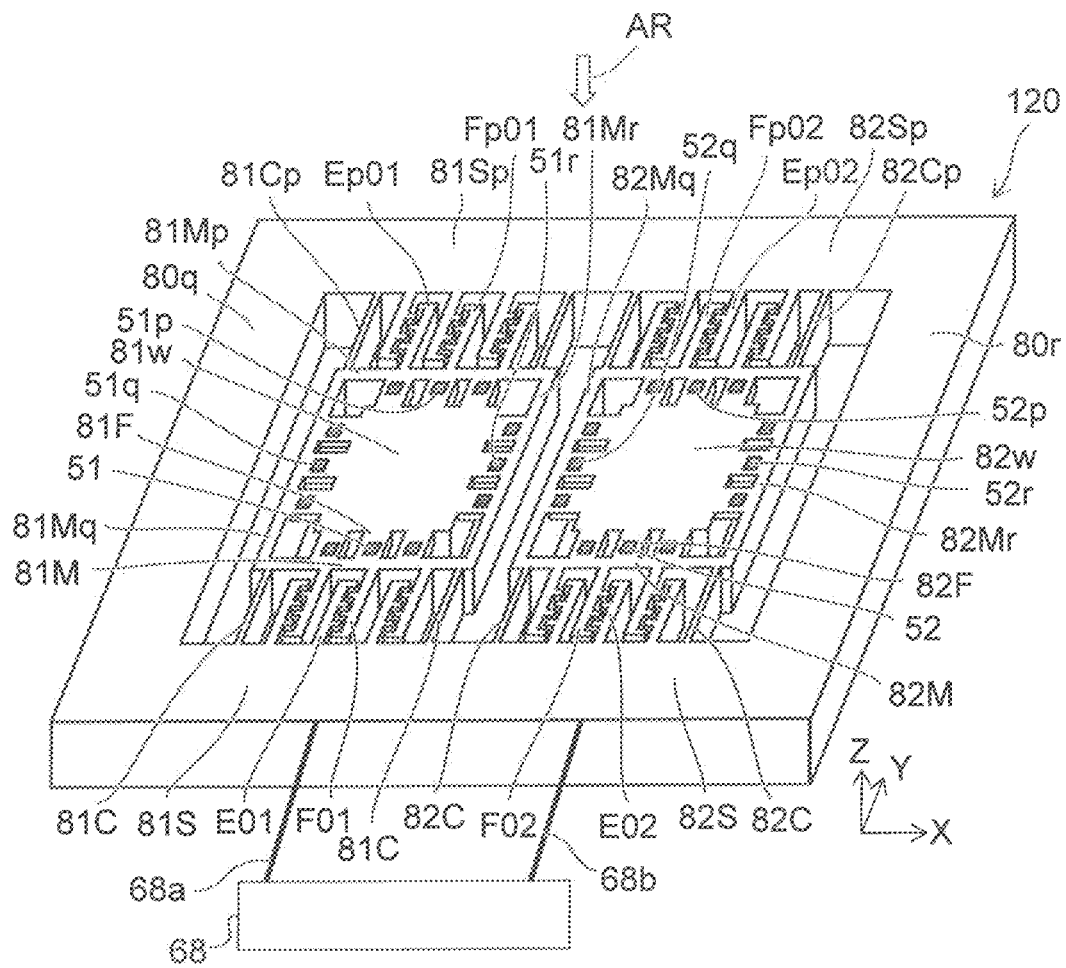
FIG. 28 is a schematic view illustrating a sensor according to a second embodiment.
Figure 29:
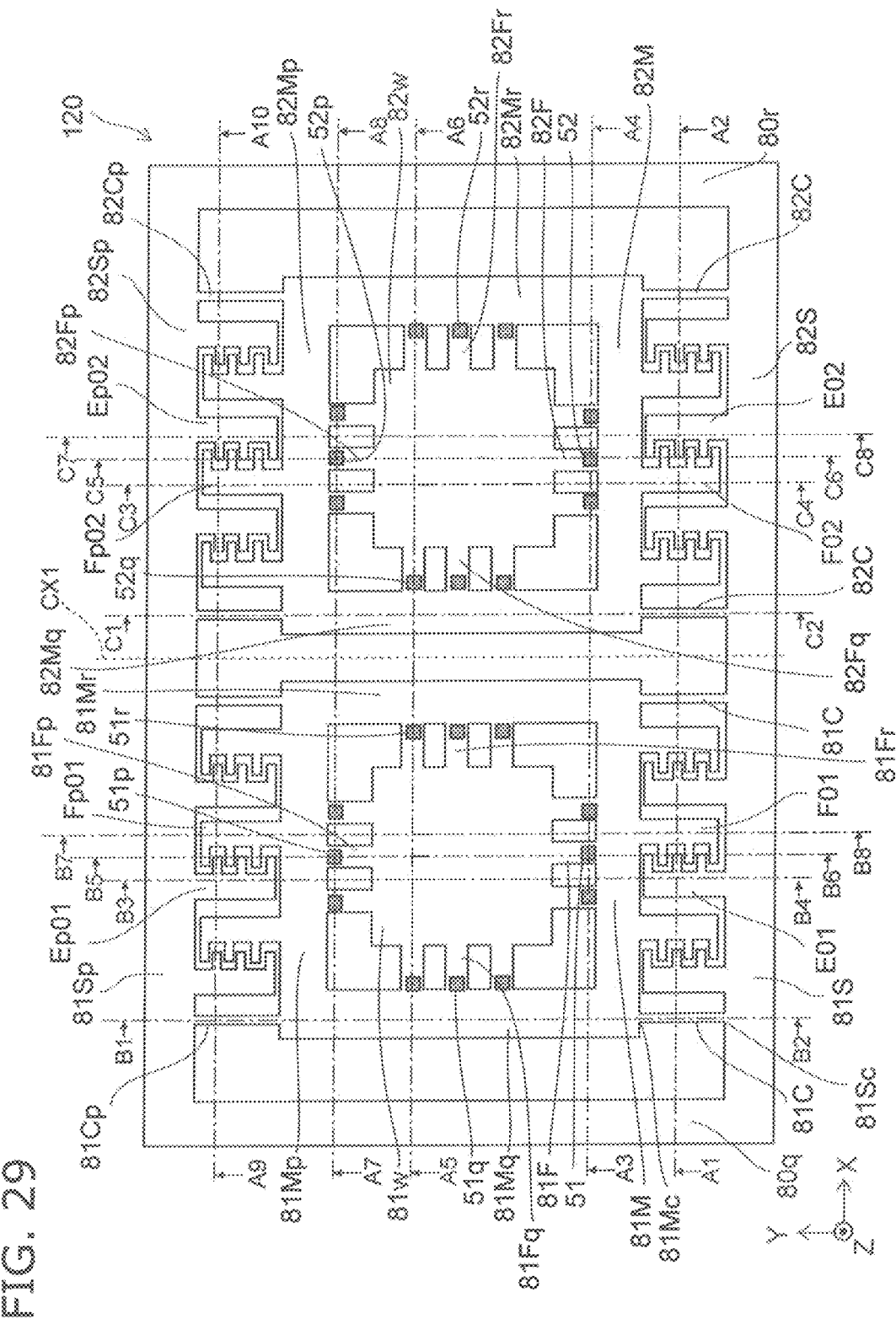
FIG. 29 is a schematic view illustrating the sensor according to the second embodiment.

FIG. 28 is a perspective view, FIG. 29 is a plan view as viewed from an arrow AR of FIG. 28, FIG. 30A to FIG. 30E are cross-sectional views corresponding respectively to line A9-A10, line A7-A8, line A5-A6, line A3-A4, and line A1-A2 of FIG. 29, FIG. 31A to FIG. 31D are cross-sectional views corresponding respectively to line B1-B2, line B3-B4, line B5-B6, and line B7-B8 of FIG. 29, FIG. 32A to FIG. 32D are cross-sectional views corresponding respectively to line C1-C2, line C3-C4, line C5-C6, and line C7-C8 of FIG. 29, FIG. 33A to FIG. 33H are cross-sectional views of portions of the sensor.

As shown in FIG. 28 and FIG. 29, the sensor 120 according to the embodiment includes a first support portion 81S, a first intermediate body 81M, a first connecting body 81C, a first support portion-side electrode E01, a first counter-electrode F01, a first film 81F, and the first magnetic element 51.

The first connecting body 81C is connected to the first support portion 81S and the first intermediate body 81M between the first support portion 81S and the first intermediate body 81M.

The first support portion-side electrode E01 is connected to the first support portion 81S. The first counter electrode F01 is connected to the first intermediate body 81M and opposes the first support portion-side electrode E01. For example, a space is provided between the first support portion-side electrode E01 and the first counter electrode F01. A gas is provided in the space. The space may be depressurized. For example, a liquid is not provided between the first support portion-side electrode E01 and the first counter electrode F01. Protective films may be provided at the first support portion-side electrode E01 and at the first counter electrode F01.

As shown in FIG. 28, the first counter electrode F01 and the first support portion-side electrode E01 may have structures of, for example, comb tooth-shaped counter electrodes. The first counter electrode F01 and the first support portion-side electrode E01 may have structures of, for example, comb drive electrodes. The first counter electrode F01 and the first support portion-side electrode E01 may have structures of plate-plate electrodes.

The first film 81F is connected to the first intermediate body 81M. The first film 81F is deformable.

Figure 33A:
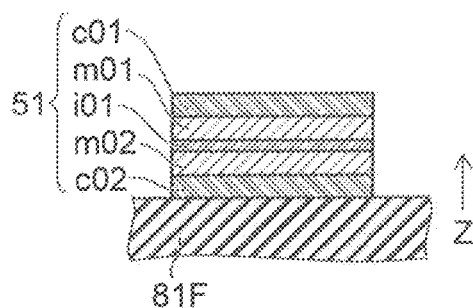
FIG. 33A to FIG. 33H are schematic views illustrating the sensor according to the second embodiment.

As shown in FIG. 33A, the first magnetic element 51 is fixed to the first film 81F. The first magnetic element 51 includes the first magnetic layer m01, the second magnetic layer m02, and the first intermediate layer 101. The first intermediate layer 101 is provided between the first magnetic layer m01 and the second magnetic layer m02. The first intermediate layer 101 is, for example, a nonmagnetic layer. In the example, these magnetic layers are provided between the first conductive layer c01 and the second conductive layer c01.

As shown in FIG. 29, the first support portion 81S includes a first support portion connection region 81Sc. The first support portion connection region 81Sc is connected to the first connecting body 81C. The first intermediate body 81M includes a first intermediate body connection region 81Mc. The first intermediate body connection region 81Mc is connected to the first connecting body 81C. The direction connecting the first support portion connection region 81Sc and the first intermediate body connection region 81Mc is aligned with a first direction.

The first direction is taken as the Y-axis direction. One direction perpendicular to the Y-axis direction is taken as the X-axis direction. A direction perpendicular to the Y-axis direction and the X-axis direction is taken as the Z-axis direction.

When a voltage is applied between the first support portion-side electrode E01 and the first counter electrode F01, for example, an electrostatic force is generated between these electrodes. Thereby, the first intermediate body 81M moves relative to the first support portion 81S. The direction of the movement has an X-axis direction component. In the case where the voltage is alternating current, the first intermediate body 81M vibrates relative to the first support portion 81S. The vibration has a component along the X-axis direction.

On the other hand, an external force (e.g., an angular velocity or an angular acceleration) is applied to the sensor 120 in this state. For example, the external force has a component rotating around the Y-axis direction as an axis. Thereby, a force is applied to the first film 81F. For example, the force has a Z-axis direction component. For example, the force is based on the Coriolis force.

Thereby, the electrical resistance of the first magnetic element 51 changes. This is based on the magnetic properties (e.g., the inverse magnetostrictive effect, the magnetoresistance effect, etc.) of the first magnetic element 51. The external force that is applied can be sensed by sensing a value (at least one of the electrical resistance, the voltage, or the current) corresponding to the electrical resistance of the first magnetic element 51.

In the sensor 120, the movement (the driving) of the first intermediate body 81M relative to the first support portion 81S is based on the voltage applied between the first support portion-side electrode E01 and the first counter electrode F01, The relative movement is based on an electrostatic force. On the other hand, the sensing of the force caused by the external force is based on the magnetic properties of the first magnetic element 51. The sensing is performed based on multiple different types of effects. The driving and the sensing are separated.

Therefore, for example, a configuration that is appropriate for relative movement can be employed. For example, the electrodes, the first connecting body 81C, etc., recited above can be designed appropriately for the relative movement. For example, as described below, the configurations of the electrodes recited above, the length, thickness, and width of the first connecting body 81C, etc., can be designed appropriately for the relative movement. On the other hand, a configuration that is appropriate for the sensing can be employed. For example, the first film 81F and the first magnetic element 51 can be designed appropriately for the sensing. The configuration for the relative movement and the configuration for the sensing are independent from each other. Therefore, the sensitivity can be higher.

For example, a reference example may be considered in which the relative movement is based on an electrostatic force, and the sensing is based on the electrostatic force. However, in the reference example, it is difficult to obtain highly-sensitive sensing using the electrostatic force simultaneously with effectively causing relative movement by the electrostatic force. On the other hand, a reference example may be considered in which the relative movement is based on magnetic properties, and the sensing also is based on the magnetic properties. However, in the reference example, it is difficult to obtain sufficient relative movement based on the magnetic properties.

Conversely, in the embodiment, the relative movement is based on the electrostatic force; and the sensing is based on the magnetic properties. The sensing is performed based on multiple different types of effects. Thereby, a sensor can be provided in which the sensitivity can be increased.

As shown in FIG. 28, the sensor 120 may include the controller 68. For example, the voltage that is applied between the first support portion-side electrode E01 and the first counter electrode F01 is supplied from the controller 68 via the first interconnect group 68a. For example, the value that corresponds to the electrical resistance of the first magnetic element 51 may be sensed by the controller 68 via interconnects (included in, for example, the first interconnect group 68a) electrically connected respectively to the first magnetic layer m01 and the second magnetic layer m02.

In the example as shown in FIG. 28 and FIG. 29, the sensor 120 further includes a second support portion 82S, a second intermediate body S2M, a second connecting body 82C, a second support portion-side electrode E02, a second counter electrode F02, a second film 82F, and the second magnetic element 52.

In the example, the second support portion 82S is continuous with the first support portion 81S. These support portions may be separated from each other. It is favorable for these support portions to be continuous with each other. Thereby, the states (the states of the vibration, etc.) of these support portions are substantially the same; and the noise is suppressed. A portion of the structure body used to form the first support portion 81S may be used to form the second support portion 82S. The direction connecting the first support portion 81S and the second support portion 82S is arbitrary.

The second connecting body 82C is connected to the second support portion 82S and the second intermediate body 82M between the second support portion 82S and the second intermediate body 82M.

The direction connecting the second support portion 82S and the second intermediate body 82M is aligned with the direction connecting the first support portion 81S and the first intermediate body 81M (e.g., the first direction, e.g., the Y-axis direction).

The second support portion-sloe electrode E02 is connected to the second support portion 82S. The second counter electrode F02 is connected to the second intermediate body 82M and opposes the second support portion-side electrode E02.

The second film 82F is connected to the second intermediate body 82M and is deformable.

Figure 33B:
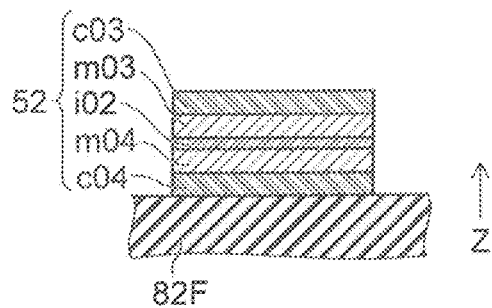

As shown in FIG. 33B, the second magnetic element 52 is fixed to the second film 82F. The second magnetic element 52 includes the third magnetic layer m03, the fourth magnetic layer m04, and the second intermediate layer i02. The second intermediate layer i02 is provided between the third magnetic layer m03 and the fourth magnetic layer m04. The second intermediate layer i02 is, for example, a nonmagnetic layer. In the example, these magnetic layers are provided between the third conductive layer c03 and the fourth conductive layer c04.

For example, a voltage is applied between the second support portion-side electrode E02 and the second counter electrode F02. For example, the application of the voltage is performed by the controller 68 via the second interconnect group 68b. The electrical resistance of the second magnetic element 52 changes according to the external force. A value that corresponds to the change of the electrical resistance is sensed. The sensing may be performed by the controller 68 via the second interconnect group 68b.

Highly-sensitive sensing is possible also for the portions including the second support portion 82S, the second intermediate body 82M, the second connecting body 82C, the second support portion-side electrode E02, the second counter electrode F02, the second film 82F, and the second magnetic element 52.

In the example, the direction connecting the first magnetic element 51 and the second magnetic element 52 is aligned with the X-axis direction.

Magnetic elements other than these magnetic elements are further provided. As shown in FIG. 28 and FIG. 29, the sensor 120 includes a support portion 81Sp, an intermediate body 81Mp, a connecting body 81Cp, a support portion-side electrode Ep01, a counter electrode Ep01, a film 81Fp, and a magnetic element 51p. The group that includes the support portion 81Sp, the intermediate body 81Mp, the connecting body 81Cp, the support portion-side electrode Ep01, the counter electrode Fp01, the film 81Fp, and the magnetic element Sip has line symmetry, with the Y-axis direction as an axis, with the group including the first support portion 81S, the first intermediate body 81M, the first connecting body 81C, the first support portion-side electrode E01, the first counter electrode F01, the first film 81F, and the first magnetic element 51. The configurations of the components included in the latter group are applicable respectively to the components included in the former group.

Figure 33C:
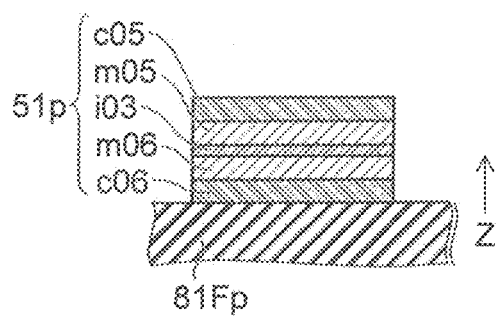

For example, as shown in FIG. 33C, the magnetic element 51p is fixed to the film 81Fp. The magnetic element 51p includes the fifth magnetic layer m05, the sixth magnetic layer m06, and the third intermediate layer i03. The third intermediate layer i03 is provided between the fifth magnetic layer m05 and the sixth magnetic layer m06. The third intermediate layer i03 is, for example, a nonmagnetic layer. In the example, these magnetic layers are provided between the fifth conductive layer c05 and the sixth conductive layer c05.

As shown in FIG. 28 and FIG. 29, the sensor 120 includes a support portion 82Sp, an intermediate body 82Mp, a connecting body 32Cp, a support portion-side electrode Ep02, a counter electrode Fp02, a film 82Fp, and a magnetic element 52p. The group that includes the support portion 82Sp, the intermediate body 82Mp, the connecting body 82Cp, the support portion-side electrode Ep02, the counter electrode Fp02, the film 82Fp, and the magnetic element 52p has line symmetry, with the Y-axis direction as an axis, with the group including the second support portion 82S, the second intermediate body 82M, the second connecting body 82C, the second support portion-side electrode E02, the second counter electrode FG2, the second film 82F, and the second magnetic element 52. The configurations of the components included in the latter group are applicable respectively to the components included in the former group.

Support portion structure bodies 80q and 80r are provided in the example. The first support portion 81S and the support portion 81Sp are connected by these support portion structure bodies. The second support portion 82S and the support portion 82Sp are connected by these structure bodies, A structure body that has a frame-like configuration is formed of these support portions and support portion structure bodies. The support portions are stable. The strength of the support portions increases.

Figure 33D:
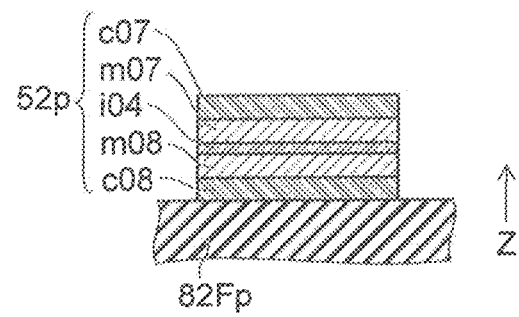

For example, as shown in FIG. 33D, the magnetic element 52p is fixed to the film 82Fp. The magnetic element 52p includes the seventh magnetic layer m07, the eighth magnetic layer m08, and the fourth intermediate layer i04. The fourth intermediate layer i04 is provided between the seventh magnetic layer m07 and the eighth magnetic layer m08. The fourth intermediate layer i04 is, for example, a nonmagnetic layer. In the example, these magnetic layers are provided between the seventh conductive layer c07 and the eighth conductive layer c08.

In the example as shown in FIG. 28 and FIG. 29, the first film 81F, the film 81Fp, etc., are provided between the first support portion 81S and the support portion 81Sp. A first weight portion 81w is provided in the example. The first weight portion 81w is connected to the first film 81F. The first film 81F is provided between the first weight portion 81w and the first intermediate body 81M.

On the other hand, an intermediate body 81Mq and an intermediate body 81Mr are further provided. These intermediate bodies are provided between the first support portion 81S and the support portion 81Sp in the Y-axis direction. These intermediate bodies are connected respectively to the first intermediate body 81Fq and the intermediate body 81Mp.

A film 81Fq is provided between the intermediate body 81Mq and the first weight portion 81w. A film 81Fr is provided between the intermediate body 81Mr and the first weight portion 81w.

Figure 33E:
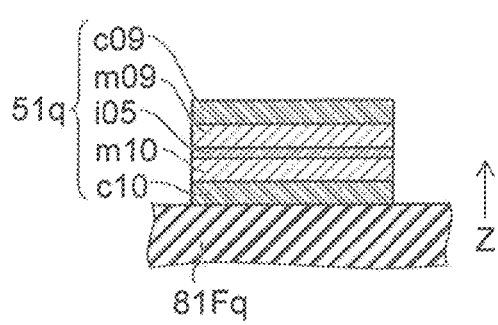

As shown in FIG. 33E, a magnetic element 51q is fixed to the film 81Fq. The magnetic element 51q includes the ninth magnetic layer m09, the tenth magnetic layer m10, and the fifth intermediate layer 105. The fifth intermediate layer 105 is provided between the ninth magnetic layer m09 and the tenth magnetic layer m10. The fifth intermediate layer 105 is, for example, a nonmagnetic layer. In the example, these magnetic layers are provided between the ninth conductive layer c09 and the tenth conductive layer c10.

Figure 33F:
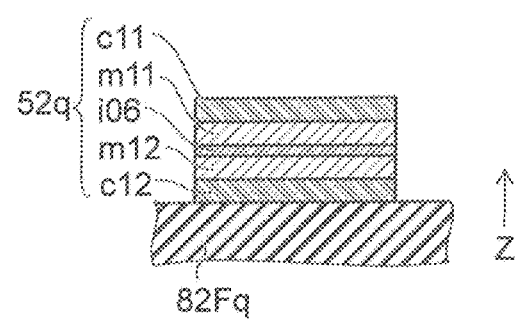
Figure 33G:
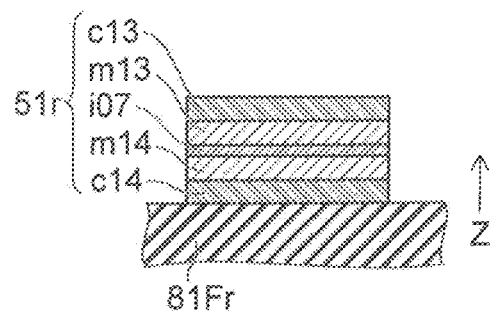

As shown in FIG. 33G, a magnetic element 51r is fixed to the film 81Fr. The magnetic element 51r includes a thirteenth magnetic layer m13, a fourteenth magnetic layer m14, and a seventh intermediate layer i07. The seventh intermediate layer i07 is provided between the thirteenth magnetic layer m13 and the fourteenth magnetic layer m14. The seventh intermediate layer i07 is, for example, a nonmagnetic layer. In the example, these magnetic layers are provided between a thirteenth conductive layer c13 and a fourteenth conductive layer c14.

In the example as shown in FIG. 28 and FIG. 29, the second film 82F, the film 82Fp, etc., are provided between the second support portion 82S and the support portion 82Sp. A second weight portion 82w is provided in the example. The second weight portion 82w is connected to the second film 82F The second film 82F is provided between the second weight portion 82w and the second intermediate body 82M.

On the other hand, an intermediate body 82Mq and an intermediate body 82Mr are further provided. These intermediate bodies are provided between the second support portion 82S and the support portion 82Sp in the Y-axis direction. These intermediate bodies are connected respectively to the second intermediate body 82M and the intermediate body 82Mp.

A film 82Fq is provided between the intermediate body 82Mq and the second weight portion 82w. A film 82Fr is provided between the intermediate body S2Mr and the second weight portion 82w.

As shown in FIG. 33F, a magnetic element 52q is fixed to the film 82Fq. The magnetic element 52q includes the eleventh magnetic layer m11, the twelfth magnetic layer m12, and the sixth intermediate layer 106. The sixth intermediate layer 106 is provided between the eleventh magnetic layer m11 and the twelfth magnetic layer m12. The sixth intermediate layer 106 is, for example, a nonmagnetic layer. In the example, these magnetic layers are provided between the eleventh conductive layer c11 and the twelfth conductive layer c12.

Figure 33H:
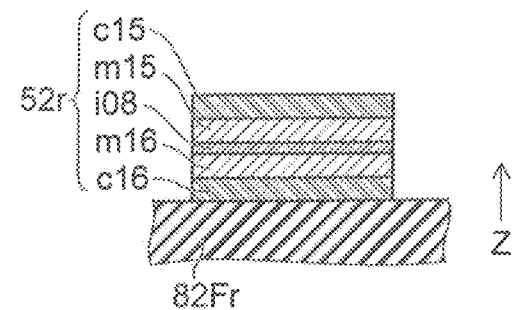

As shown in FIG. 33H, a magnetic element 52r is fixed to the film 82Fr. The magnetic element 52r includes a fifteenth magnetic layer m15, a sixteenth magnetic layer m16, and an eighth intermediate layer i08. The eighth intermediate layer i08 is provided between the fifteenth magnetic layer m15 and the sixteenth magnetic layer m16. The eighth intermediate layer i08 is, for example, a nonmagnetic layer. In the example, these magnetic layers are provided between a fifteenth conductive layer c15 and a sixteenth conductive layer c16.

In the sensor 120, an elastic member (e.g., a spring or the like) that is connected to the first intermediate body SN and the second intermediate body 82M between the first intermediate body 81M and the second intermediate body 82M may be provided. For example, the vibrations of the reversed phases of the first intermediate body 81M and the second intermediate body 82M are stabilized.

In the example as shown in FIG. 28, the thicknesses of the connecting bodies are wider than the widths of the connecting bodies. Examples of this configuration will now be described.

As described above, the direction connecting the first support portion connection region 81Sc of the first support portion 81S and the first intermediate body connection region 81Mc of the first intermediate body 81M is taken as the first direction. In the example, the first direction is the Y-axis direction. On the other hand, the direction connecting the first magnetic layer m01 and the second magnetic layer m02 is taken as the third direction. In the example, the third direction is the Z-axis direction (referring to FIG. 33A). A direction that crosses the first direction and the third direction is taken as a second direction. The second direction is, for example, the X-axis direction.

Figure 30A:
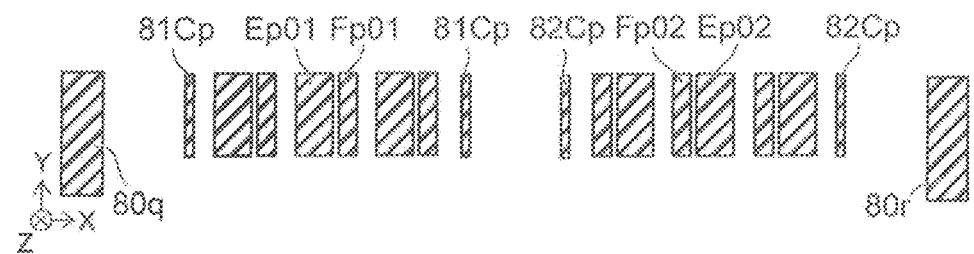
FIG. 30A to FIG. 30E are schematic views illustrating the sensor according to the second embodiment.
Figure 30B:
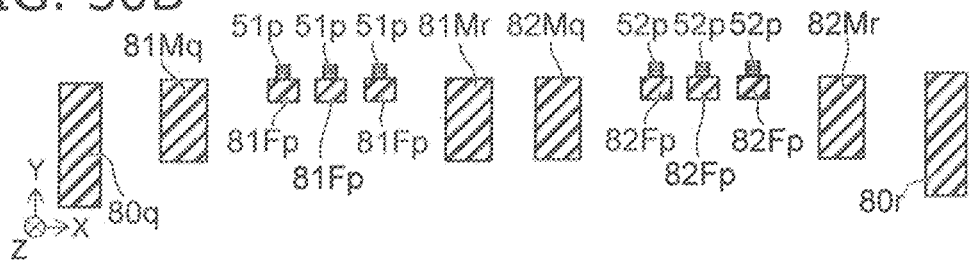
Figure 30C:
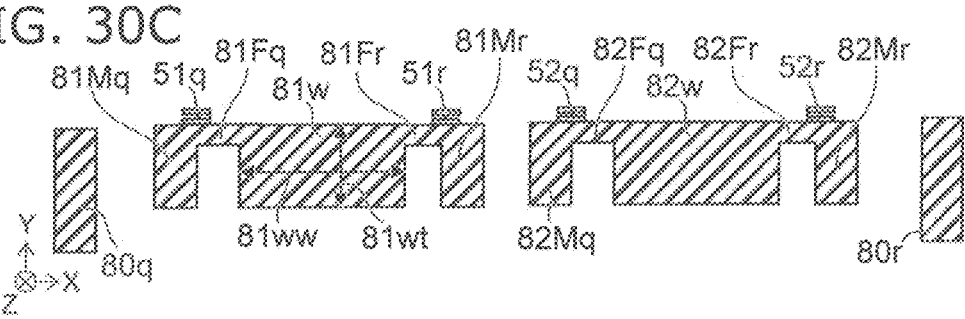
Figure 30D:
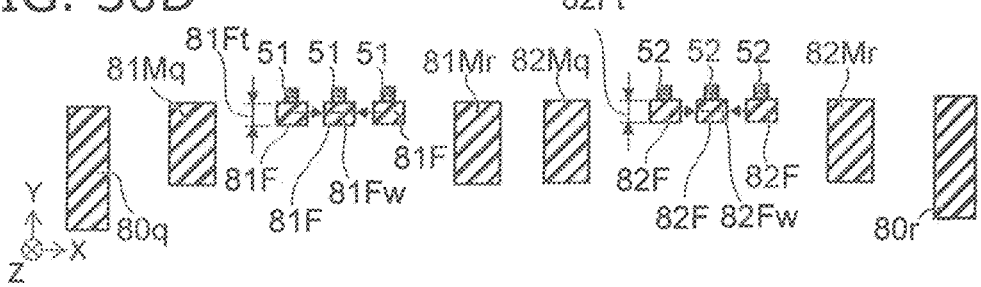
Figure 30E:
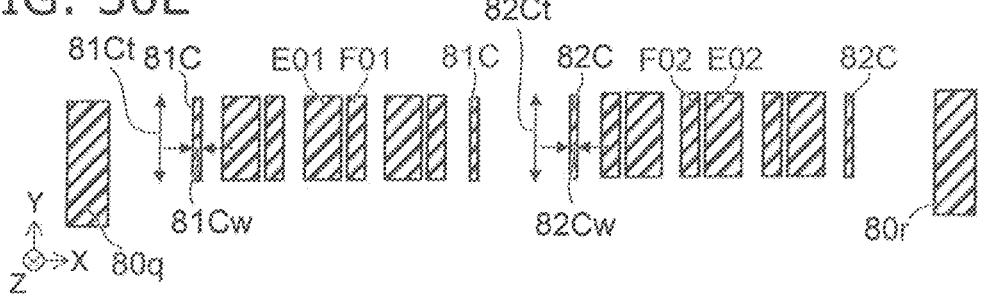

As shown in FIG. 30E, the length (a length 81Cw) of the first connecting body 81C in the second direction (the X-axis direction) is shorter than the length (a length 81Ct) of the first connecting body 81C in the third direction (the Z-axis direction). For example, the length 81Cw corresponds to the width of the first connecting body 81C. For example, the length 81Ct corresponds to the thickness of the first connecting body 81C.

Because the width (the length in the X-axis direction) of the first connecting body 81C is narrow, the deformation along the X-axis direction is easy. Thereby, the movement (the driving) along the X-axis direction is easy; as a result, the force (e.g., the Coriolis force) due to the external force is obtained easily. Thereby, sensing with higher sensitivity is possible.

On the other hand, it is favorable for the films to be thin. The deformation of the films is easy. For example, the deformation of the films is along the Z-axis direction.

As shown in FIG. 30D, for example, it is favorable for the length (a length 81Fw) of the first film 81F in the second direction (the X-axis direction) to be longer than the length (a length 81Ft) of the first film 81F in the third direction (the Z-axis direction). The length 81Fw corresponds to the width of the first film 81F. The length 81Ft corresponds to the thickness of the first film 81F.

Figure 31A:
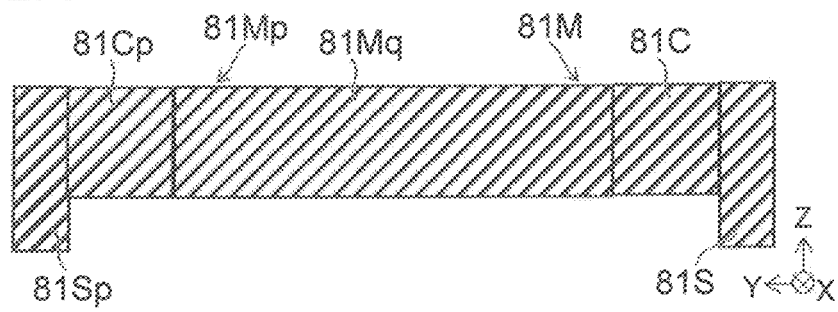
FIG. 31A to FIG. 31D are schematic views illustrating the sensor according to the second embodiment.
Figure 31B:
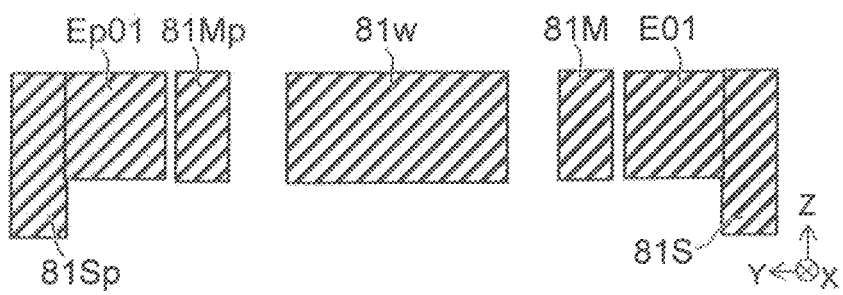
Figure 31C:
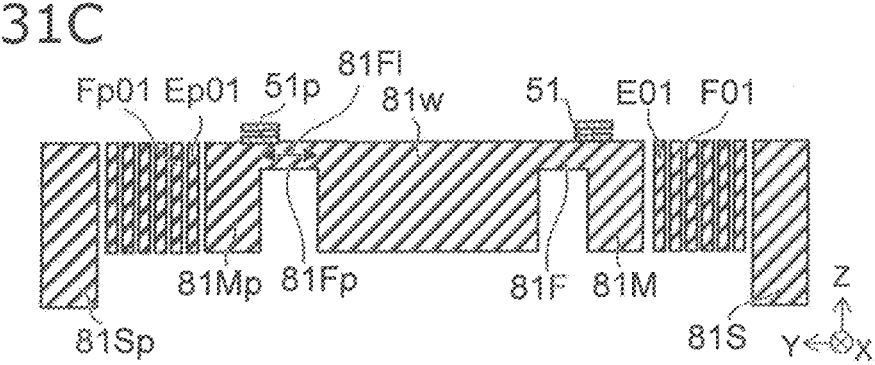
Figure 31D:
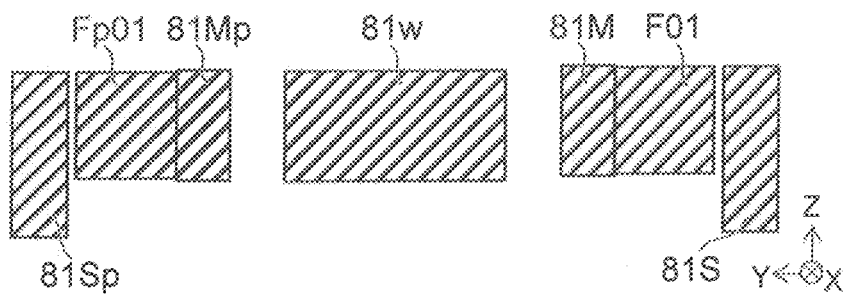
Figure 32A:
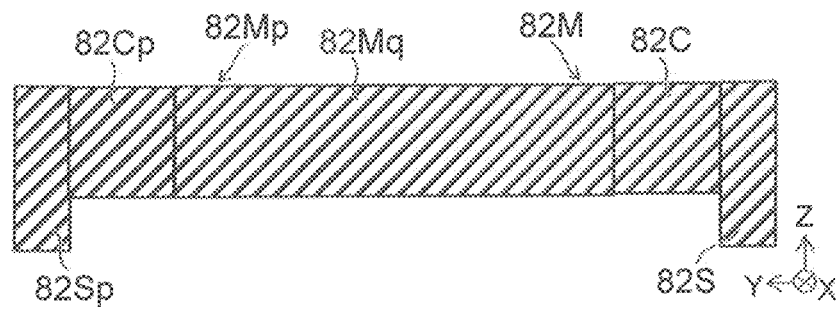
FIG. 32A to FIG. 32D are schematic views illustrating the sensor according to the second embodiment.
Figure 32B:
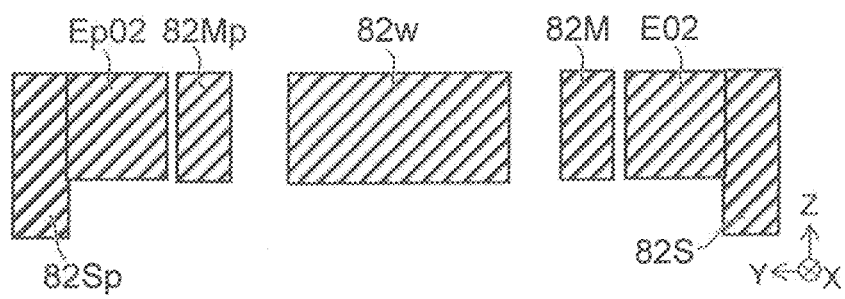
Figure 32C:
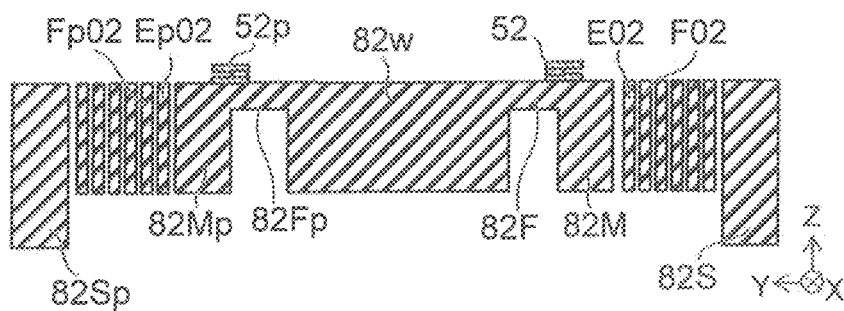
Figure 32D:
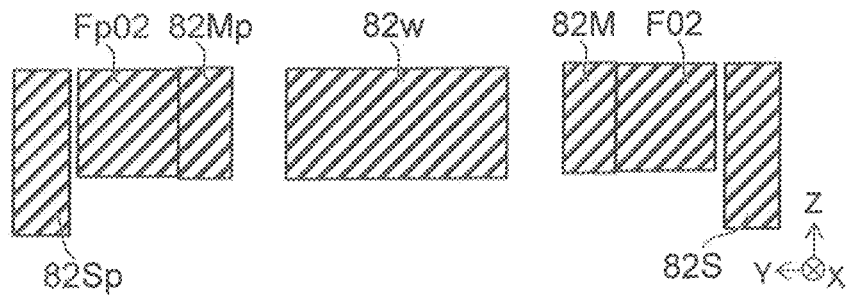

As shown in FIG. 31C, it is favorable for the length (a length 81Fl) of the first film 81F in the first direction (the Y-axis direction) to be longer than the length (the length 81Ft) of the first film 81F in the third direction (the Z-axis direction). The length 81Fl corresponds to the length of the first film 81F, Thereby, the deformation of the first film 81F is easy.

A configuration that is similar to that of the first film 81F is applicable to the second film 82F, the film 81Fp, and the film 82Fp as well. A configuration that is similar to that of the first film 81F is applicable to the films 81Fq, 81Fr; 82Fq, and 82Fr as well. In such a case, the first direction and the second direction may be interchanged with each other.

In the example, the size of the first weight portion 81w is larger than the size of the first film 81F.

For example, the thickness of the first weight portion 81w (a length 81wt referring to FIG. 30C) is thicker (longer) than the thickness of the first film 81F (the length 81Ft referring to FIG. 30O). For example, the width of the first weight portion 81w (a length 81ww referring to FIG. 30C) is thicker (longer) than the width of the first film 81F (the length 81Fw referring to FIG. 30O).

Thus, for example, the first weight portion 81w has at least one of a length (the length 81wt) along the third direction (the Z-axis direction) longer than the length along the third direction (the 2-axis direction) of the first film 81F, or a length (the length 81ww) along the second direction (the X-axis direction) longer than the length along the second direction (the X-axis direction) of the first film 81F. Thereby, the function of the first weight portion 81w as a weight portion is better. For example, the movement of the first weight portion 81w is distinct; the noise can be suppressed; and, for example, the sensitivity improves.

A configuration that is similar to that of the first weight portion 81w is applicable to the second weight portion 82w as well.

As shown in FIG. 29, the multiple first films 81F, the multiple second films 82F, the multiple films 81Fp, the multiple films 81Fq, the multiple films 81Fr, the multiple films 82Fp, the multiple films 82Fq, and the multiple films 82Fr are provided. At least one magnetic element is provided in each of these multiple films. As described below, multiple magnetic elements may be provided at one film.

In the example as shown in FIG. 29, line B5-B6 corresponds to the central axis of the first film 81F, line C5-C6 corresponds to the central axis of the second film 82R These central axes extend along the Y-axis direction. The first film 81F is substantially symmetric with respect to the central axis. The second film 82F is substantially symmetric with respect to the central axis.

For example, the first magnetic element 51 is provided on the central axis of the first film 81F. For example, the first magnetic element 51 is substantially symmetric with respect to the central axis of the first film 81F. The second magnetic element 52 is provided on the central axis of the second film 82F. For example, the second magnetic element 52 is substantially symmetric with respect to the central axis of the second film 82F.

By providing the magnetic elements on the central axes, for example, the strain that is generated by the drive vibration is smaller than the strain generated by the external force (e.g., the strain generated by the Coriolis force based on the external force). For example, the strain that is generated by the external force can be sensed efficiently. If the magnetic elements are substantially symmetric with respect to the central axes, for example, the driving is stable.

The first film 81F has two end portions in the Y-axis direction. One of the two end portions is connected to the first intermediate body 81M. The other of the two end portions is connected to the first weight portion 81w. The strain that is generated in the first film 81F is large at these end portions. By providing the first magnetic element 51 at these end portions, for example, high sensitivity is obtained. The distance between the first magnetic element 51 and the first intermediate body 81M is different from the distance between the first magnetic element 51 and the first weight portion 81w. For example, high sensitivity is obtained by such an arrangement.

The second film 82F has two end portions in the Y-axis direction. One of the two end portions is connected to the second intermediate body 82M. The other of the two end portions is connected to the second weight portion 82w. The strain that is generated in the second film 82F is large at these end portions. By providing the second magnetic element 52 at these end portions, for example, high sensitivity is obtained. The distance between the second magnetic element 52 and the second intermediate body 82M is different from the distance between the second magnetic element 52 and the second weight portion 82w. For example, high sensitivity is obtained by such an arrangement.

In the example as shown in FIG. 29, for example, the first film 81F and the second film 82F are substantially symmetric with respect to a central axis CX1. For example, the first weight portion 81w and the second weight portion 32w are substantially symmetric with respect to the central axis CX1. For example, the first intermediate body 81M and the second intermediate body 82M are substantially symmetric with respect to the central axis CX1. The central axis CX1 extends along the Y-axis direction. For example, the distance between the first weight portion 81w and the central axis CX1 is substantially the same as the distance between the second weight portion 82w and the central axis CX1. For example, the distance between the first intermediate body 81M and the central axis CX1 is substantially the same as the distance between the second intermediate body 82M and the central axis CX1.

If these films, weight portions, and intermediate bodies are substantially symmetric with respect to the central axis CX1, for example, these films, weight portions, and intermediate bodies vibrate with substantially the same amplitude with reversed phases. For example, high sensitivity is obtained by using the signal (e.g., the differential signal SD) obtained by processing the signal obtained from the first magnetic element 51 and the signal obtained from the second magnetic element 52.

An example of operations of the sensor 120 will now be described.

Figure 34:
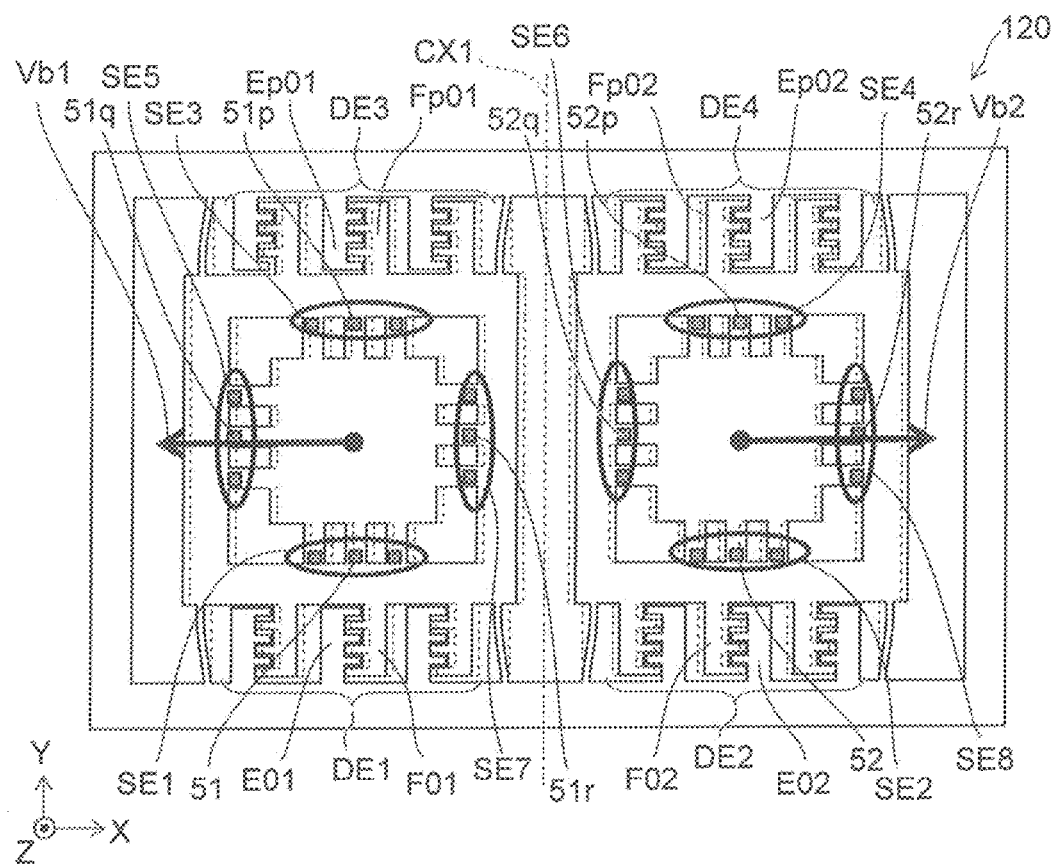
FIG. 34 is a schematic plan view illustrating the sensor according to the second embodiment.

FIG. 34 is a schematic plan view illustrating the sensor according to the second embodiment.

In the sensor 120 as shown in FIG. 34, the first support portion-side electrode E01 and the first counter electrode F01 are included in a first drive electrode DE1. The second support portion-side electrode E02 and the second counter electrode F02 are included in a second drive electrode DE2. The support portion-side electrode Ep01 and the counter electrode Fp01 are included in a third drive electrode DE3. The support portion-side electrode Ep02 and the counter electrode Fp02 are included in a fourth drive electrode DE4.

The direction connecting the first drive electrode DE1 and the second drive electrode DE2 is aligned with the X-axis direction. The direction connecting the third drive electrode DE3 and the fourth drive electrode DE4 is aligned with the X-axis direction. The direction connecting the first drive electrode DE1 and the third drive electrode DE3 is aligned with the Y-axis direction. The direction connecting the second drive electrode DE2 and the fourth drive electrode DE4 is aligned with the Y-axis direction.

On the other hand, the first magnetic element 51 is included in a first sensing portion SE1. The second magnetic element 52 is included in a second sensing portion SE2. The magnetic element 51p is included in a third sensing portion SE3. The magnetic element 52p is included in a fourth sensing portion SE4. The magnetic element 51q is included in a fifth sensing portion SE5. The magnetic element 52q is included in a sixth sensing portion SE6. The magnetic element 51r is included in a seventh sensing portion SE7. The magnetic element 52r is included in an eighth sensing portion SE8.

The direction connecting the first sensing portion SE1 and the second sensing portion SE2 is aligned with the X-axis direction. The direction connecting the third sensing portion SE3 and the fourth sensing portion SE4 is aligned with the X-axis direction. The direction connecting the first sensing portion SE1 and the third sensing portion SE3 is aligned with the Y-axis direction. The direction connecting the second sensing portion SE2 and the fourth sensing portion SE4 is aligned with the Y-axis direction.

For example, the first weight portion 81w is between the first drive electrode DE1 and the third drive electrode DE3 in the Y-axis direction. The second weight portion 82w is between the second drive electrode DE2 and the fourth drive electrode DE4 in the Y-axis direction. The first sensing portion SE1 is between the first drive electrode DE1 and the first weight portion 81w in the Y-axis direction. The third sensing portion SE3 is between the third drive electrode DE3 and the first weight portion 81w in the Y-axis direction. The second sensing portion SE2 is between the second drive electrode DE2 and the second weight portion 82w in the Y-axis direction. The fourth sensing portion SE4 is between the fourth drive electrode DE4 and the second weight portion 82w in the Y-axis direction. The first weight portion 81w is between the fifth sensing portion SE5 and the seventh sensing portion SE7 in the X-axis direction. The second weight portion 82w is between the sixth sensing portion SE6 and the eighth sensing portion SE8 in the X-axis direction.

The first drive force Db1 is applied to the first weight portion 81w in one state in which signals described below are applied to such drive electrodes. The second drive force Db2 is applied to the second weight portion 82w. For example, these drive forces are aligned with the X-axis direction. The orientations of these drive forces are mutually-reversed.

Figure 35:
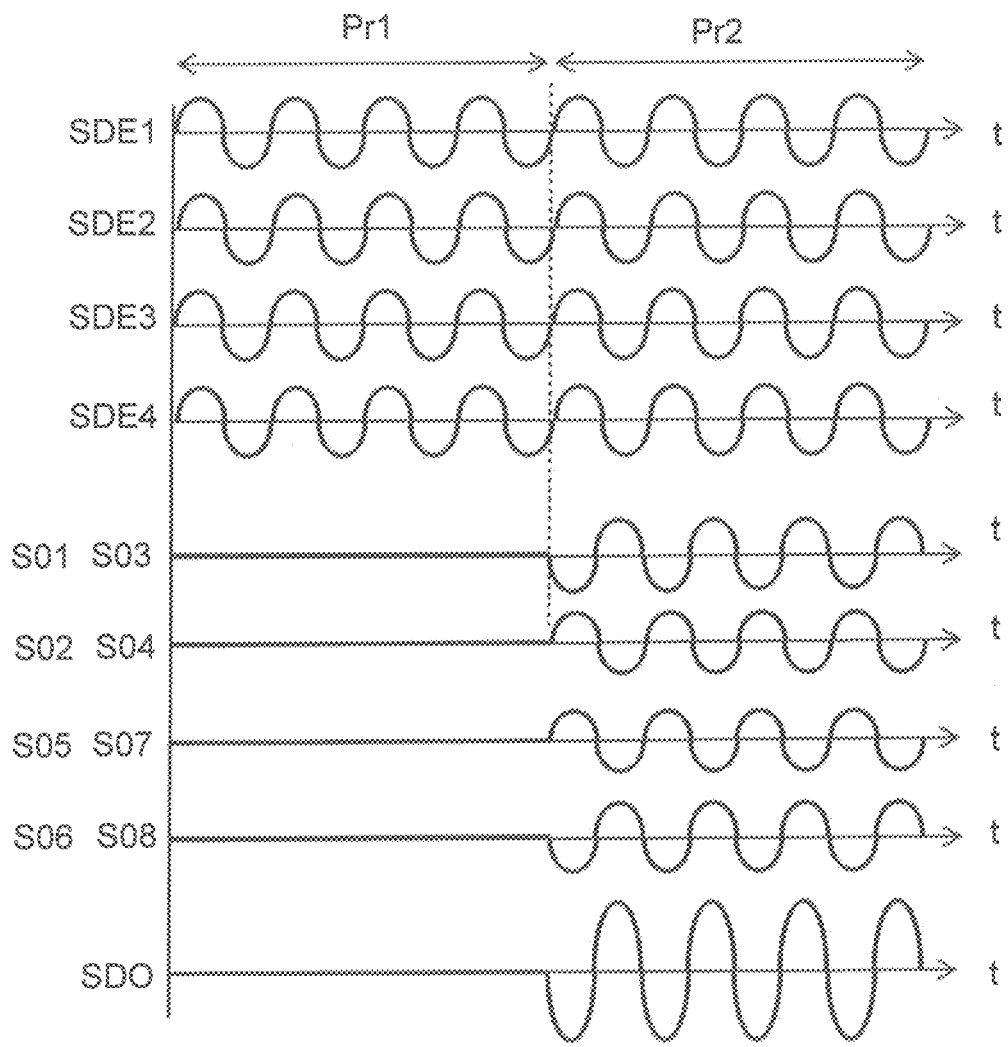
FIG. 35 is a schematic view illustrating the signals of the sensor according to the second embodiment.

FIG. 35 is a schematic view illustrating the signals of the sensor according to the second embodiment.

The horizontal axis of FIG. 35 illustrates the signals applied to the first to fourth drive electrodes DE1 to DE4 and the sense signals generated by the first to eighth sensing portions SE1 to SE8. The horizontal axis is time t. The vertical axis is the strength of the signal.

As shown in FIG. 35, signals SDE1 to SDE4 are applied respectively to the first to fourth drive electrodes DE1 to DE4. For example, these signals are supplied from the controller 68. For example, the signal SDE1 is the potential of the first counter electrode F01 referenced to the first support portion-side electrode E01. The other signals SDE2 to SDE4 are defined similarly. In the example as shown in FIG. 35, the polarities of these signals are the same.

On the other hand, in the sensor 120 as shown in FIG. 29, the direction (the +X direction) from the first support portion-side electrode E01 toward the first counter electrode F01 is the reverse of the direction (the −X direction) from the second support portion-side electrode E02 toward the second counter electrode F02. Therefore, forces in reverse directions are generated when the signals SDE1 to SDE4 having the same polarity such as those recited above are applied. This corresponds to the first drive force Db1 and the second drive force Db2 illustrated in FIG. 34.

The signals SDE1 to SDE4 are alternating current. Thereby, the directions of the first drive force Db1 and the second drive force Db2 change with time. In such a case, the directions of these drive forces are reversed. Thereby, the first weight portion 81w and the second weight portion 82w vibrate along the X-axis direction.

First to eighth signals S01 to S08 correspond respectively to the signals generated in the first to eighth sensing portions SE1 to SE8.

Signals substantially are not generated for the first to eighth signals S01 to S08 in the first interval Pr1 in which an external force is not applied.

In the second interval Pr2 in which the external force is applied, signals that correspond to the external force are generated in the first to eighth signals S01 to S08. For example, the first to eighth signals S01 to S08 are based on the Coriolis force. In the example, the polarities of the first signal S01, the third signal S03, the sixth signal S06, and the eighth signal S08 are the same. The polarities of the second signal S02, the fourth signal S04, the fifth signal S05, and the seventh signal S07 are the same. The polarities of the first signal S01, the third signal S03, the sixth signal S06, and the eighth signal S08 are the reverse of the polarities of the second signal S02, the fourth signal S04, the fifth signal S05, and the seventh signal S07.

By deriving a differential signal SDO corresponding to the difference of these signals, the effects of the noise can be suppressed; and sensing with higher sensitivity is possible.

For example, the effects of a disturbance on the acceleration can be suppressed by using the differential signal SDO. For example, the effects of a disturbance on the acceleration are substantially canceled by using the differential signal SDO. For example, the external force (the angular velocity, the angular acceleration, etc.) to be sensed can be sensed efficiently.

Thus, in the case where the direction from the first support portion-side electrode E01 toward the first counter electrode F01 is the reverse of the direction from the second support portion-side electrode E02 toward the second counter electrode F02, for example, the controller 68 performs an operation of setting the polarity of the potential of the first counter electrode F01 referenced to the potential of the first support portion-side electrode E01 to be the same as the polarity of the potential of the second counter electrode F02 referenced to the potential of the second support portion-side electrode E02.

Figure 36:
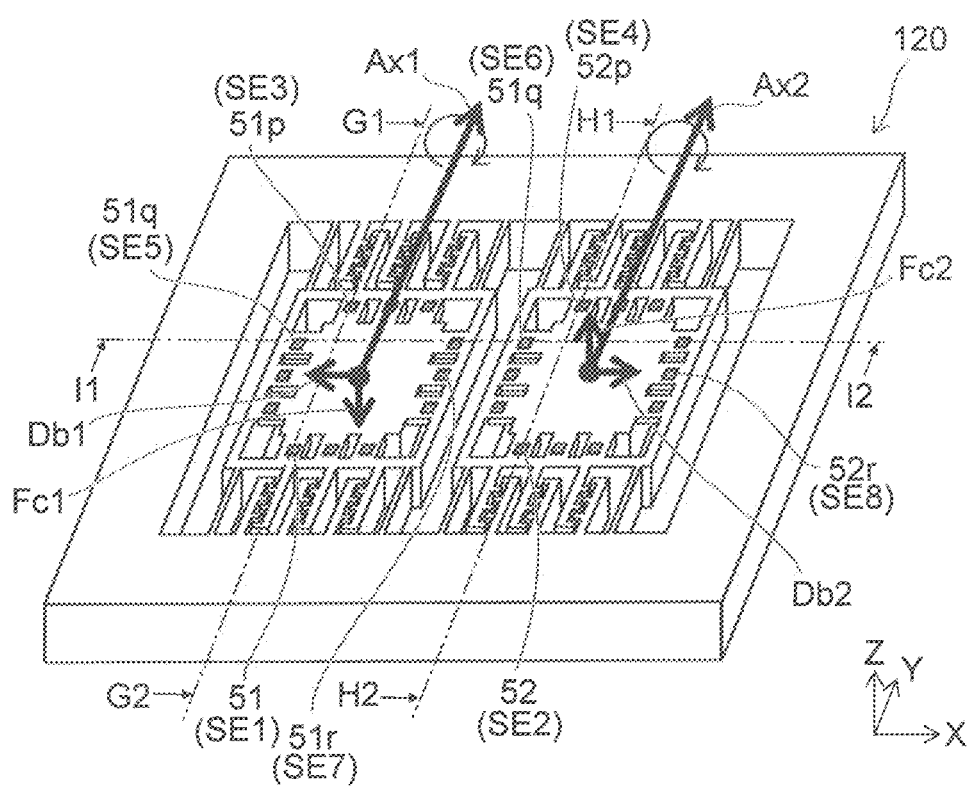
FIG. 36 is a schematic perspective view illustrating operations of the sensor according to the second embodiment.

FIG. 36 is a schematic perspective view illustrating operations of the sensor according to the second embodiment.

Figure 37A:
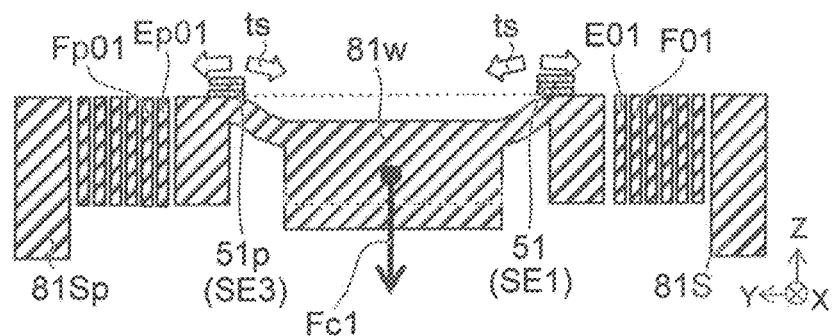
FIG. 37A to FIG. 37C are schematic perspective views illustrating the operations of the sensor according to the second embodiment.
Figure 37B:
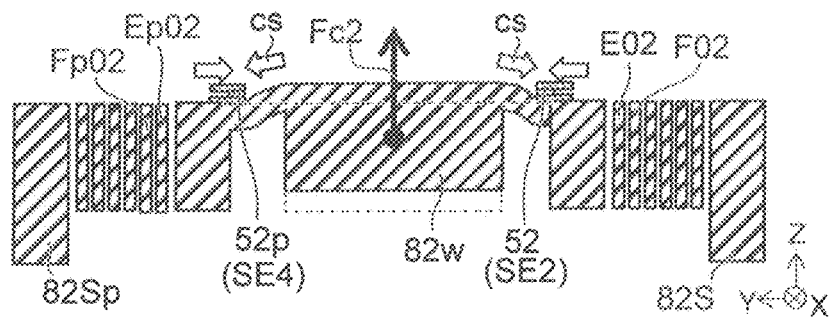
Figure 37C:
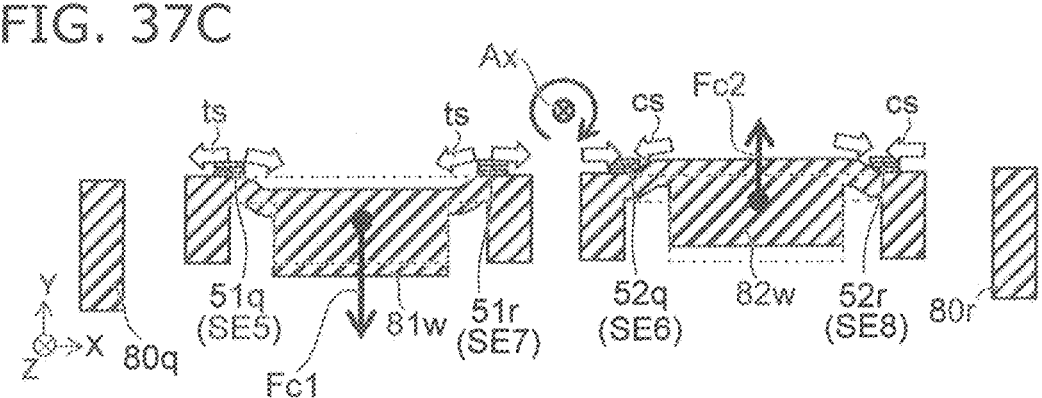

FIG. 37A to FIG. 37C are schematic perspective views illustrating the operations of the sensor according to the second embodiment.

FIG. 37A to FIG. 37C respectively are line G1-G2, line H1-H2, and line 11-12 cross-sectional views of FIG. 36.

As shown in FIG. 36, the first drive force Db1 is applied to the first weight portion 81w. The second drive force Db2 is applied to the second weight portion 82w. An external force that has the first rotation axis Ax1 and the second rotation axis Ax2 as axes is applied. Thereby, the first force Fc1 and the second force Fc2 are generated.

As shown in FIG. 37A and FIG. 37B, the directions of these forces are mutually-reversed.

As shown in FIG. 37A, the tensile strain ts is generated in the first sensing portion SE1 and the third sensing portion SE3. As shown in FIG. 37B, the compressive strain cs is generated in the second sensing portion SE2 and the fourth sensing portion SE4. As shown in FIG. 37C, the tensile strain ts is generated in the fifth sensing portion SE5 and the seventh sensing portion SE7. The compressive strain cs is generated in the sixth sensing portion SE6 and the eighth sensing portion SE8. Thereby, the first to eighth signals S01 to S08 described in reference to FIG. 35 are obtained.

Figure 38A:
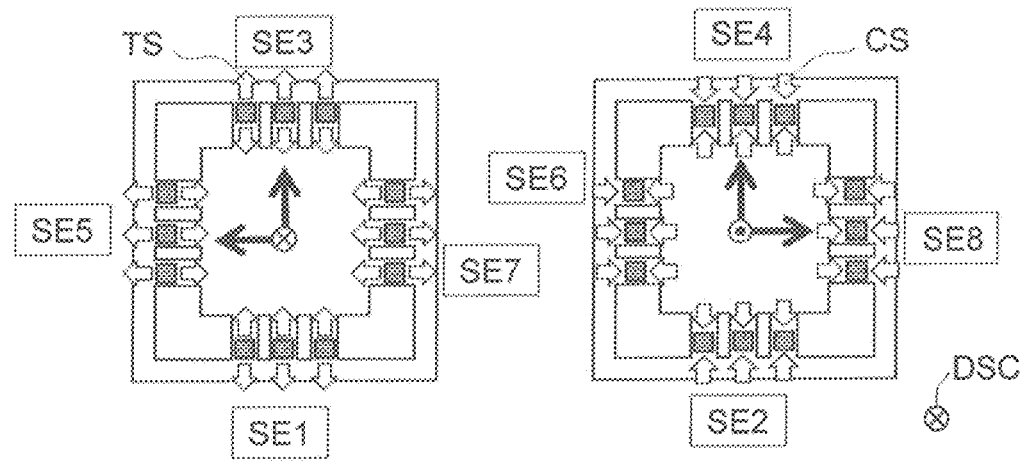
FIG. 38A to FIG. 38D are schematic views illustrating the sensor according to the second embodiment.
Figures 38B, 38C:
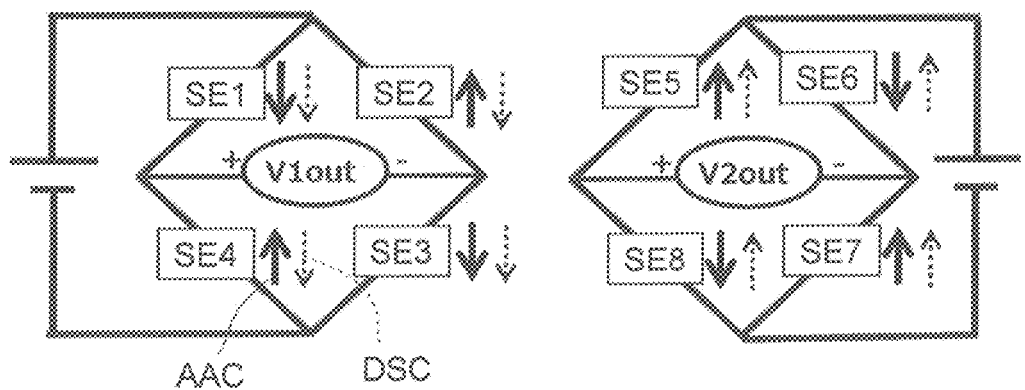

FIG. 38A to FIG. 38D are schematic views illustrating the sensor according to the second embodiment. As shown in FIG. 38A, the first to eighth sensing portions SE1 to SE8 recited above are provided. As shown in FIG. 38B, a bridge circuit is formed of the first to fourth sensing portions SE1 to SE4. As shown in FIG. 38C, a bridge circuit is formed of the fifth to eighth sensing portions SE5 to SE8. In such a case, a direction DSC of an acceleration causing a disturbance (e.g., noise) may occur in the circuit shown in FIG. 38B. The direction DSC of the acceleration causing the disturbance recited above substantially is canceled inside one bridge circuit. A direction AAC caused by the angular velocity is extracted efficiently.

Figure 38D:
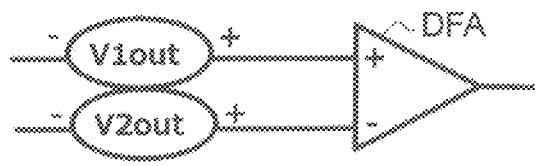
Figure 39A:
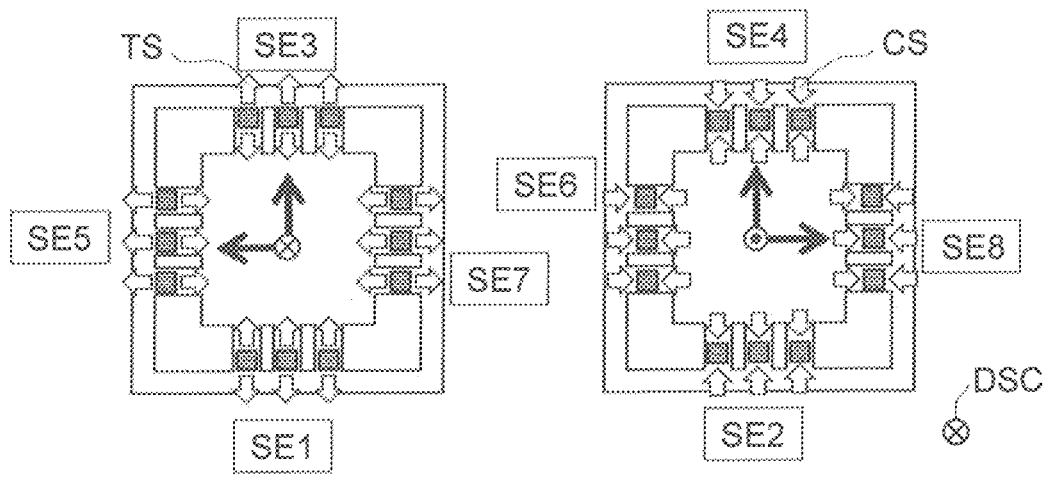
FIG. 39A to FIG. 39D are schematic views illustrating another sensor according to the second embodiment.
Figures 39B, 39C:
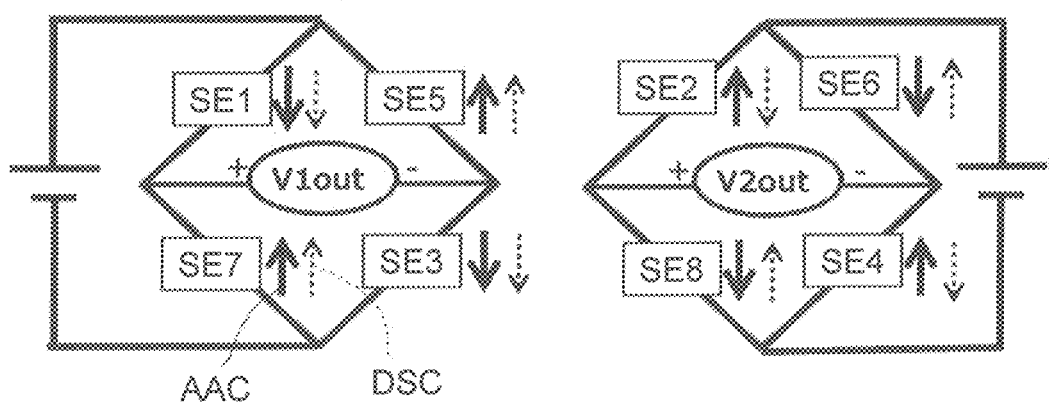
Figure 39D:
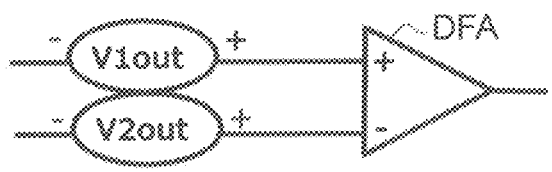

As shown in FIG. 38D, an output V1out of one bridge circuit and an output V2out of one other bridge circuit are input to a differential amplifier DFA. The difference of the outputs of these bridge circuits is obtained. For example, the difference corresponds to the differential signal SDO (referring to FIG. 35).

FIG. 39A to FIG. 39D are schematic views illustrating another sensor according to the second embodiment.

In the example, one bridge circuit is formed of the first sensing portion SE1, the third sensing portion SE3, the fifth sensing portion SE5, and the seventh sensing portion SE7. One other bridge circuit is formed of the second sensing portion SE2, the fourth sensing portion SE4, the sixth sensing portion SE6, and the eighth sensing portion SE8. The outputs V1out and V2out of these bridge circuits are input to the differential amplifier DFA. For example, the difference of the outputs of these bridge circuits corresponds to the differential signal SDO (referring to FIG. 35).

Figure 40A:
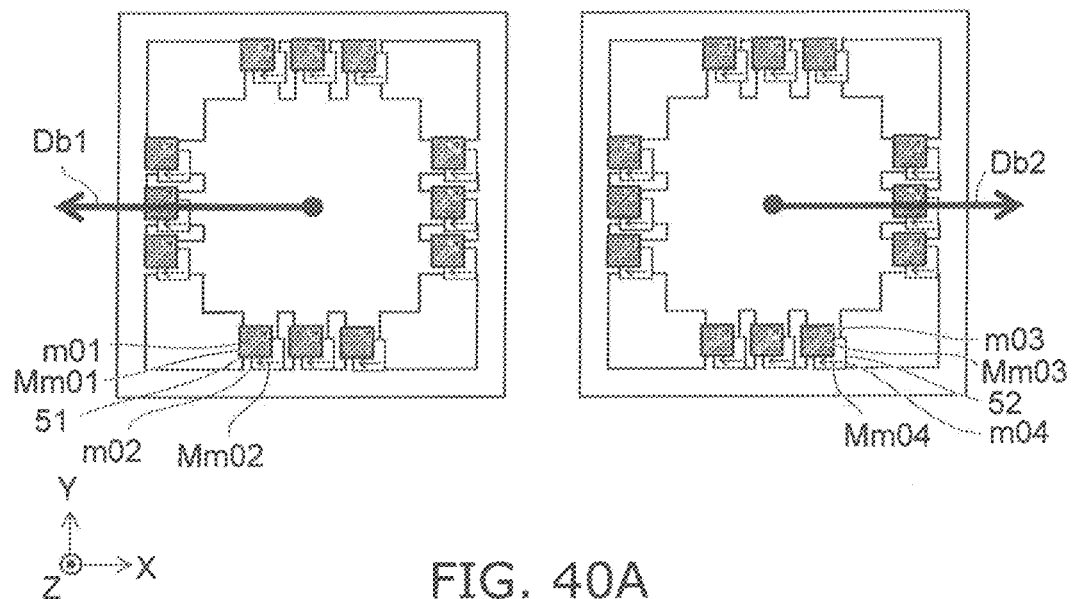
FIG. 40A and FIG. 40B are schematic plan views illustrating the sensor according to the second embodiment.
Figure 40B:
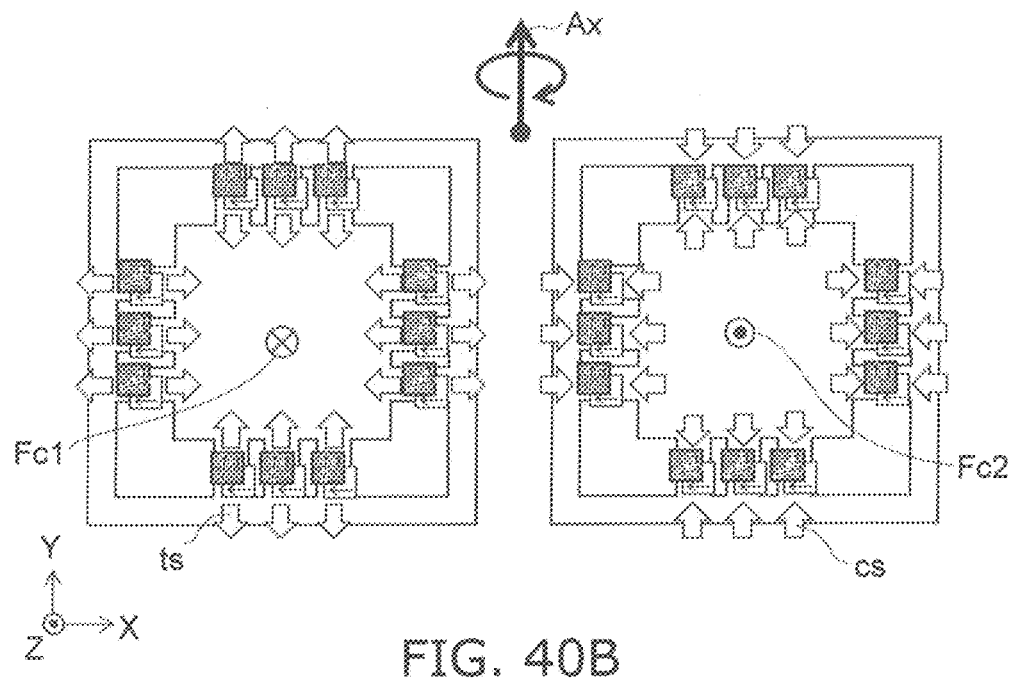

FIG. 40A and FIG. 40B are schematic plan views illustrating the sensor according to the second embodiment.

As shown in FIG. 40A, the first magnetization Mm01 of the first magnetic layer m01 of the first magnetic element 51 is tilted with respect to the X-axis direction and the Y-axis direction. The second magnetization Mm02 of the second magnetic layer m02 of the first magnetic element 51 is aligned with the X-axis direction. The second magnetization Mm02 may be aligned with the Y-axis direction. The third magnetization Mm03 of the third magnetic layer m03 of the second magnetic element 52 is tilted with respect to the X-axis direction and the Y-axis direction. The fourth magnetization Mm04 of the fourth magnetic layer m04 of the second magnetic element 52 is aligned with the X-axis direction. The fourth magnetization Mm04 may be aligned with the Y-axis direction. For example, the first drive force Db1 and the second drive force Db2 are applied.

As shown in FIG. 40B, the first force Fc1 and the second force Fc2 are applied according to the external force. Thereby, the tensile strain ts or the compressive strain cs is generated in the magnetic elements.

For example, the magnetization changes easily by setting the magnetization of the magnetic layer of the free magnetic layer to be tilted with respect to the direction of the strain (in the example, the X-axis direction or the Y-axis direction). Highly-sensitive sensing is possible.

Thus, for example, it is favorable for at least one of the first magnetization Mm01 of the first magnetic layer m01 or the second magnetization Mm02 of the second magnetic layers m02 to be tilted with respect to the direction (e.g., the Y-axis direction) connecting the first support portion 81S and the first intermediate body 81M.

Due to the tilt, for example, the first magnetic element 51 responds to both the first force Fc1 and the second force Fc2. For example, the second magnetic element 52 responds to both the first force Fc1 and the second force Fc2. For example, sensing that uses reverse polarities is performed in the first magnetic element 51 and the second magnetic element 52.

FIG. 41A to FIG. 41H are schematic plan views illustrating portions of the sensor according to the second embodiment.

Figure 41A:
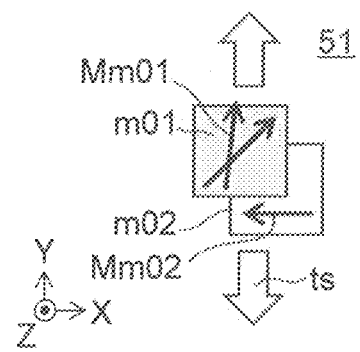
FIG. 41A to FIG. 41H are schematic plan views illustrating portions of the sensor according to the second embodiment.

As shown in FIG. 41A, the tensile strain ts is generated in the first magnetic element 51 in one state. For example, the first magnetization Mm01 of the first magnetic layer m01 changes toward the Y-axis direction from the state of being tilted with respect to the X-axis direction and the Y-axis direction. The angle between the first magnetization Mm01 and the second magnetization Mm02 is small. At this time, for example, the electrical resistance decreases.

Figure 41B:
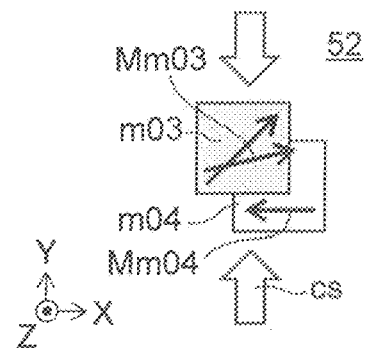

As shown in FIG. 41B, the compressive strain cs is generated in the second magnetic element 52 in one state. For example, the third magnetization Mm03 of the third magnetic layer m03 changes toward the X-axis direction from the state of being tilted with respect to the X-axis direction and the Y-axis direction. The angle between the third magnetization Mm03 and the fourth magnetization Mm04 is large. At this time, for example, the electrical resistance increases.

Figure 41C:
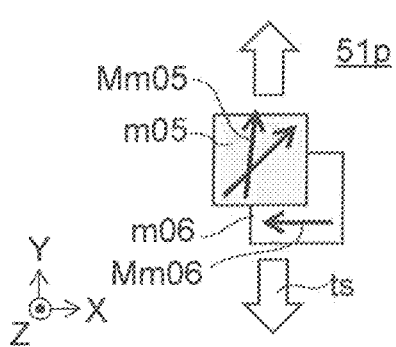

In the magnetic element 51$p$ as shown in FIG. 41C, a fifth magnetization Mm05 of the fifth magnetic layer m05 is tilted with respect to the X-axis direction and the Y-axis direction. A sixth magnetization Mm06 of the sixth magnetic layer m06 is aligned with the X-axis direction. The sixth magnetization Mm06 may be aligned with the Y-axis direction.

Figure 41D:
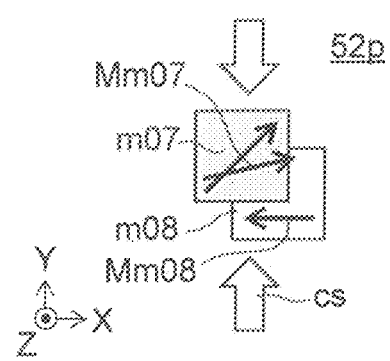

In the magnetic element 52$p$ as shown in FIG. 41D, a seventh magnetization Mm07 of the seventh magnetic layer m07 is tilted with respect to the X-axis direction and the Y-axis direction. An eighth magnetization Mm08 of the eighth magnetic layer m08 is aligned with the X-axis direction. The eighth magnetization Mm03 may be aligned with the Y-axis direction.

Figure 41E:
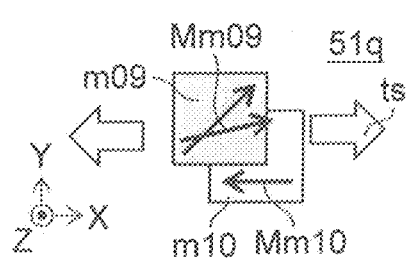

In the magnetic element 51$q$ as shown in FIG. 41E, a ninth magnetization Mm09 of the ninth magnetic layer m09 is tilted with respect to the X-axis direction and the Y-axis direction. A tenth magnetization Mm10 of the tenth magnetic layer m10 is aligned with the X-axis direction. The tenth magnetization Mm10 is aligned with the Y-axis direction.

Figure 41F:
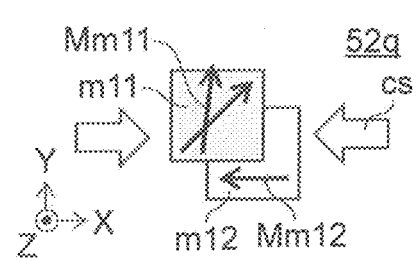

In the magnetic element 52$q$ as shown in FIG. 41F, an eleventh magnetization Mm11 of the eleventh magnetic layer m11 is tilted with respect to the X-axis direction and the Y-axis direction. A twelfth magnetization Mm12 of the twelfth magnetic layer m12 is aligned with the X-axis direction. The twelfth magnetization Mm12 may be aligned with the Y-axis direction.

Figure 41G:
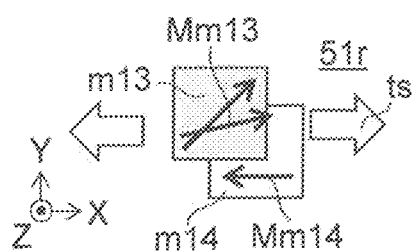

In the magnetic element 51$r$ as shown in FIG. 41G, a thirteenth magnetization Mm13 of the thirteenth magnetic layer m13 is tilted with respect to the X-axis direction and the Y-axis direction. A fourteenth magnetization Mm14 of the fourteenth magnetic layer m14 is aligned with the X-axis direction. The fourteenth magnetization Mm14 may be aligned with the Y-axis direction.

Figure 41H:
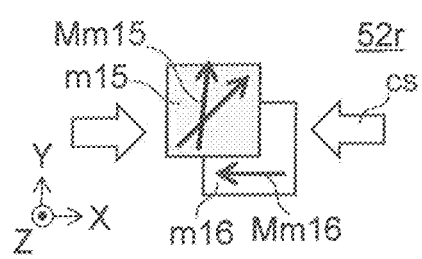

In the magnetic element 52$r$ as shown in FIG. 41H, a fifteenth magnetization Mm15 of the fifteenth magnetic layer m15 is tilted with respect to the X-axis direction and the Y-axis direction. A sixteenth magnetization Mm16 of the sixteenth magnetic layer m16 is aligned with the X-axis direction. The sixteenth magnetization Mm16 may be aligned with the Y-axis direction.

As shown in FIG. 41C, the tensile strain ts is generated in the magnetic element 51$p$ in one state. For example, the fifth magnetization Mm05 changes toward the Y-axis direction from the state of being tilted with respect to the X-axis direction and the Y-axis direction. The angle between the fifth magnetization Mm05 and the sixth magnetization Mm06 is small. At this time, for example, the electrical resistance decreases.

As shown in FIG. 41D, the compressive strain cs is generated in the magnetic element 52$p$ in one state. For example, the seventh magnetization Mm07 changes toward the X-axis direction from the state of being tilted with respect to the X-axis direction and the Y-axis direction. The angle between the seventh magnetization Mm07 and the eighth magnetization Mm08 is large. At this time, for example, the electrical resistance increases.

As shown in FIG. 41E and FIG. 41G, the tensile strain ts is generated in one state. For example, the ninth magnetization Mm09 and the thirteenth magnetization Mm13 change toward the Y-axis direction from the state of being tilted with respect to the X-axis direction and the Y-axis direction. The angle between the ninth magnetization Mm09 and the tenth magnetization Mm10 and the angle between the thirteenth magnetization Mm13 and the fourteenth magnetization Mm14 are small. At this time, for example, the electrical resistance decreases.

As shown in FIG. 41F and FIG. 41H, the compressive strain cs is generated in one state. For example, the eleventh magnetization Mm11 and the fifteenth magnetization Mm15 change toward the Y-axis direction from the state of being tilted with respect to the X-axis direction and the Y-axis direction. The angle between the eleventh magnetization Mm11 and the twelfth magnetization Mm12 and the angle between the fifteenth magnetization Mm15 and the sixteenth magnetization Mm16 are large. At this time, for example, the electrical resistance increases.

FIG. 42A, FIG. 42B, FIG. 43, FIG. 44A, FIG. 44B, FIG. 45, FIG. 46A, FIG. 46B, FIG. 47, and FIG. 48 are schematic plan views illustrating portions of sensors according to the second embodiment.

The support portions (the first support portion 81S, etc.) and the connecting bodies (the first connecting body 81C, etc.) are not illustrated in these drawings.

Figure 42A:
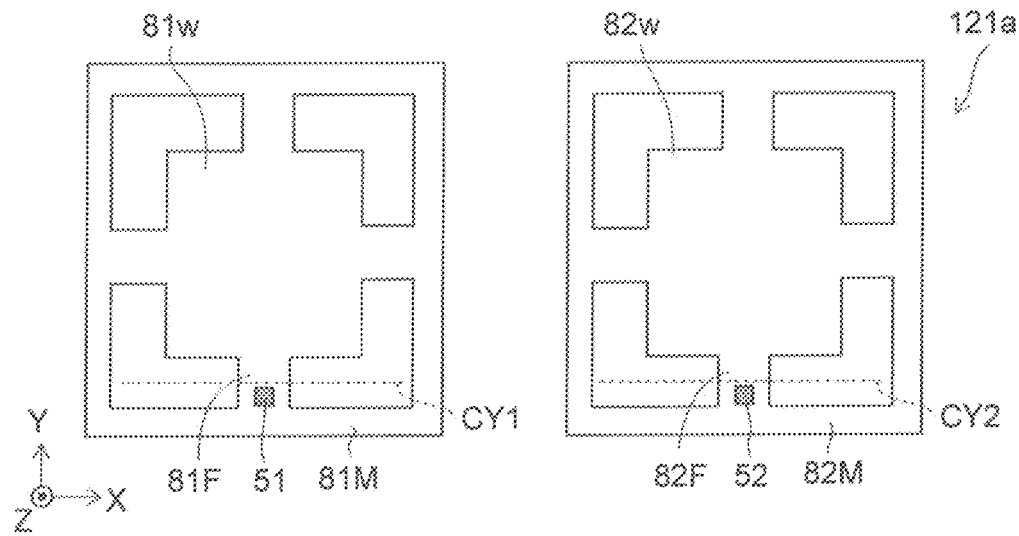
FIG. 42A and FIG. 42B are schematic plan views illustrating portions of sensors according to the second embodiment.

In a sensor 121a as shown in FIG. 42A, the first magnetic element 51 and the second magnetic element 52 are provided; and the other magnetic elements may be omitted.

Figure 42B:
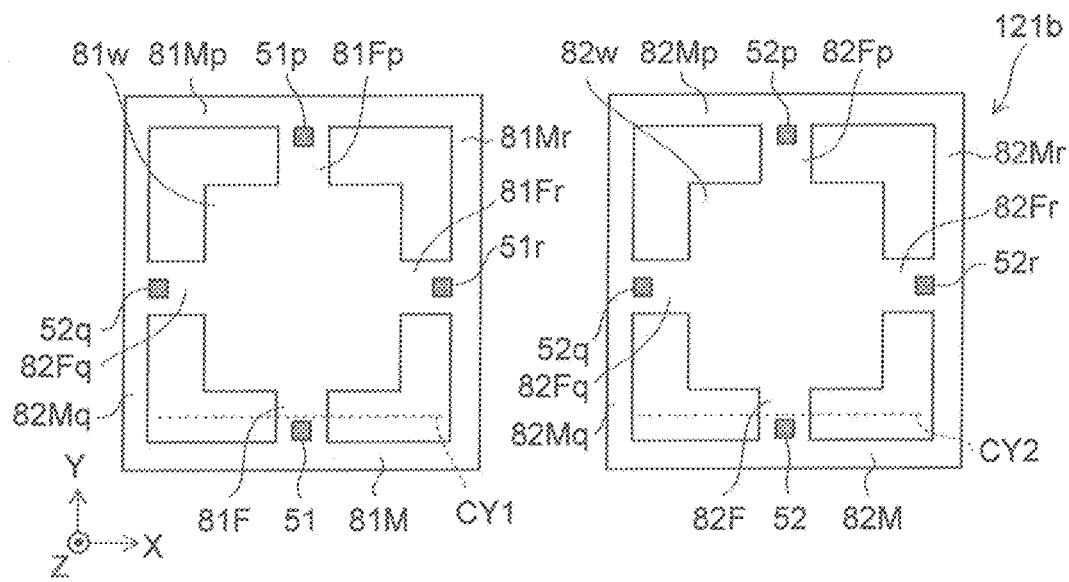

In a sensor 121b as shown in FIG. 42B, one magnetic element is provided at one film. For example, one first magnetic element 51 is provided at the first film 81F. One second magnetic element 52 is provided at the second film 82F.

In the sensor 121a and the sensor 121b, the first film 81F has a central axis CY1 along the X-axis direction. The second film 82F has a central axis CY2 along the X-axis direction. The first magnetic element 51 is provided at a position asymmetric with respect to the central axis CY1. The second magnetic element 52 is provided at a position asymmetric with respect to the central axis CY2. For example, the distance between the first magnetic element 51 and the first intermediate body 81M is different from the distance between the first magnetic element 51 and the first weight portion 81w. In the example, the former is shorter than the latter. For example, the distance between the second magnetic element 52 and the second intermediate body 82M is different from the distance between the second magnetic element 52 and the second weight portion 82w. In the example, the former is shorter than the latter. A large strain is generated in the magnetic elements by such an arrangement. For example, high sensitivity is obtained.

Figure 43:
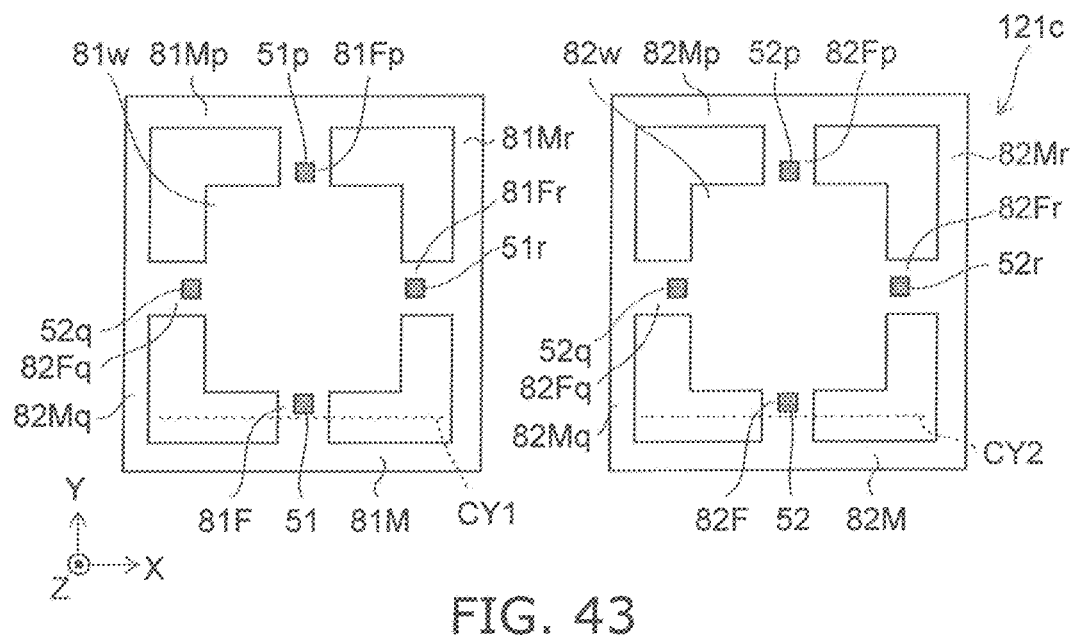
FIG. 43 is a schematic plan view illustrating portions of a sensor according to the second embodiment.

In a sensor 121c as shown in FIG. 43, the distance between the first magnetic element 51 and the first intermediate body 81M is longer than the distance between the first magnetic element 51 and the first weight portion 81w. The distance between the second magnetic element 52 and the second intermediate body 82M is longer than the distance between the second magnetic element 52 and the second weight portion 82w. A large strain is generated in the magnetic elements by such an arrangement. For example, high sensitivity is obtained.

Figure 44A:
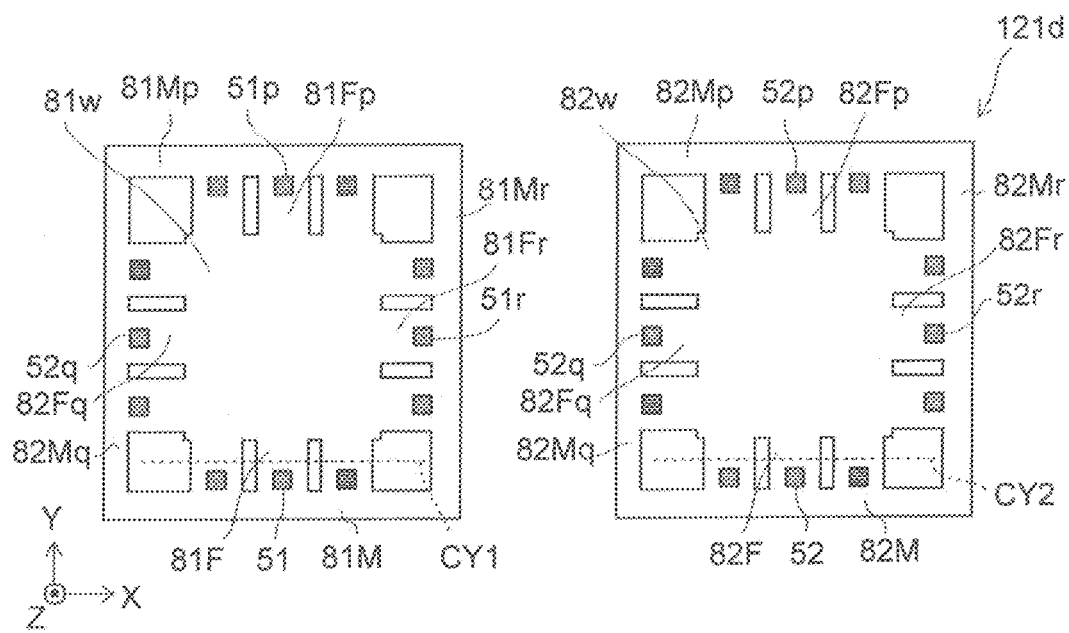
FIG. 44A and FIG. 44B are schematic plan views illustrating portions of sensors according to the second embodiment.

In a sensor 121d as shown in FIG. 44A, multiple films are provided at one intermediate body. For example, the multiple first films 81F are connected to the first intermediate body 81M. One first magnetic element 51 is provided at each of the multiple first films 81F. For example, the multiple second films 82F are connected to the second intermediate body 82M. One second magnetic element 52 is provided at each of the multiple second films 82F.

In the sensor 121d, the distance between the first magnetic element 51 and the first intermediate body 81M is shorter than the distance between the first magnetic element 51 and the first weight portion 81w. The distance between the second magnetic element 52 and the second intermediate body 82M is shorter than the distance between the second magnetic element 52 and the second weight portion 82w.

Figure 44B:
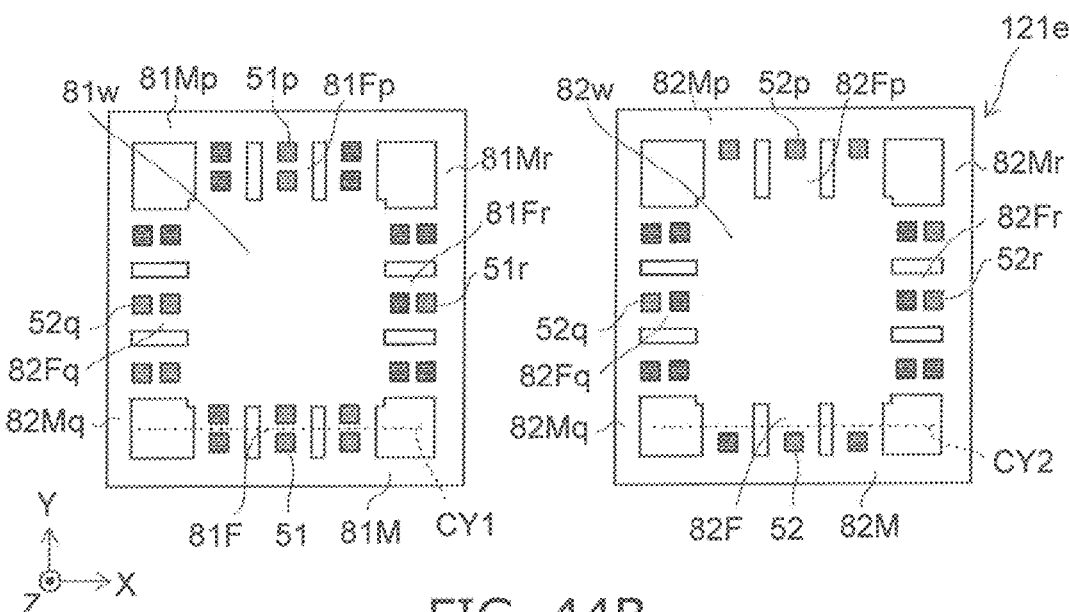

In a sensor 12Xe as shown in FIG. 44B, multiple magnetic elements are provided at each of the multiple films. For example, the multiple first magnetic elements 51 are provided at each of the multiple first films 81F. For example, the multiple second magnetic elements 52 are provided at each of the multiple second films 82F.

Figure 45:
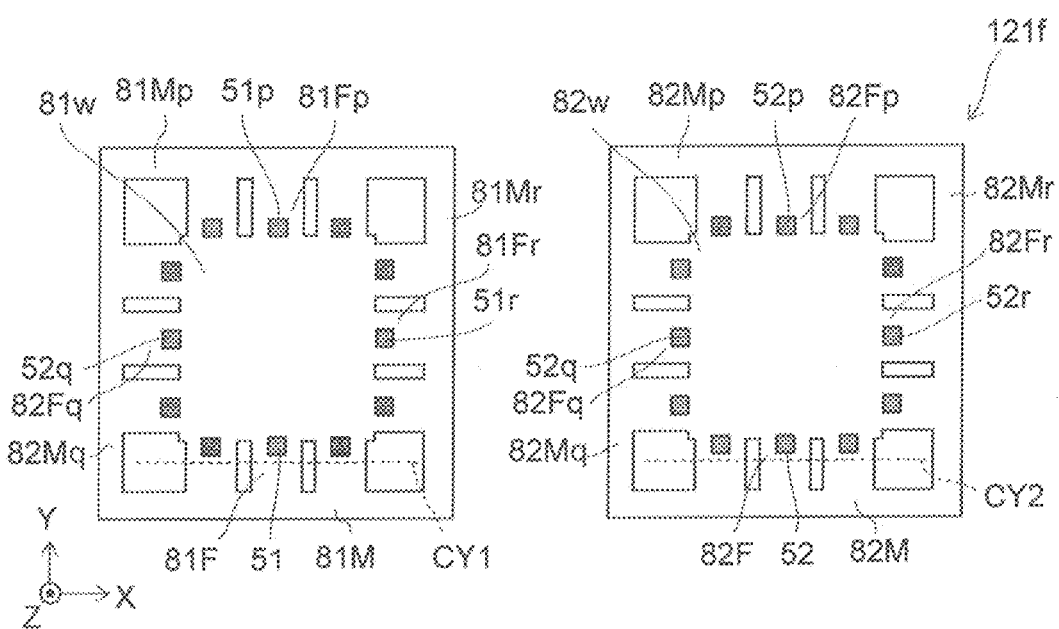
FIG. 45 is a schematic plan view illustrating portions of a sensor according to the second embodiment.

In a sensor 121f as shown in FIG. 45, the distance between the first magnetic element 51 and the first intermediate body 81M is longer than the distance between the first magnetic element 51 and the first weight portion 81w. The distance between the second magnetic element 52 and the second intermediate body 82M is longer than the distance between the second magnetic element 52 and the second weight portion 82w. A large strain is generated in the magnetic elements. For example, high sensitivity is obtained.

Figure 46A:
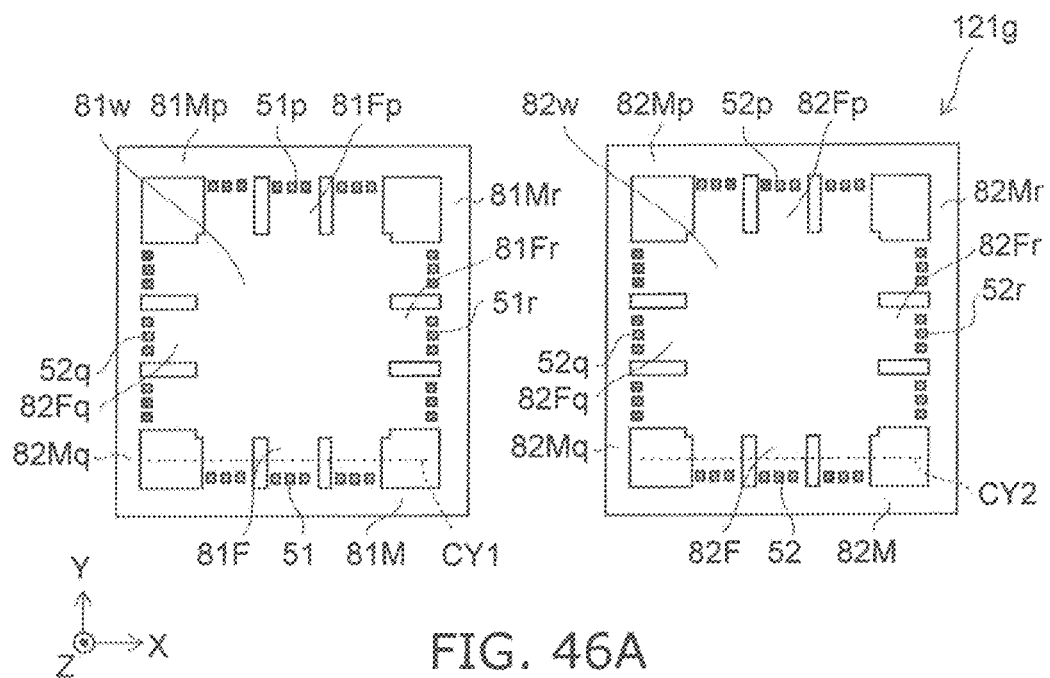
FIG. 46A and FIG. 46B are schematic plan views illustrating portions of sensors according to the second embodiment.

In a sensor 121g as shown in FIG. 46A, the multiple magnetic elements that are provided in each of the multiple films are arranged in a direction crossing the direction in which the film extends. The distances between the intermediate body and the magnetic elements are shorter than the distances between the weight portion and the magnetic elements. For example, the multiple first magnetic elements 51 are provided at each of the multiple first films 81F. The multiple first magnetic elements 51 are arranged along the X-axis direction. The distance between the first intermediate body 81M and one of the multiple first magnetic elements 51 is shorter than the distance between the first weight portion 81w and the one of the multiple first magnetic elements 51. For example, the multiple second magnetic elements 52 are provided at each of the multiple second films 82F. The multiple second magnetic elements 52 are arranged along the X-axis direction. The distance between the second intermediate body 82M and one of the multiple second magnetic elements 52 is shorter than the distance between the second weight portion 82w and the one of the multiple second magnetic elements 52.

By providing the magnetic elements proximal to the intermediate body, the strain can be generated effectively in the magnetic elements. Thereby, highly-sensitive sensing is easy.

Figure 46B:
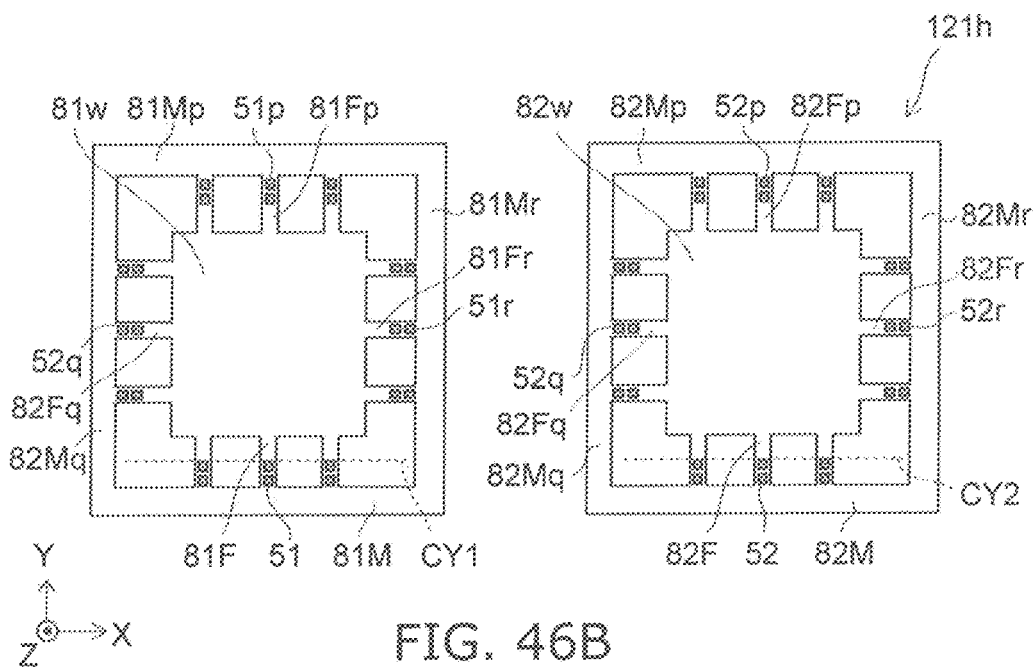

In a sensor 121h as shown in FIG. 46B as well, the distances between the intermediate body and the magnetic elements are shorter than the distances between the weight portion and the magnetic elements. In the example, the multiple magnetic elements that are provided in each of the multiple films are arranged in the direction in which the film extends. Thereby, the width of the film can be set to be small. Thereby, the film can deform easily. Thereby, highly-sensitive sensing is easy.

Figure 47:
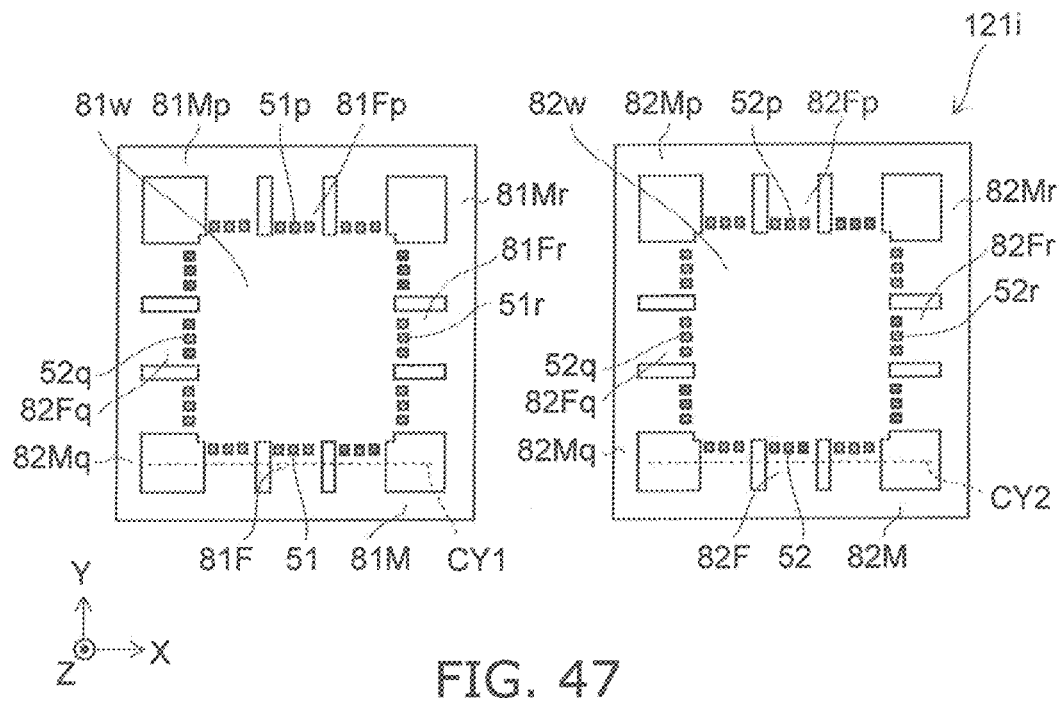
FIG. 47 is a schematic plan view illustrating portions of a sensor according to the second embodiment.

In a sensor 121i as shown in FIG. 47, the distance between the first magnetic element 51 and the first intermediate body 81M is longer than the distance between the first magnetic element 51 and the first weight portion 81w. The distance between the second magnetic element 52 and the second intermediate body 82M is longer than the distance between the second magnetic element 52 and the second weight portion 82w.

Figure 48:
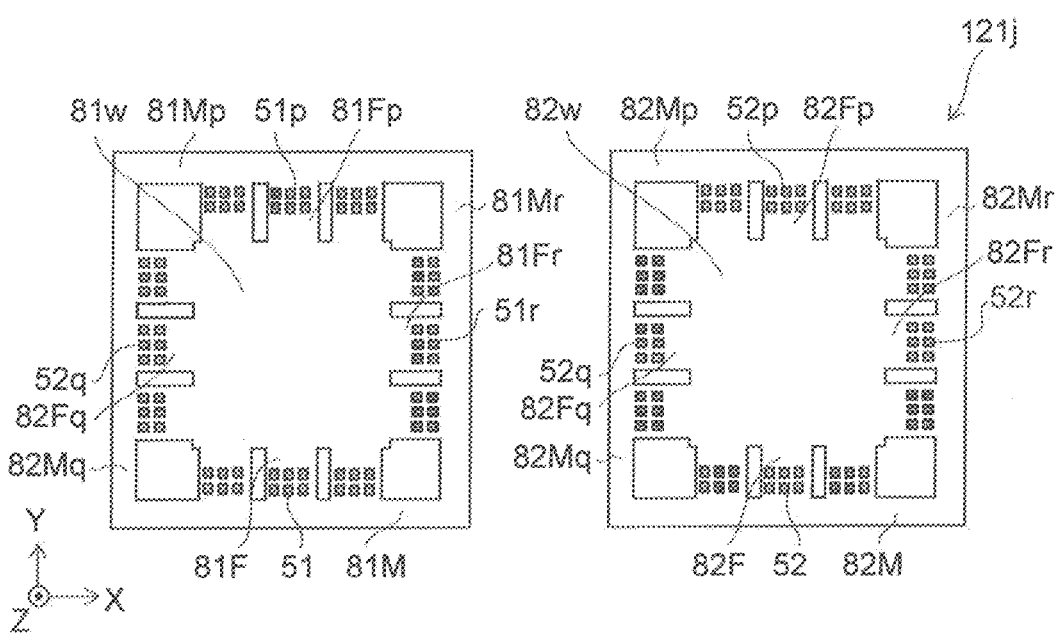
FIG. 48 is a schematic plan view illustrating portions of a sensor according to the second embodiment.
Figure 49A:
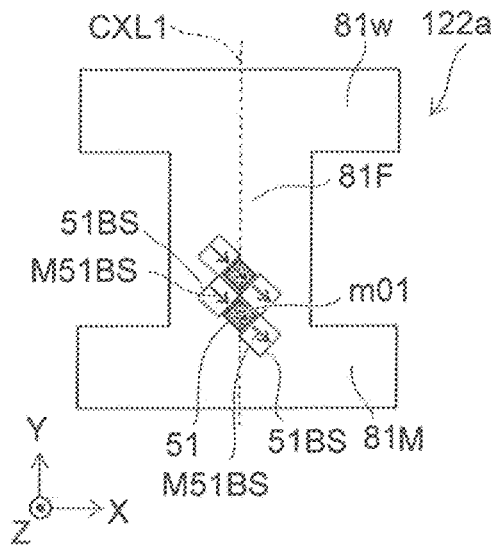
FIG. 49A to FIG. 49D are schematic plan views illustrating portions of sensors according to the second embodiment.
Figure 49B:
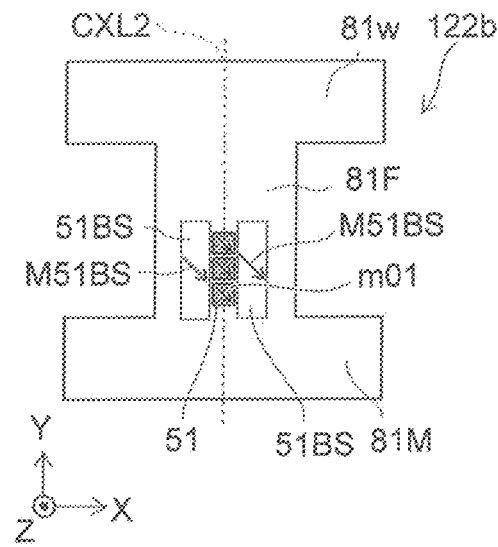
Figure 49C:
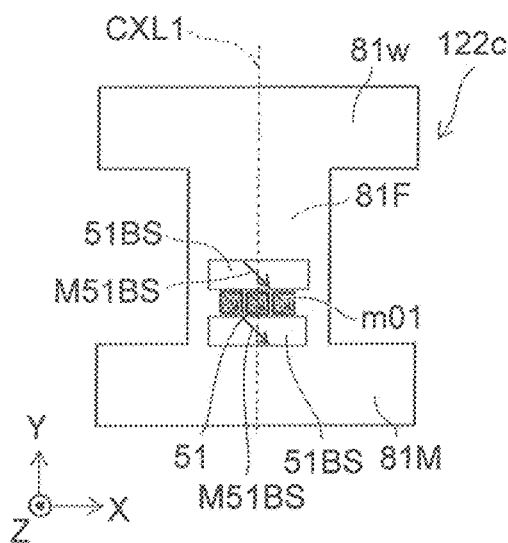
Figure 49D:
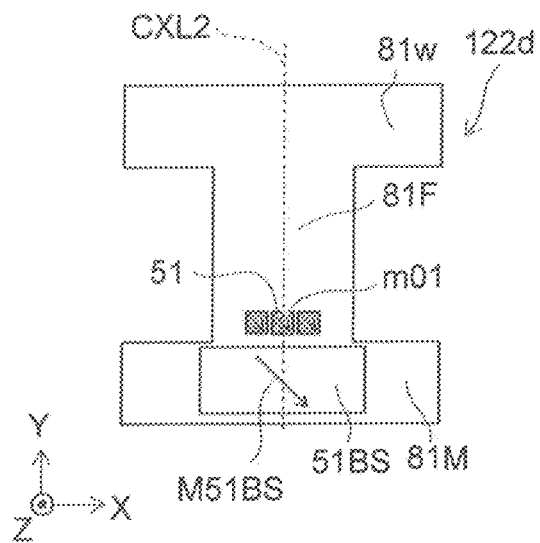

In a sensor 121j as shown in FIG. 48 as well, multiple magnetic elements are provided at each of the multiple films. The multiple magnetic elements are arranged in the Y-axis direction and the X-axis direction. In the example as well, the distances between the intermediate body and the magnetic elements are shorter than the distances between the weight portion and the magnetic elements.

In the sensors 121d to 121g recited above, at least two of the multiple magnetic elements provided in one film are connected in series. The S/N ratio can be increased by connecting in series. Highly-sensitive sensing is possible by setting the bias voltage to an appropriate value.

FIG. 49A to FIG. 49D are schematic plan views illustrating portions of sensors according to the second embodiment.

The first magnetic portion 51BS is provided in sensors 122a to 122d. The second magnetic portion 52BS may be further provided (referring to FIG. 11A to FIG. 11D).

For example, the first magnetic portion 51BS is fixed to the first film 81F. For example, the first magnetic portion 51BS may be fixed to the first intermediate body 81M.

In the sensor 122a, one first magnetic element 51 is provided between two first magnetic portions 51BS. The direction connecting the two first magnetic portions 51BS and the one first magnetic element 51 is tilted with respect to the Y-axis direction and the X-axis direction.

In the sensor 122b and the sensor 122c, the multiple first magnetic elements 51 are provided between two first magnetic portions 51BS. In the sensor 122b, the direction connecting the two first magnetic portions 51BS and one first magnetic element 51 is aligned with the X-axis direction. In the sensor 122c, the direction connecting the two first magnetic portions 51BS and one first magnetic element 51 is aligned with the Y-axis direction.

In the sensor 122d, the first magnetic portion 51BS is provided at the first intermediate body 81M. For example, few components are disposed on the first film 81F. For example, the first film 81F moves easily. High sensitivity is obtained easily.

The magnetization M51BS of the first magnetic portion 51BS is tilted with respect to the Y-axis direction and the X-axis direction. The first magnetic portion 51BS functions as a magnetizing bias layer. For example, the first magnetization Mm01 of the first magnetic layer m01 is aligned with the magnetization M51BS of the first magnetic portion 51BS.

In the examples of the sensors 122b to 122d, the size (e.g., the length in one direction in the X-Y plane) of one first magnetic portion 51BS is larger (longer) than the size (e.g., the length in the one direction in the X-Y plane) of one first magnetic element 51. By providing magnetic portions having large sizes, a stable bias magnetic field can be applied to the magnetic elements.

In the sensors 122a to 122d, the first film 81F has a central axis CXL1. The central axis CXL1 extends along the Y-axis direction. The first magnetic element 51 is provided on the central axis CXL1. For example, the first magnetic element 51 is substantially symmetric with respect to the central axis CXL1. For example, the strain that is generated by the drive vibration is smaller than the strain generated by the external force (e.g., the strain generated by the Coriolis force based on the external force). For example, the strain that is generated by the external force can be sensed efficiently. For example, the driving is stable.

In the sensors 122b and 122c, for example, the first magnetic portion 51BS is substantially symmetric with respect to the central axis CXL1. Thereby, for example, the driving is stable.

Figure 50:
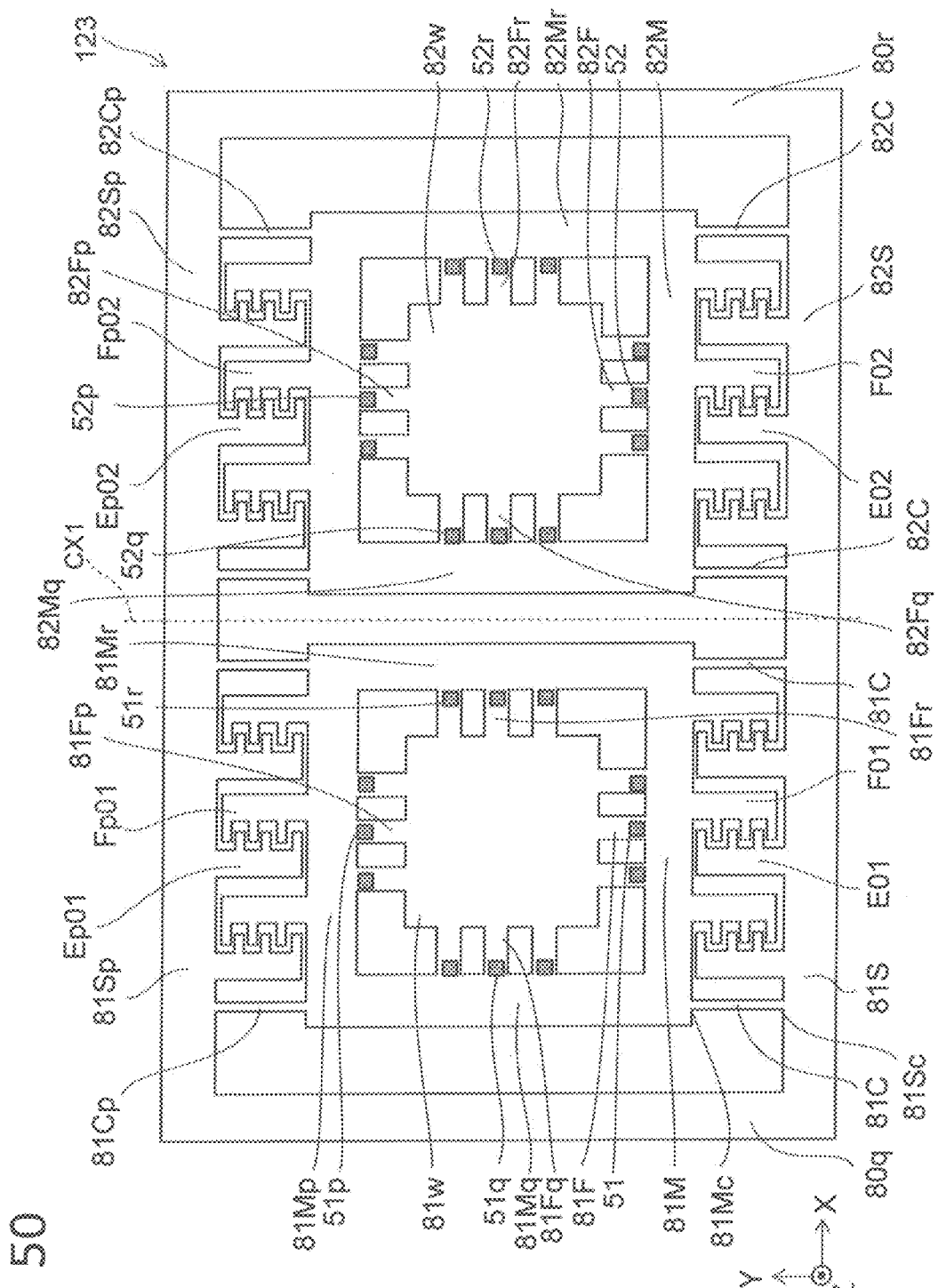
FIG. 50 is a schematic plan view illustrating another sensor according to the second embodiment.

FIG. 50 is a schematic plan view illustrating another sensor according to the second embodiment.

In the sensor 123 as shown in FIG. 50, the direction (in the example, the +X direction) from the first support portion-side electrode E01 toward the first counter electrode F01 is the same as the direction (in the example, the +X direction) from the second support portion-side electrode E02 toward the second counter electrode F02.

In such a case, the polarities of the voltages applied to these electrodes are reversed. For example, the controller 68 performs an operation of setting the polarity of the potential of the first counter electrode F01 referenced to the potential of the first support portion-side electrode E01 to be the reverse of the polarity of the potential of the second counter electrode F02 referenced to the potential of the second support portion-side electrode E02. Thereby, for example, drive forces (the first drive force Db1 and the second drive force Db2) in mutually-reverse directions are obtained. In the sensor 123 as well, the sensitivity can be increased.

FIG. 51, FIG. 52A to FIG. 52E, FIG. 53A to FIG. 53D, and FIG. 54A to FIG. 54D are schematic views illustrating another sensor according to the second embodiment.

Figure 51:
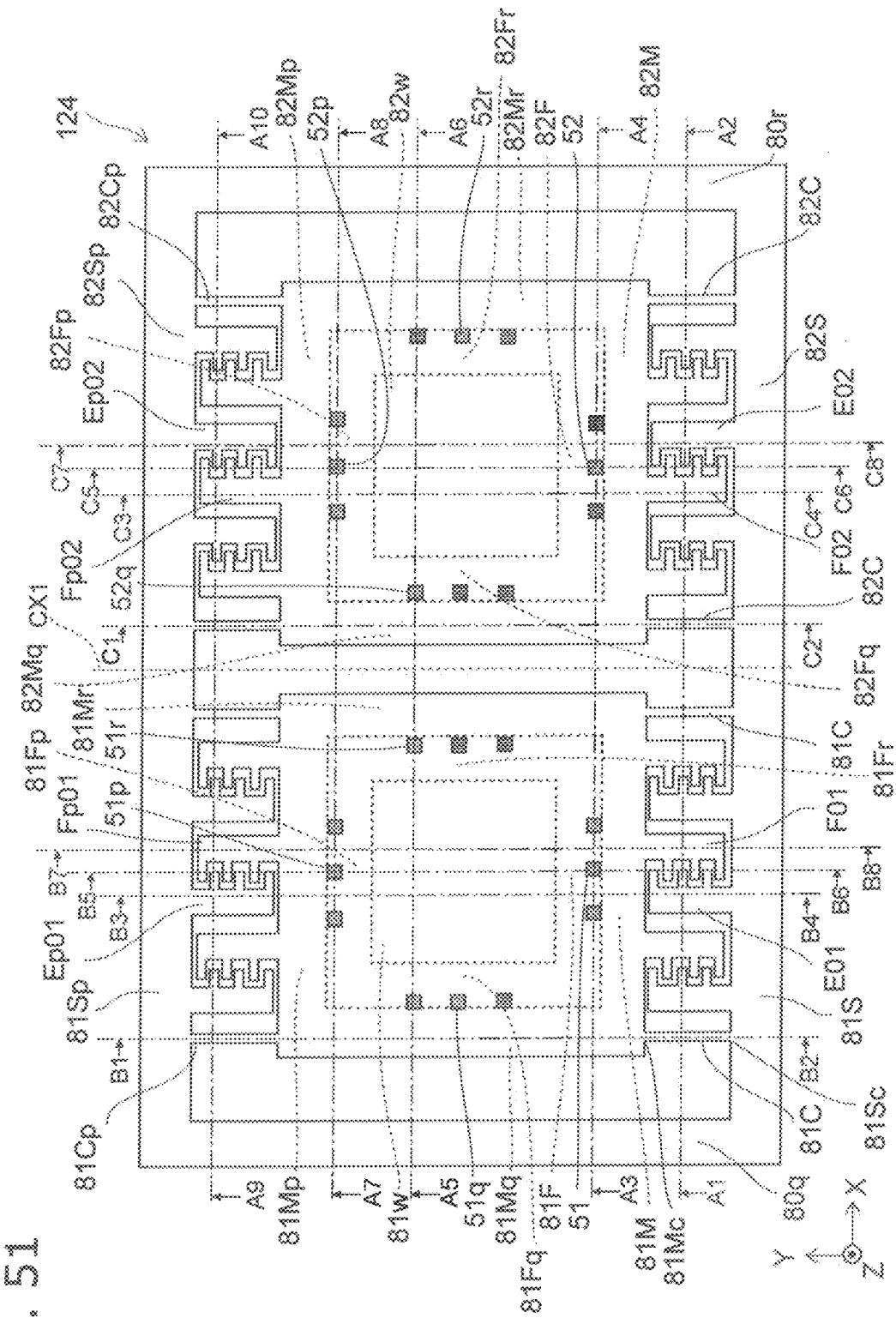
FIG. 51 is a schematic plan view illustrating another sensor according to the second embodiment.
Figure 52A:
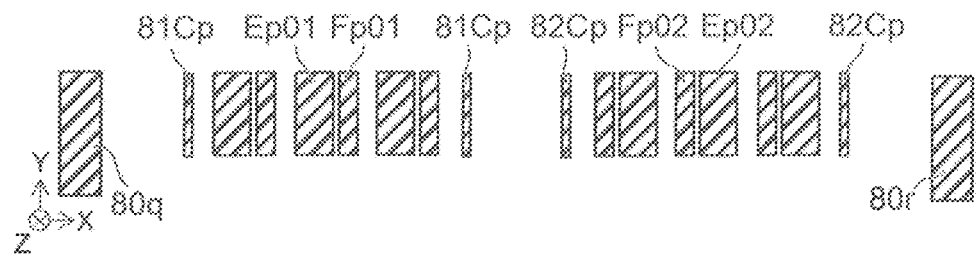
FIG. 52A to FIG. 52E are schematic views illustrating the other sensor according to the second embodiment.
Figure 52B:
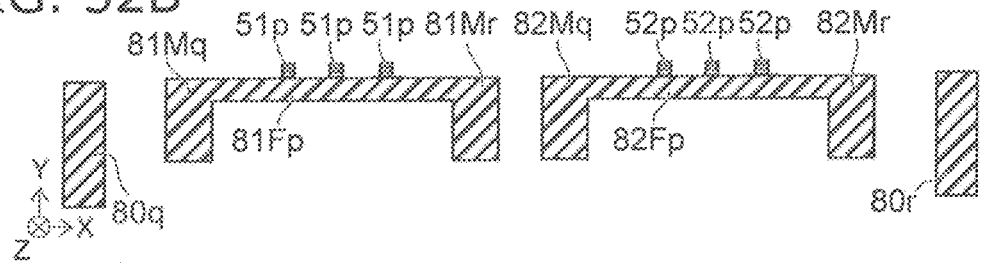
Figure 52C:
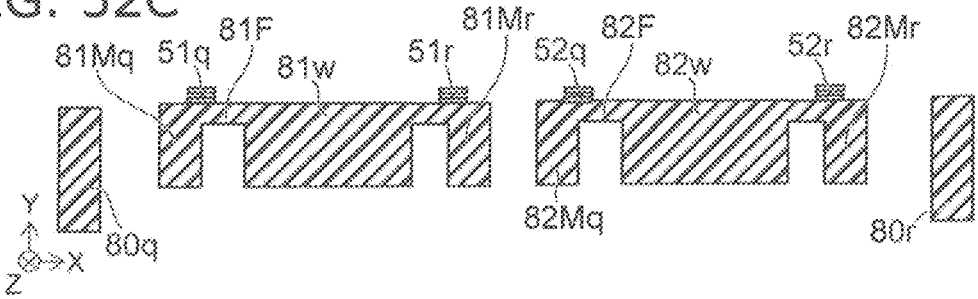
Figure 52D:
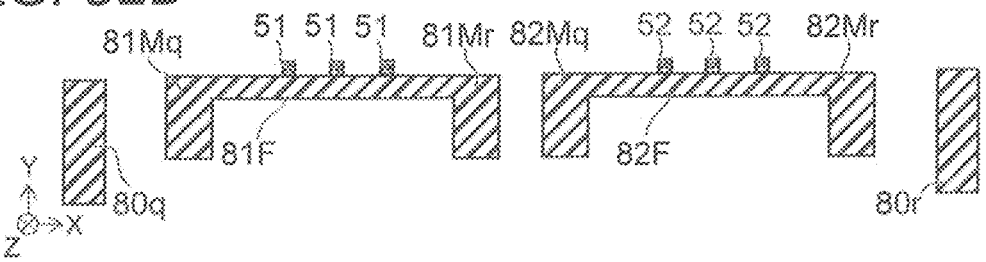
Figure 52E:
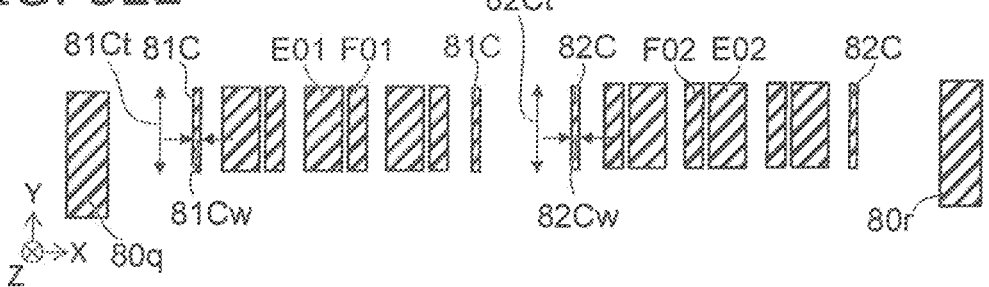
Figure 53A:
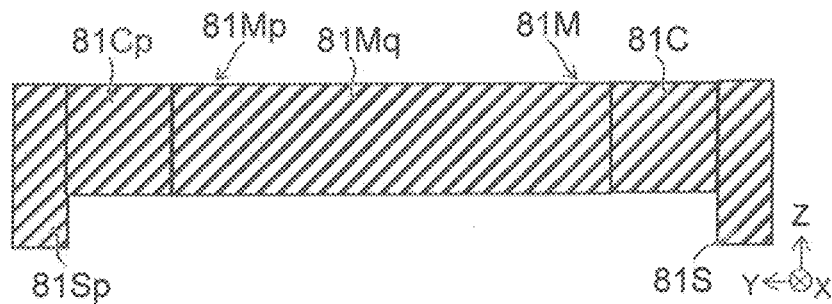
FIG. 53A to FIG. 53D are schematic views illustrating the other sensor according to the second embodiment.
Figure 53B:
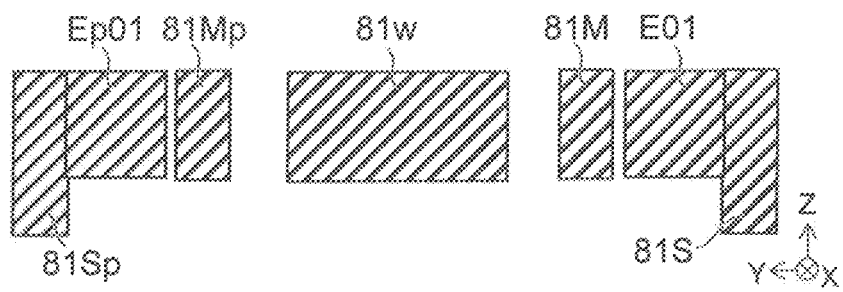
Figure 53C:
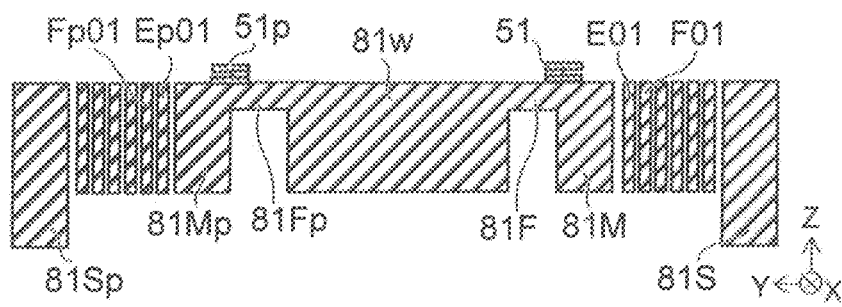
Figure 53D:
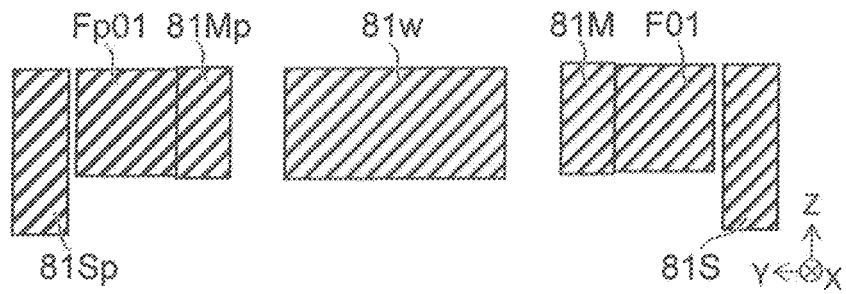
Figure 54A:
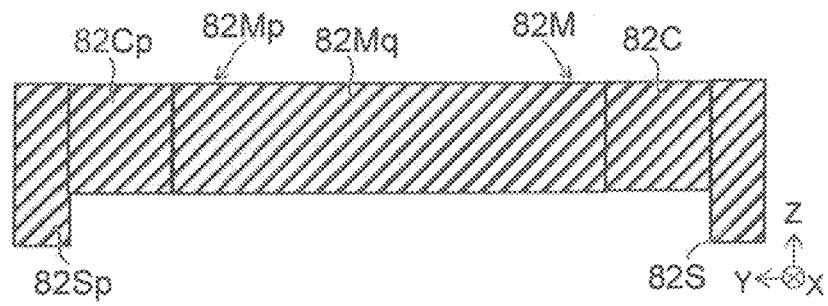
FIG. 54A to FIG. 54D are schematic views illustrating the other sensor according to the second embodiment.
Figure 54B:
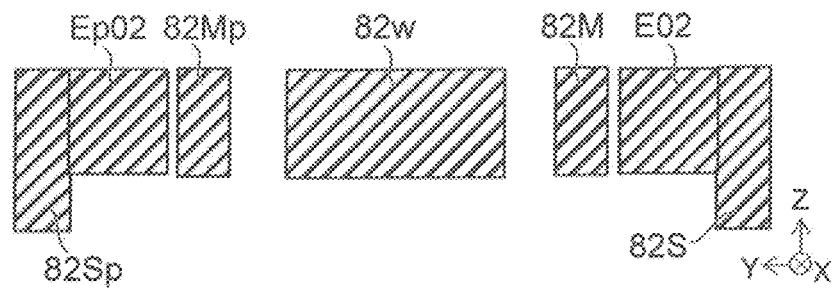
Figure 54C:
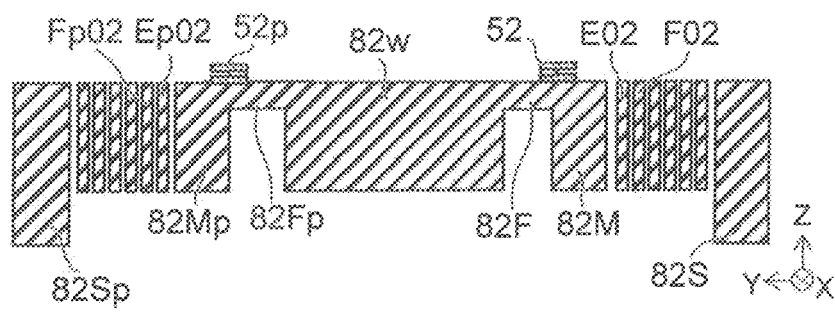
Figure 54D:
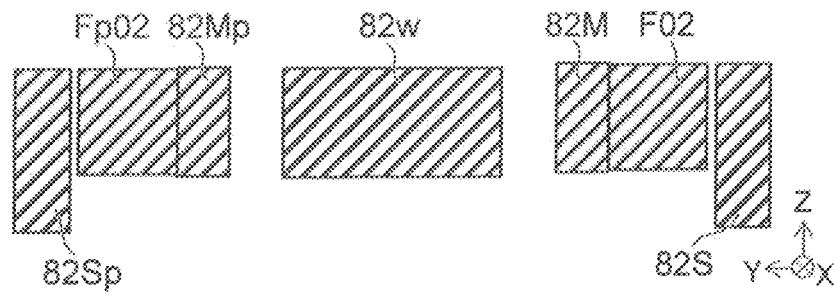

FIG. 51 is a plan view, FIG. 52A to FIG. 52E are cross-sectional views corresponding respectively to line A9-A10, line A7-A8, line A5-A6, line A3-A4, and line A1-A2 of FIG. 51. FIG. 53A to FIG. 53D are cross-sectional views corresponding respectively to line B1-B2, line B3-B4, line B5-B6, and line B7-B8 of FIG. 51. FIG. 54A to FIG. 54D are cross-sectional views corresponding respectively to line C1-C2, line C3-C4, line C5-C6, and line C7-C8 of FIG. 51.

As shown in these drawings, the sensor 124 includes the first support portion 81S, the first intermediate body 81M, the first connecting body 81C, the first support portion-side electrode E01, the first counter electrode F01, the first film 81F, and the first magnetic element 51. In the example, the first film 81F has a continuous film-like configuration rather than a beam configuration. For example, other than the first magnetic element 51, the magnetic elements $51p$, $51q$, and $51r$ are fixed to the first film 81F.

The sensor 124 includes the second support portion 82S, the second intermediate body 82M, the second connecting body 82C, the second support portion-side electrode E02, the second counter electrode F02, the second film 82F, and the second magnetic element 52. Similarly, the second film 82F has a continuous film-like configuration rather than a beam configuration. For example, other than the second magnetic element 52, the magnetic elements $52p$, $52q$, and $52r$ are fixed to the second film 82F.

Otherwise, the sensor 124 is similar to the sensor 120. In the sensor 124 as well, the sensitivity can be increased.

The first film 81F and the second film 82F have continuous film configurations. It is easy to increase the number of magnetic elements provided on these films. As described above, a high SN ratio is obtained by increasing the number of magnetic elements connected in series.

Figure 55:
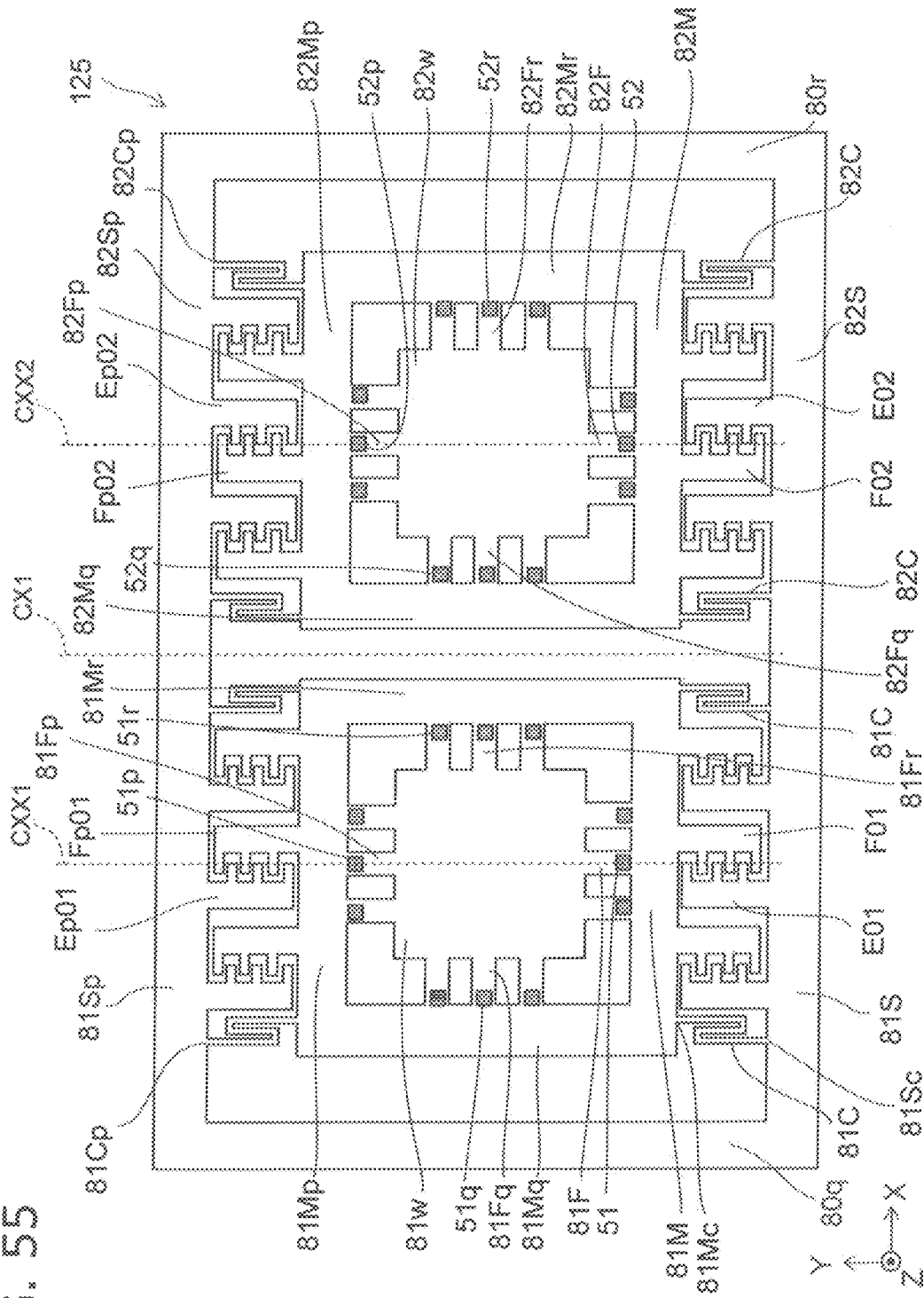
FIG. 55 is a schematic view illustrating another sensor according to the second embodiment.

FIG. 55 is a schematic view illustrating another sensor according to the second embodiment.

In the sensor 125 as shown in FIG. 55, the first connecting body 81C and the second connecting body 82C have corrugated configurations (folded spring configurations). Otherwise, the sensor 125 is similar to the sensor 120. In the sensor 124 as well, the sensitivity can be increased.

Figure 56:
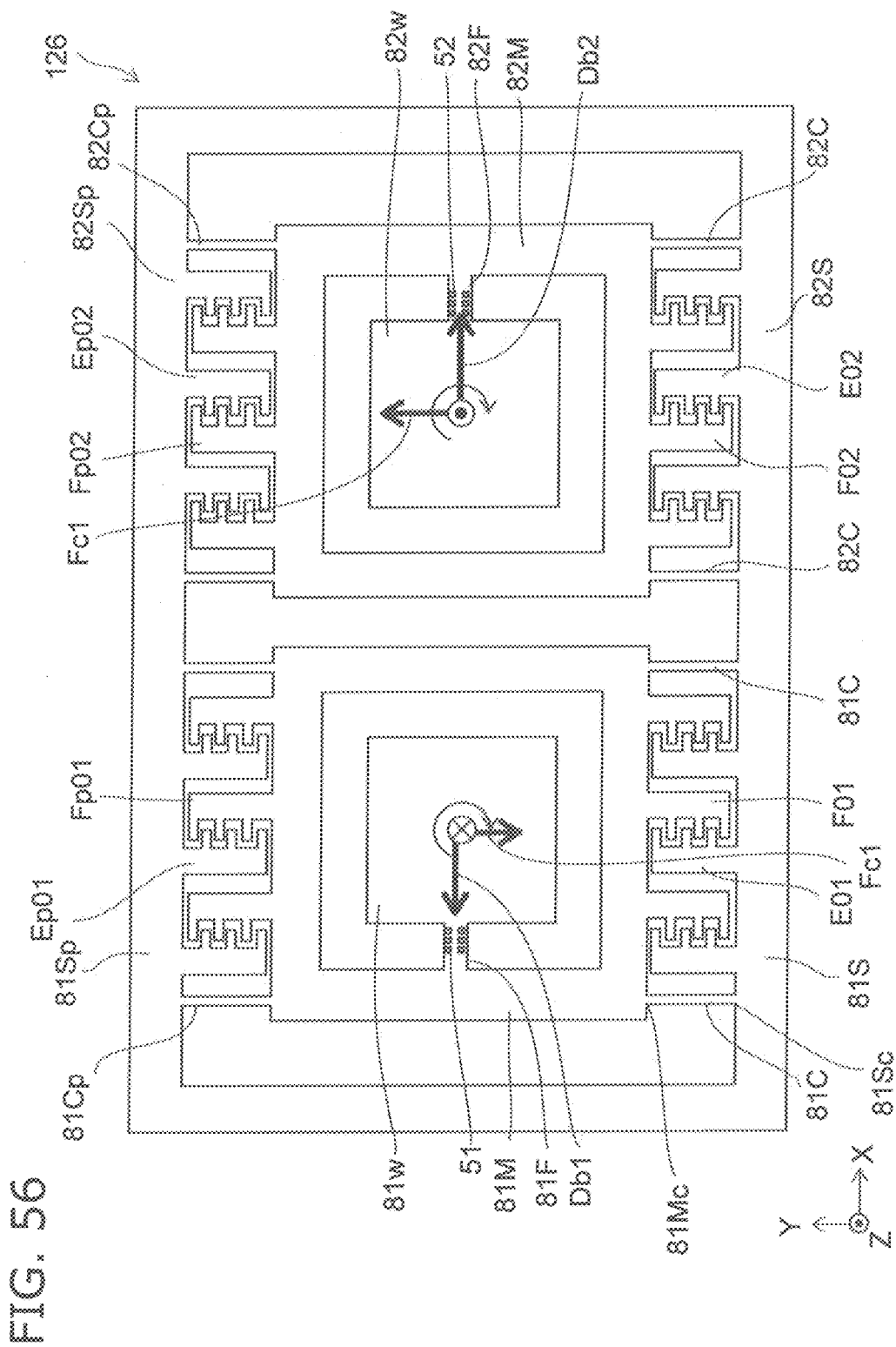
FIG. 56 is a schematic view illustrating another sensor according to the second embodiment.

FIG. 56 is a schematic view illustrating another sensor according to the second embodiment.

In the sensor 126 as shown in FIG. 56, the direction in which the first film 81F extends is aligned with the X-axis direction. On the other hand, the direction in which the first support portion-side electrode E01 and the first counter electrode F01 oppose each other is aligned with the X-axis direction. The direction in which the first connecting body 81C extends is aligned with the Y-axis direction. Similarly, the direction in which the second film 82F extends is aligned with the X-axis direction. On the other hand, the direction in which the second support portion-side electrode E02 and the second counter electrode F02 oppose each other is aligned with the X-axis direction. The direction in which the second connecting body 82C extends is aligned with the Y-axis direction.

In the sensor 126 as well, the drive forces (the first drive force Db1 and the second drive force Db2) having mutually-reverse orientations are obtained. In the sensor 126, an external force rotating around the Z-axis direction as an axis is applied. Thereby, the first force Fc1 and the second force Fc2 are obtained. For example, these forces are based on the Coriolis force. The orientations of these forces are mutually-reversed. Thereby, a change occurs in the electrical resistance of the magnetic element 51. For example, the change is based on the magnetic properties (e.g., the inverse magnetostrictive effect and the magnetoresistance effect).

It is favorable for the magnetic elements to be provided at positions shifted in the Y-axis direction with respect to the center line of the connection portion. For example, it is favorable for the magnetic elements to be provided at the end portion vicinities (the two sides) in the Y-axis direction of the connection portion.

In the sensor 126, the first force Fc1 and the second force Fc2 have Y-axis direction components. The first film 81F has two sides separated in the Y-axis direction. By providing the first magnetic element 51 at each of the two sides, sensing with a higher sensitivity is possible.

Similarly, the second film 82F has two sides separated in the Y-axis direction. By providing the second magnetic element 52 at each of the two sides, sensing with a higher sensitivity is possible.

The configurations described in reference to the first embodiment are applicable to the various configurations described in reference to the second embodiment. The materials described in reference to the first embodiment are applicable to the various configurations described in reference to the second embodiment.

Third Embodiment

Figure 57:
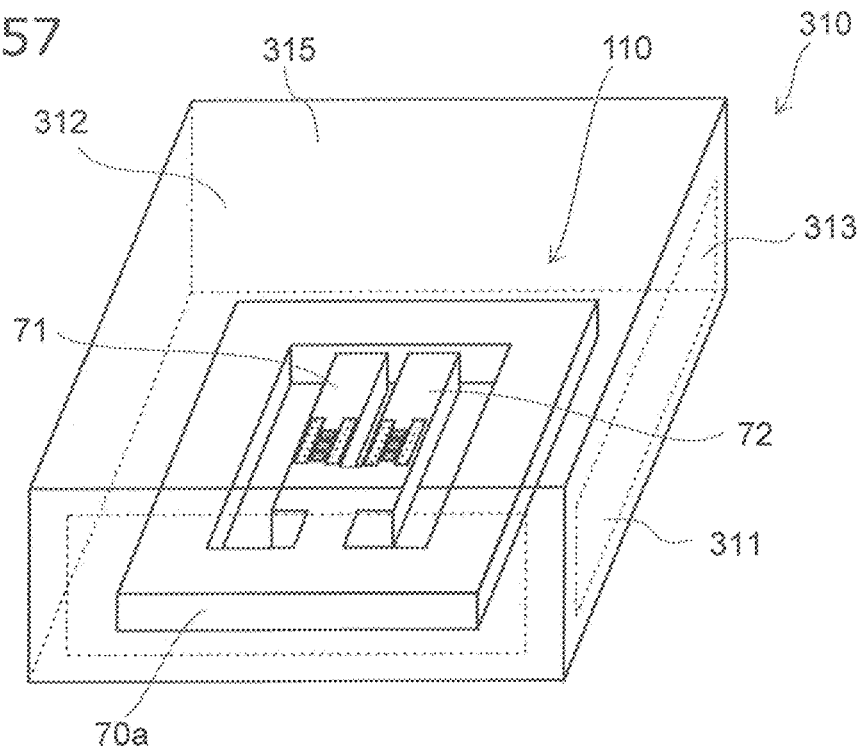
FIG. 57 is a schematic perspective view illustrating a sensor package according to a third embodiment.

FIG. 57 is a schematic perspective view illustrating a sensor package according to a third embodiment.

As shown in FIG. 57, the sensor package 310 according to the embodiment includes a housing 315 and at least one of the sensors recited above. The sensor 110 is used in the example.

The sensor 110 is provided inside the housing 315. For example, the housing 315 includes a bottom portion 311, an upper portion 312, and a side portion 313. The sensor 110 is provided between the bottom portion 311 and the upper portion 312. The side portion 313 is provided around the sensor 110. The support portions (the first support portion 70a, etc.) of the sensor 110 may be continuous with the bottom portion.

For example, for the interior of the housing 315, a gas (air, nitrogen gas, etc.) may be provided in a depressurized interior of the housing 315. The sensor 110 is protected by providing the sensor 110 in the interior of the housing 315. Sensing with high sensitivity is stably obtained. In the sensor package 310, any sensor according to the first embodiment or a modification of the first embodiment may be used.

Figure 58:
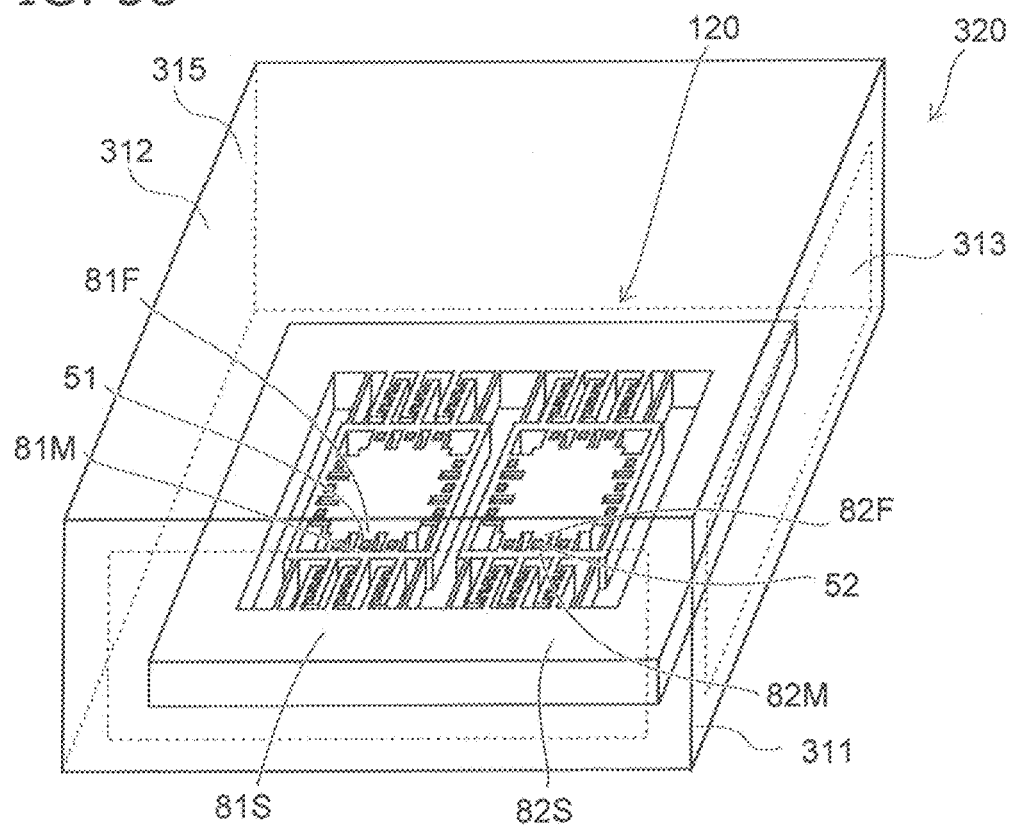
FIG. 58 is a schematic perspective view illustrating another sensor package according to the third embodiment.

FIG. 58 is a schematic perspective view illustrating another sensor package according to the third embodiment. The sensor 120 is used in the sensor package 320 as shown in FIG. 58. Any sensor according to the second embodiment or a modification of the second embodiment may be used in the sensor package 320.

In the sensor 120 that is provided inside the housing 315, for example, a gas is provided in the space between the first support portion-side electrode E01 and the first counter electrode F01. For example, the space may be depressurized.

Figure 59A:
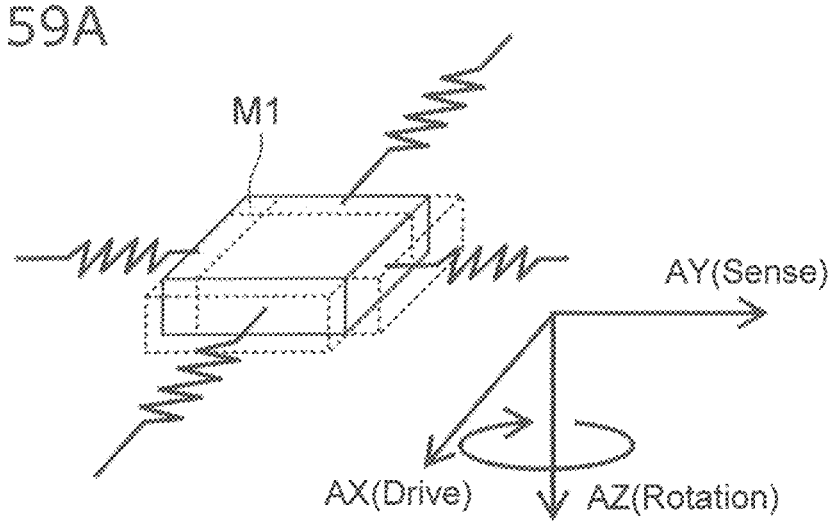
FIG. 59A and FIG. 59B are schematic views illustrating forces generated in the sensor.
Figure 59B:
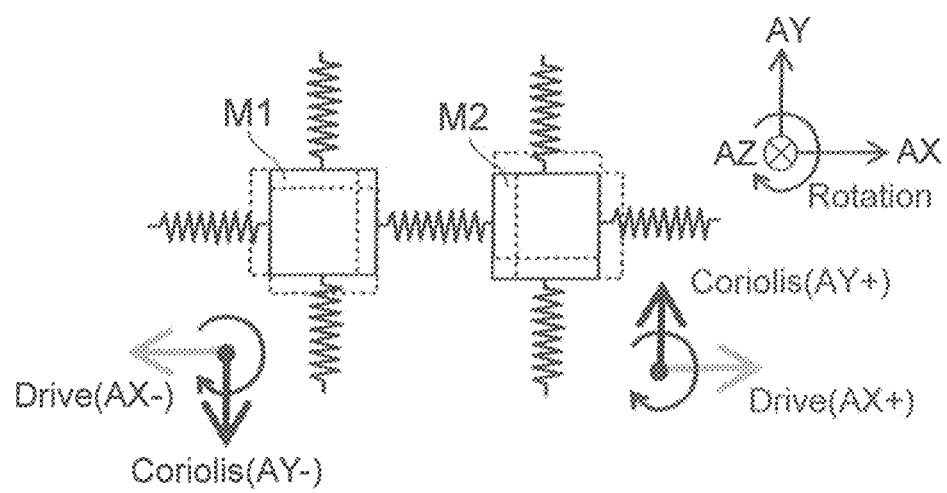

FIG. 59A and FIG. 59B are schematic views illustrating forces generated in the sensor.

As shown in FIG. 59A, for example, a drive force in the AX direction is applied to a first object M1. A rotating force in the AZ direction is applied to the object M1. At this time, a Coriolis force is generated in the AY direction.

As shown in FIG. 59B, for example, a drive force in the AX− direction is applied to the first object M1. On the other hand, a drive force in the AX+ direction is applied in a second object M2. When a force rotating around the AZ direction as an axis is applied, a force in the AY− direction is generated in the first object M1; and a force in the AY+ direction is applied to the second object M2. For example, these forces are based on the Coriolis force. Information relating to the rotating force is obtained by sensing values corresponding to these forces.

FIG. 60A to FIG. 60I are schematic perspective views illustrating operations of the sensor.

For example, a sensing element 50 shown in these drawings corresponds to the first magnetic element 51, the second magnetic element 52, etc.

Figure 60A:
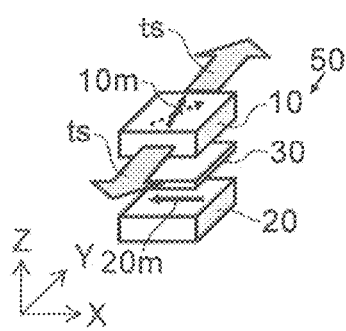
FIG. 60A to FIG. 60I are schematic perspective views illustrating operations of the sensor.
Figure 60B:
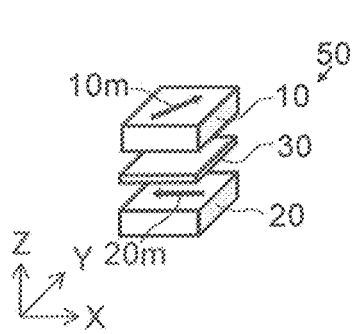
Figure 60C:
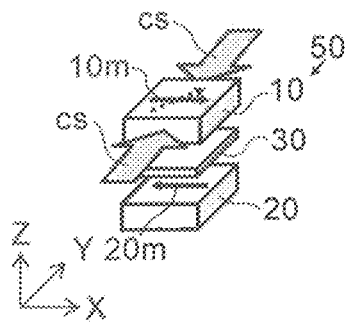
Figure 60D:
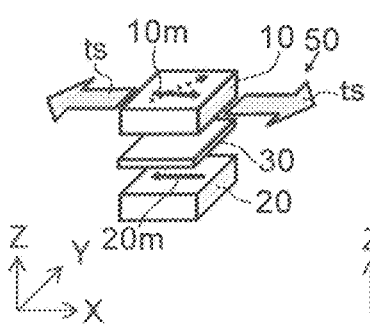
Figure 60E:
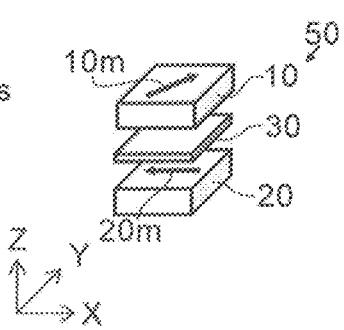
Figure 60F:
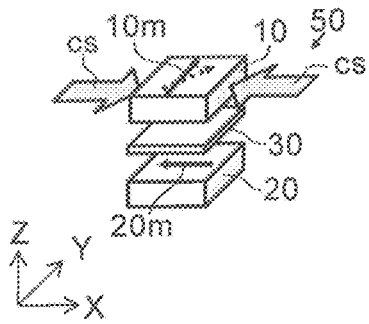
Figure 60G:
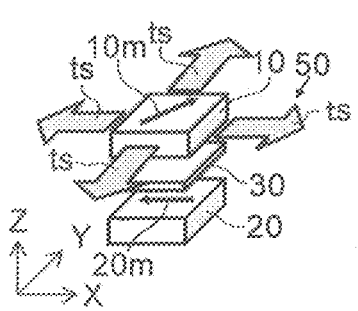
Figure 60H:
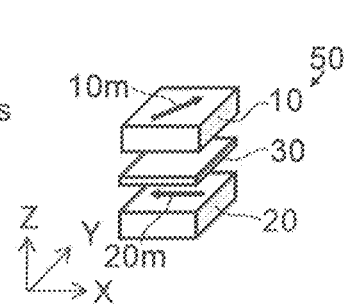
Figure 60I:
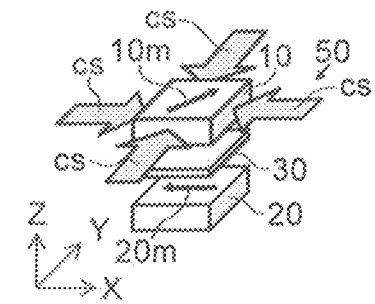

FIG. 60A to FIG. 60C illustrate states in which a strain in the Y-axis direction is applied to the sensing element 50. FIG. 60D to FIG. 60F illustrate states in which a strain in the X-axis direction is applied to the sensing element 50. FIG. 60G to FIG. 60I illustrate states in which an "isotropic strain" is applied to the sensing element 50. The "isotropic strain" is an isotropic strain in the X-Y plane.

FIG. 60B, FIG. 60E, and FIG. 60H correspond to states in which there is no strain, FIG. 60A, FIG. 60D, and FIG. 60G correspond to states in which the tensile strain ts is generated. FIG. 60C, FIG. 60F, and FIG. 60I correspond to states in which the compressive strain cs is generated.

As shown in FIG. 60A, in the case where the tensile strain ts in the Y-axis direction is generated, the angle (the relative angle) between the direction of a magnetization 10m of a free magnetic layer 10 (e.g., the first magnetic layer m01) and the direction of a magnetization 20m of a fixed magnetic layer 20 (e.g., the second magnetic layer m02) is smaller than that of the state in which the strain is not applied (the state of FIG. 60B). As a result, the electrical resistance of the sensing element 50 decreases.

As illustrated in FIG. 60C, in the case where the compressive strain cs is generated in the Y-axis direction, the relative angle of the magnetization is larger than that of the state in which the strain is not applied (the state of FIG. 60B). As a result, the electrical resistance increases.

As illustrated in FIG. 60D, in the case where the tensile strain ts is generated in the X-axis direction, the relative angle of the magnetization is larger than that of the state in which the strain is not applied (the state of FIG. 60E). As a result, the electrical resistance of the sensing element 50 increases.

As illustrated in FIG. 60F, in the case where the compressive strain cs is generated in the X-axis direction, the relative angle of the magnetization is smaller than that of the state in which the strain is not applied (the state of FIG. 60E). As a result, the electrical resistance of the sensing element 50 decreases.

As illustrated in FIG. 60G to FIG. 60I, in the case where the "isotropic strain" is applied, the direction of the magnetization 10m of the free magnetic layer substantially does not change. Therefore, the electrical resistance substantially does not change for the strains of the two polarities of the tensile strain ts and the compressive strain cs.

Thus, in the sensing element 50, the change of the obtained electrical resistance is different according to the orientation of the applied strain.

FIG. 51 is a schematic perspective view illustrating a portion of a pressure sensor according to the embodiment.

Figure 61:
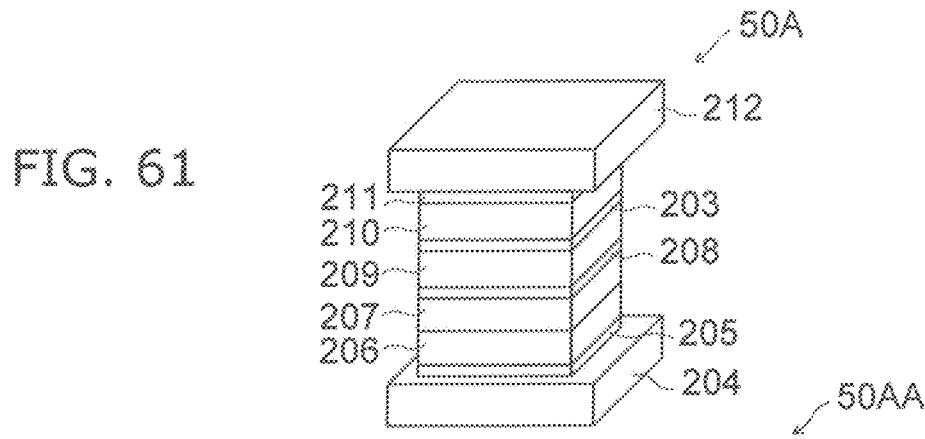
FIG. 61 is a schematic perspective view illustrating a portion of a pressure sensor according to the embodiment.

In a sensing element 50A as shown in FIG. 61, a lower electrode 204, a foundation layer 205, a pinning layer 206, a second fixed magnetic layer 207, a magnetic coupling layer 208, a first fixed magnetic layer 209, an intermediate layer 203, a free magnetic layer 210, a capping layer 211, and an upper electrode 212 are arranged in this order. For example, the sensing element 50A is a bottom spin-valve type.

The foundation layer 205 includes, for example, a stacked film of tantalum and ruthenium (Ta/Ru). The thickness (the length in the Z-axis direction) of the Ta layer is, for example, 3 nanometers (nm). The thickness of the Ru layer is, for example, 2 nm. The pinning layer 206 includes, for example, an IrMn layer having a thickness of 7 nm. The second fixed magnetic layer 207 includes, for example, a $Co_{75}Fe_{25}$ layer having a thickness of 2.5 nm. The magnetic coupling layer 208 includes, for example, a Ru layer having a thickness of 0.9 nm. The first fixed magnetic layer 209 includes, for example, a $Co_{40}Fe_{40}B_{20}$ layer having a thickness of 3 nm. The intermediate layer 203 includes, for example, a MgO layer having a thickness of 1.6 nm. The free magnetic layer 210 includes, for example, $Co_{40}Fe_{40}B_{20}$ having a thickness of 4 nm. The capping layer 211 includes, for example, Ta/Ru. The thickness of the Ta layer is, for example, 1 nm. The thickness of the Ru layer is, for example, 5 nm.

The lower electrode 204 and the upper electrode 212 include, for example, at least one of aluminum (Al), an aluminum copper alloy (Al—Cu), copper (Cu), silver (Ag), or gold (Au). By using such a material having a relatively small electrical resistance as the lower electrode 204 and the upper electrode 212, the current can be caused to flow efficiently in the sensing element 50A. The lower electrode 204 and the upper electrode 212 include nonmagnetic materials.

The lower electrode 204 and the upper electrode 212 may include, for example, a foundation layer (not illustrated) for the lower electrode 204 and the upper electrode 212, a capping layer (not illustrated) for the lower electrode 204 and the upper electrode 212, and a layer of at least one of Al, Al—Cu, Cu, Ag, or Au provided between the foundation layer and the capping layer. For example, the lower electrode 204 and the upper electrode 212 include tantalum (Ta)/copper (Cu)/tantalum (Ta), etc. For example, by using Ta as the foundation layer for the lower electrode 204 and the upper electrode 212, the adhesion between the substrate (e.g., the film) and the lower electrode 204 and between the substrate and the upper electrode 212 improves. Titanium (Ti), titanium nitride (TiN), etc., may be used as the foundation layer for the lower electrode 204 and the upper electrode 212.

By using Ta as the capping layer for the lower electrode 204 and the upper electrode 212, the oxidization of the copper (Cu), etc., under the capping layer is suppressed. Titanium (Ti), titanium nitride (TiN), etc., may be used as the capping layer for the lower electrode 204 and the upper electrode 212.

The foundation layer 205 includes, for example, a stacked structure including a buffer layer (not illustrated) and a seed layer (not illustrated). For example, the buffer layer relaxes the roughness of the surfaces of the lower electrode 204, the film, etc., and improves the crystallinity of the layers stacked on the buffer layer. For example, at least one selected from the group consisting of tantalum (Ta), titanium (Ti), vanadium (V), tungsten (W), zirconium (Zr), hafnium (Hf), and chrome (Cr) is used as the buffer layer. An alloy that includes at least one material selected from these materials may be used as the buffer layer.

It is favorable for the thickness of the buffer layer of the foundation layer 205 to be not less than 1 nm and not more than 10 nm. It is more favorable for the thickness of the buffer layer to be not less than 1 nm and not more than 5 nm. In the case where the thickness of the buffer layer is too thin, the buffering effect is lost. In the case where the thickness of the buffer layer is too thick, the thickness of the sensing element 50A becomes excessively thick. The seed layer is formed on the buffer layer; and, for example, the seed layer has a buffering effect. In such a case, the buffer layer may be omitted. The buffer layer includes, for example, a Ta layer having a thickness of 3 nm.

The seed layer of the foundation layer 205 controls the crystal orientation of the layers stacked on the seed layer. The seed layer controls the crystal grain size of the layers stacked on the seed layer. As the seed layer, a metal having a fcc structure (a face-centered cubic structure), a hcp structure (a hexagonal close-packed structure), a bcc structure (a body-centered cubic structure), or the like is used.

For example, the crystal orientation of the spin-valve film on the seed layer can be set to the fcc (111) orientation by using, as the seed layer of the foundation layer 205, ruthenium (Ru) having a hcp structure, NiFe having a fcc structure, or Cu having a fcc structure. The seed layer includes, for example, a Cu layer having a thickness of 2 nm or a Ru layer having a thickness of 2 nm. To increase the crystal orientation of the layers formed on the seed layer, it is favorable for the thickness of the seed layer to be not less than 1 nm and not more than 5 nm. It is more favorable for the thickness of the seed layer to be not less than 1 nm and not more than 3 nm. Thereby, the function as a seed layer that improves the crystal orientation is realized sufficiently.

On the other hand, for example, the seed layer may be omitted in the case where it is unnecessary for the layers formed on the seed layer to have a crystal orientation (e.g., in the case where an amorphous free magnetic layer is formed, etc.). For example, a Ru layer having a thickness of 2 nm is used as the seed layer.

For example, the pinning layer 206 provides unidirectional anisotropy to the second fixed magnetic layer 207 (the ferromagnetic layer) formed on the pinning layer 206 and fixes the magnetization of the second fixed magnetic layer 207. The pinning layer 206 includes, for example, an antiferromagnetic layer. The pinning layer 206 includes, for example, at least one selected from the group consisting of Ir—Mn, Pt—Mn, Pd—Pt—Mn, Ru—Mn, Rh—Mn, Ru—Rh—Mn, Fe—Mn, Ni—Mn, Cr—Mn—Pt, and Ni—O. An alloy may be used in which an added element is further added to the at least one selected from the group consisting of Ir—Mn, Pt—Mn, Pd—Pt—Mn, Ru—Mn, Rh—Mn, Ru—Rh—Mn, Fe—Mn, Ni—Mn, Cr—Mn—Pt, and Ni—O. The thickness of the pinning layer 206 is set appropriately. Thereby, for example, unidirectional anisotropy of sufficient strength is provided.

For example, heat treatment is performed while applying a magnetic field. Thereby, for example, the magnetization of the ferromagnetic layer contacting the pinning layer 206 is fixed. The magnetization of the ferromagnetic layer contacting the pinning layer 206 is fixed in the direction of the magnetic field applied in the heat treatment. For example, the heat treatment temperature (the annealing temperature) is not less than the magnetization pinning temperature of the antiferromagnetic material included in the pinning layer 206. In the case where an antiferromagnetic layer including Mn is used, there are cases where the MR ratio decreases due to the Mn diffusing into layers other than the pinning layer 206. It is desirable for the heat treatment temperature to be set to be not more than the temperature at which the diffusion of Mn occurs. The heat treatment temperature is, for example, not less than 200° C. and not more than 500° C. Favorably, the heat treatment temperature is, for example, not less than 250° C. and not more than 400° C.

In the case where PtMn or PdPtMn is used as the pinning layer 206, it is favorable for the thickness of the pinning layer 206 to be not less than 8 nm and not more than 20 nm. It is more favorable for the thickness of the pinning layer 206 to be not less than 10 nm and not more than 15 nm. In the case where IrMn is used as the pinning layer 206, unidirectional anisotropy can be provided using a thickness that is thinner than the case where PtMn is used as the pinning layer 206. In such a case, it is favorable for the thickness of the pinning layer 206 to be not less than 4 nm and not more than 18 nm. It is more favorable for the thickness of the pinning layer 206 to be not less than 5 nm and not more than 15 nm. The pinning layer 206 includes, for example, an $Ir_{22}Mn_{78}$ layer having a thickness of 7 nm.

A hard magnetic layer may be used as the pinning layer 206. For example, Co—Pt, Fe—Pt, Co—Pd, Fe—Pd, etc., may be used as the hard magnetic layer. For example, the magnetic anisotropy and the coercivity are relatively high for these materials. These materials are hard magnetic materials. An alloy in which an added element is further added to Co—Pt, Fe—Pt, Co—Pd, or Fe—Pd may be used as the pinning layer 206. For example, CoPt (the proportion of Co being not less than 50 at. % and not more than 85 at. %), $(Co_xPt_{100-x})_{100-y}Cr_y$ (x being not less than 50 at. % and not more than 85 at. %, and y being not less than 0 at. % and not more than 40 at. %), FePt (the proportion of Pt being not less than 40 at. % and not more than 60 at. %), etc., may be used.

The second fixed magnetic layer 207 includes, for example, a $Co_xFe_{100-x}$ alloy (x being not less than 0 at. % and not more than 100 at. %) or a $Ni_xFe_{100-x}$ alloy (x being not less than 0 at. % and not more than 100 at. %). These materials may include a material to which a nonmagnetic element is added. For example, at least one selected from the group consisting of Co, Fe, and Ni is used as the second fixed magnetic layer 207. An alloy that includes the at least one material selected from these materials may be used as the second fixed magnetic layer 207. Also, a $(Co_xFe_{100-x})_{100-y}B_y$ alloy (x being not less than 0 at. % and not more than 100 at. % and y being not less than 0 at. % and not more than 30 at. %) may be used as the second fixed magnetic layer 207. By using an amorphous alloy of $(Co_xFe_{100-x})_{100-y}B_y$ as the second fixed magnetic layer 207, the fluctuation of the characteristics of the sensing element 50A can be suppressed even in the case where the sizes of the sensing elements are small.

For example, it is favorable for the thickness of the second fixed magnetic layer 207 to be not less than 1.5 nm and not more than 5 nm. Thereby, for example, the strength of the unidirectional anisotropic magnetic field due to the pinning layer 206 can be stronger. For example, the strength of the antiferromagnetic coupling magnetic field between the second fixed magnetic layer 207 and the first fixed magnetic layer 209 via the magnetic coupling layer formed on the second fixed magnetic layer 207 can be stronger. For example, it is favorable for the magnetic thickness (the product of the saturation magnetization and the thickness) of the second fixed magnetic layer 207 to be substantially equal to the magnetic thickness of the first fixed magnetic layer 209.

The saturation magnetization of the thin film of $Co_{40}Fe_{40}B_{20}$ is about 1.9 T (teslas). For example, in the case where a $Co_{40}Fe_{40}B_{20}$ layer having a thickness of 3 nm is used as the first fixed magnetic layer 209, the magnetic thickness of the first fixed magnetic layer 209 is 1.9 T×3 nm, i.e., 5.7 Tnm. On the other hand, the saturation magnetization of the $Co_{75}Fe_{25}$ is about 2.1 T. The thickness of the second fixed magnetic layer 207 to obtain a magnetic thickness equal to that recited above is 5.7 Tnm/2.1 T, i.e., 2.7 nm. In such a case, it is favorable for a $Co_{75}Fe_{25}$ layer having a thickness of about 2.7 nm to be used as the second fixed magnetic layer 207. For example, a $Co_{75}Fe_{25}$ layer having a thickness of 2.5 nm is used as the second fixed magnetic layer 207.

In the sensing element 50A, a synthetic pinned structure of the second fixed magnetic layer 207, the magnetic coupling layer 208, and the first fixed magnetic layer 209 is used. A single pinned structure made of one fixed magnetic layer may be used instead. In the case where the single pinned structure is used, for example, a $Co_{40}Fe_{40}B_{20}$ layer having a thickness of 3 nm is used as the fixed magnetic layer. The same material as the material of the second fixed magnetic layer 207 described above may be used as the ferromagnetic layer included in the fixed magnetic layer having the single pinned structure.

The magnetic coupling layer 208 causes antiferromagnetic coupling to occur between the second fixed magnetic layer 207 and the first fixed magnetic layer 209. The magnetic coupling layer 208 has a synthetic pinned structure. For example, Ru is used as the material of the magnetic coupling layer 208. For example, it is favorable for the thickness of the magnetic coupling layer 208 to be not less than 0.8 nm and not more than 1 nm. A material other than Ru may be used as the magnetic coupling layer 208 if the material causes sufficient antiferromagnetic coupling to occur between the second fixed magnetic layer 207 and the first fixed magnetic layer 209. For example, the thickness of the magnetic coupling layer 208 is set to be a thickness not less than 0.8 nm and not more than 1 nm corresponding to the second peak (2nd peak) of RKKY (Ruderman-Kittel-Kasuya-Yosida) coupling. Further, the thickness of the magnetic coupling layer 208 may be set to be a thickness not less than 0.3 nm and not more than 0.6 nm corresponding to the first peak (1st peak) of RKKY coupling. For example, Ru having a thickness of 0.9 nm is used as the material of the magnetic coupling layer 208. Thereby, highly reliable coupling is obtained more stably.

The magnetic layer that is included in the first fixed magnetic layer 209 contributes directly to the MR effect. For example, a Co—Fe—B alloy is used as the first fixed magnetic layer 209. Specifically, a $(Co_xFe_{100-x})_{100-y}B_y$ alloy (x being not less than 0 at. % and not more than 100 at. % and y being not less than 0 at. % and not more than 30 at. %) also may be used as the first fixed magnetic layer 209. For example, the fluctuation between the elements caused by crystal grains can be suppressed even in the case where the size of the sensing element 50A is small by using a $(Co_xFe_{100-x})_{100-y}B_y$ amorphous alloy as the first fixed magnetic layer 209.

The layer (e.g., a tunneling insulating layer (not illustrated)) that is formed on the first fixed magnetic layer 209 may be planarized. The defect density of the tunneling insulating layer can be reduced by planarizing the tunneling insulating layer. Thereby, a higher MR ratio is obtained with a lower resistance per area. For example, in the case where MgO is used as the material of the tunneling insulating layer, the (100) orientation of the MgO layer formed on the tunneling insulating layer can be strengthened by using a $(Co_xFe_{100-x})_{100-y}B_y$ amorphous alloy as the first fixed magnetic layer 209. A higher MR ratio is obtained by increasing the (100) orientation of the MgO layer. The $(Co_xFe_{100-x})_{100-y}B_y$ alloy crystallizes using the (100) plane of the MgO layer as a template when annealing. Therefore, good crystal conformation between the MgO and the $(Co_xFe_{100-x})_{100-y}B_y$ alloy is obtained. A higher MR ratio is obtained by obtaining good crystal conformation.

Other than the Co—Fe—B alloy, for example, an Fe—Co alloy may be used as the first fixed magnetic layer 209.

A higher MR ratio is obtained as the thickness of the first fixed magnetic layer 209 increases. For example, a larger fixed magnetic field is obtained as the thickness of the first fixed magnetic layer 209 decreases. A trade-off relationship between the MR ratio and the fixed magnetic field exists for the thickness of the first fixed magnetic layer 209. In the case where the Co—Fe—B alloy is used as the first fixed magnetic layer 209, it is favorable for the thickness of the first fixed magnetic layer 209 to be not less than 1.5 nm and not more than 5 nm. It is more favorable for the thickness of the first fixed magnetic layer 209 to be not less than 2.0 nm and not more than 4 nm.

Other than the materials described above, the first fixed magnetic layer 209 may include a $Co_{90}Fe_{10}$ alloy having a fcc structure, Co having a hcp structure, or a Co alloy having a hcp structure. For example, at least one selected from the group consisting of Co, Fe, and Ni is used as the first fixed magnetic layer 209. An alloy that includes at least one material selected from these materials is used as the first fixed magnetic layer 209. For example, a higher MR ratio is obtained by using an FeCo alloy material having a bcc structure, a Co alloy having a cobalt composition of 50% or more, or a material (a Ni alloy) having a Ni composition of 50% or more as the first fixed magnetic layer 209.

For example, a Heusier magnetic alloy layer such as $Co_2MnGe$, $Co_2eGe$, $Co_2MnSi$, $Co_2FeSi$, $Co_2MnAl$, $Co_2FeAl$, $Co_2MnGa_{0.5}Ge_{0.5}$, $Co_2FeGa_{0.5}Ge_{0.5}$, etc., also may be used as the first fixed magnetic layer 209. For example, a $Co_{40}Fe_{40}B_{20}$ layer having a thickness of 3 nm may be used as the first fixed magnetic layer 209.

For example, the intermediate layer 203 breaks the magnetic coupling between the first fixed magnetic layer 209 and the free magnetic layer 210.

For example, the material of the intermediate layer 203 includes a metal, an insulator, or a semiconductor. For example, Cu, Au, Ag, or the like is used as the metal. In the case where a metal is used as the intermediate layer 203, the thickness of the intermediate layer is, for example, not less than about 1 nm and not more than about 7 nm. For example, magnesium oxide (MgO, etc.), aluminum oxide ($Al_2O_3$, etc.), titanium oxide (TiO, etc.), zinc oxide (ZnO, etc.), gallium oxide (Ga—O), or the like is used as the insulator or the semiconductor. In the case where the insulator or the semiconductor is used as the intermediate layer 203, the thickness of the intermediate layer 203 is, for example, not less than about 0.6 nm and not more than about 2.5 nm. For example, a CCP (Current-Confined-Path) spacer layer may be used as the intermediate layer 203. In the case where a CCP spacer layer is used as the spacer layer, for example, a structure is used in which a copper (Cu) metal path is formed inside an insulating layer of aluminum oxide ($Al_2O_3$). For example, a MgO layer having a thickness of 1.6 nm is used as the intermediate layer.

The free magnetic layer 210 includes a ferromagnet material. For example, the free magnetic layer 210 includes a ferromagnet material including Fe, Co, and Ni. For example, an FeCo alloy, a NiFe alloy, or the like is used as the material of the free magnetic layer 210. The free magnetic layer 210 may include a Co—Fe—B alloy, an Fe—Co—Si—B alloy, an Fe—Ga alloy having a large λs (magnetostriction constant), an Fe—Co—Ga alloy, a Tb—H—Fe alloy, a Tb-M1-Fe-M2 alloy, an Fe-M3-M4-B alloy, Ni, Fe—Al, ferrite, etc. For example, λs (the magnetostriction constant) is large for these materials. In the Tb-M-Fe alloy recited above, M is at least one selected from the group consisting of Sm, Eu, Gd, Dy, Ho, and Er. In the Tb-M1-Fe-M2 alloy recited above, M1 is at least one selected from the group consisting of Sm, Eu, Gd, Dy, Ho, and Er. M2 is at least one selected from the group consisting of Ti, Cr, Mn, Co, Cu, Nb, Mo, W, and Ta. In the Fe-M3-M4-B alloy recited above, M3 is at least one selected from the group consisting of Ti, Cr, Mn, Co, Cu, Nb, Mo, W, and Ta. M4 is at least one selected from the group consisting of Ce, Pr, Nd, Sm, Tb, Dy, and Er. $Fe_3O_4$, $(FeCo)_3O_4$, etc., are examples of the ferrite recited above. The thickness of the free magnetic layer 210 is, for example, 2 nm or more.

The free magnetic layer 210 may include a magnetic material including boron. The free magnetic layer 210 may include, for example, an alloy including boron (B) and at least one element selected from the group consisting of Fe, Co, and Ni. For example, the free magnetic layer 210 includes a Co—Fe—B alloy or an Fe—B alloy. For example, a $Co_{40}Fe_{40}B_{20}$ alloy is used, Ga, Al, Si, W, etc., may be added in the case where the free magnetic layer 210 includes an alloy including boron (B) and at least one element selected from the group consisting of Fe, Co, and Ni. For example, high magnetostriction is promoted by adding these elements. For example, an Fe—Ga—B alloy, an Fe—Co—Ga—B alloy, or an Fe—Co—Si—B alloy may be used as the free magnetic layer 210. By using such a magnetic material containing boron, the coercivity (Hc) of the free magnetic layer 210 is low; and the change of the magnetization direction for the strain is easy. Thereby, high sensitivity is obtained.

It is favorable for the boron concentration (e.g., the composition ratio of boron) of the free magnetic layer 210 to be 5 at. % (atomic percent) or more. Thereby, an amorphous structure is obtained easily. It is favorable for the boron concentration of the free magnetic layer to be 35 at. % or less. For example, the magnetostriction constant decreases when the boron concentration is too high. For example, it is favorable for the boron concentration of the free magnetic layer to be not less than 5 at. % and not more than 35 at. %; and it is more favorable to be not less than 10 at. % and not more than 30 at. %.

In the case where a portion of the magnetic layer of the free magnetic layer 210 includes $Fe_{1-y}B_y$, ($0<y<0.3$) or $(Fe_zX_{1-z})_{1-y}B_y$ (X being Co or Ni, $0.8 \le z<1$, and $0<y<0.3$), it becomes easy to realize both a large magnetostriction constant λ and a low coercivity. Therefore, this is particularly favorable from the perspective of obtaining a high gauge factor. For example, $Fe_{80}B_{20}$ (4 nm) is used as the free magnetic layer 210. $Co_{40}Fe_{40}B_{20}$ (0.5 nm)/$Fe_{80}B_{20}$ (4 nm) may be used as the free magnetic layer.

The free magnetic layer 210 may have a multilayered structure. In the case where a tunneling insulating layer of MgO is used as the intermediate layer 203, it is favorable to provide a layer of a Co—Fe—B alloy at the portion of the free magnetic layer 210 contacting the intermediate layer 203. Thereby, a high magnetoresistance effect is obtained. In such a case, a layer of a Co—Fe—B alloy is provided on the intermediate layer 203; and another magnetic material that has a large magnetostriction constant is provided on the layer of the Co—Fe—B alloy. In the case where the free magnetic layer 210 has the multilayered structure, for example, the free magnetic layer 210 may include Co—Fe—B (2 nm)/Fe—Co—Si—B (4 m), etc.

The capping layer 211 protects the layers provided under the capping layer 211. The capping layer 211 includes, for example, multiple metal layers. The capping layer 211 includes, for example, a two-layer structure (Ta/Ru) of a Ta layer and a Ru layer. The thickness of the Ta layer is, for example, 1 nm; and the thickness of the Ru layer is, for example, 5 nm. As the capping layer 211, another metal layer may be provided instead of the Ta layer and/or the Ru layer. The configuration of the capping layer 211 is arbitrary. For example, a nonmagnetic material is used as the capping layer 211. Another material may be used as the capping layer 211 as long as the material can protect the layers provided under the capping layer 211.

In the case where the free magnetic layer 210 includes a magnetic material containing boron, a diffusion suppression layer (not illustrated) of an oxide material and/or a nitride material may be provided between the free magnetic layer 210 and the capping layer 211. Thereby, for example, the diffusion of boron is suppressed. By using the diffusion suppression layer including an oxide layer or a nitride layer, the diffusion of boron included in the free magnetic layer 210 can be suppressed; and the amorphous structure of the free magnetic layer 210 can be maintained. As the oxide material and/or the nitride material included in the diffusion suppression layer, for example, an oxide material or a nitride material including an element such as Mg, Al, Si, Ti, V, Cr, Mn, Fe, Co, Ni, Cu, Zn, Zr, Nb, Mo, Ru, Rh, Pd, Ag, Hf, Ta, W, Sn, Cd, Ga, or the like is used. The diffusion suppression layer is a layer that does not contribute to the magnetoresistance effect. It is favorable for the resistance per area of the diffusion suppression layer to be low. For example, it is favorable for the resistance per area of the diffusion suppression layer to be set to be lower than the resistance per area of the intermediate layer that contributes to the magnetoresistance effect. From the perspective of reducing the resistance per area of the diffusion suppression layer, it is favorable for the diffusion suppression layer to be an oxide or a nitride of Mg, Ti, V, Zn, Sn, Cd, or Ga. The barrier height of these materials is low. It is favorable to use an oxide having a strong chemical bond to suppress the diffusion of boron. For example, a MgO layer of 1.5 nm is used. Oxynitrides are included in one of the oxide or the nitride.

In the case where the diffusion suppression layer includes an oxide or a nitride, it is favorable for the thickness of the diffusion suppression layer to be, for example, 0.5 nm or more. Thereby, the diffusion suppression function of boron is realized sufficiently. It is favorable for the thickness of the diffusion suppression layer to be 5 nm or less. Thereby, for example, a low resistance per area is obtained. It is favorable for the thickness of the diffusion suppression layer to be not less than 0.5 nm and not more than 5 nm; and it is more favorable to be not less than 1 nm and not more than 3 nm.

At least one selected from the group consisting of magnesium (Mg), silicon (Si), and aluminum (Al) may be used as the diffusion suppression layer. A material that includes these light elements may be used as the diffusion suppression layer. These light elements produce compounds by bonding with boron. For example, at least one of a Mg—B compound, an Al—B compound, or a Si—B compound is formed at the portion including the interface between the diffusion suppression layer and the free magnetic layer 210. These compounds suppress the diffusion of boron.

Another metal layer, etc., may be inserted between the diffusion suppression layer and the free magnetic layer 210. In the case where the distance between the diffusion suppression layer and the free magnetic layer 210 is too long, boron diffuses between the diffusion suppression layer and the free magnetic layer 210; and the boron concentration in the free magnetic layer 210 undesirably decreases. Therefore, it is favorable for the distance between the diffusion suppression layer and the free magnetic layer 210 to be 10 nm or less; and it is more favorable to be 3 nm or less.

Figure 62:
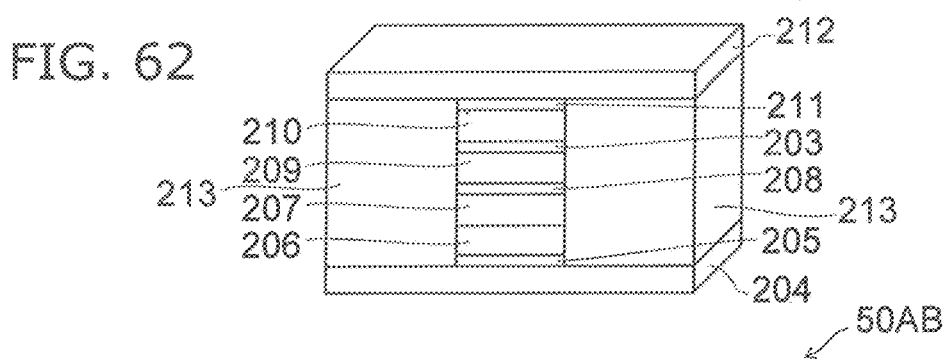
FIG. 62 is a schematic perspective view illustrating a portion of another pressure sensor according to the embodiment.

FIG. 62 is a schematic perspective view illustrating a portion of another pressure sensor according to the embodiment.

As shown in FIG. 62, other than an insulating layer 213 being provided, a sensing element 50AA is similar to the sensing element 50A. The insulating layer 213 is provided between the lower electrode 204 and the upper electrode 212. The insulating layer 213 is arranged with the free magnetic layer 210 and the first fixed magnetic layer 209 in a direction crossing the direction connecting the lower electrode 204 and the upper electrode 212. The portions other than the insulating layer 213 are similar to those of the sensing element 50A; and a description is therefore omitted.

The insulating layer 213 includes, for example, aluminum oxide (e.g., $Al_2O_3$), silicon oxide (e.g., $SiO_2$), etc. The leakage current of the sensing element 50AA is suppressed by the insulating layer 213. The insulating layer 213 may be provided in the sensing elements described below.

Figure 63:
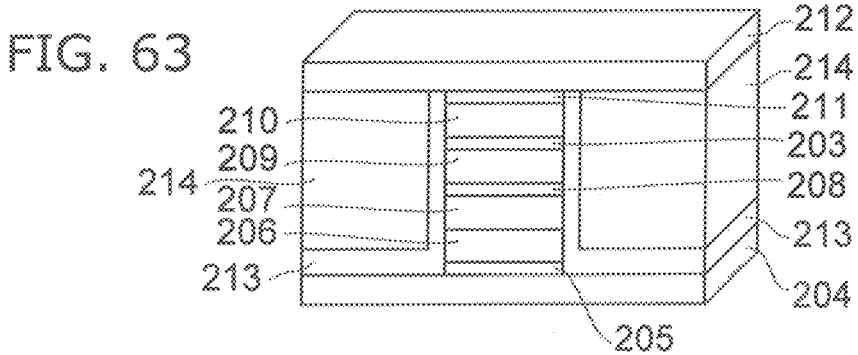
FIG. 63 is a schematic perspective view illustrating a portion of another pressure sensor according to the embodiment.

FIG. 63 is a schematic perspective view illustrating a portion of another pressure sensor according to the embodiment.

As shown in FIG. 63, a bias layer 214 is further provided in a sensing element 50AB. Otherwise, the sensing element 50AB is similar to the sensing element 50A. The bias layer 214 is provided between the lower electrode 204 and the upper electrode 212. The free magnetic layer 210 and the first fixed magnetic layer 209 are disposed between two portions of the bias layer 214 in a direction crossing the direction connecting between the lower electrode 204 and the upper electrode 212. Otherwise, the sensing element 50AB is similar to the sensing element 50AA.

The bias layer 214 sets the magnetization direction of the free magnetic layer 210 by the magnetization of the bias layer 214. The magnetization direction of the free magnetic layer 210 is set to the desired direction by the bias layer 214 in a state in which pressure from the outside is not applied to the film.

The bias layer 214 includes, for example, Co—Pt, Fe—Pt, Co—Pd, Fe—Pd, etc. For example, the magnetic anisotropy and the coercivity are relatively high for these materials.

These materials are, for example, hard magnetic materials. The bias layer 214 may include, for example, an alloy in which an added element is further added to Co—Pt, Fe—Pt, Co—Pd, or Fe—Pd. The bias layer 214 may include, for example, CoPt (the proportion of Co being not less than 50 at. % and not more than 85 at. %), $(Co_xPt_{100-x})_{100-y}Cr_y$ (x being not less than 50 at. % and not more than 85 at. %, and y being not less than 0 at. % and not more than 40 at. %), FePt (the proportion of Pt being not less than 40 at. % and not more than 60 at. %), etc. In the case where such a material is used, by applying an external magnetic field that is larger than the coercivity of the bias layer 214, the direction of the magnetization of the bias layer 214 is set (fixed) in the direction in which the external magnetic field is applied. The thickness of the bias layer 214 (e.g., the length along the direction from the lower electrode 204 toward the upper electrode) is, for example, not less than 5 nm and not more than 50 nm.

In the case where the insulating layer 213 is disposed between the lower electrode 204 and the upper electrode 212, $SiO_x$ or $AlO_x$ is used as the material of the insulating layer 213. A not-illustrated foundation layer may be provided between the insulating layer 213 and the bias layer 214, Cr, Fe—Co, or the like is used as the material of the foundation layer for the bias layer 214 in the case where the bias layer 214 includes a hard magnetic material such as Co—Pt, Fe—Pt, Co—Pd, Fe—Pd, etc.

The bias layer 214 may have a structure of being stacked with a not-illustrated pinning layer for the bias layer. In such a case, the direction of the magnetization of the bias layer 214 can be set (fixed) by the exchange coupling of the bias layer 214 and the pinning layer for the bias layer. In such a case, the bias layer 214 includes a ferromagnetic material of at least one of Fe, Co, or Ni, or an alloy including at least one type of these elements. In such a case, the bias layer 214 includes, for example, a $Co_xF_{100-x}$ alloy (x being not less than 0 at. % and not more than 100 at. %), a $Ni_xFe_{100-x}$ alloy (x being not less than 0 at. % and not more than 100 at. %), or a material to which a nonmagnetic element is added to these alloys. A material similar to the first fixed magnetic layer 209 recited above is used as the bias layer 214. The pinning layer for the bias layer includes a material similar to the pinning layer 206 inside the sensing element 50A recited above. In the case where the pinning layer for the bias layer is provided, a foundation layer similar to the material included in the foundation layer 205 may be provided under the pinning layer for the bias layer. The pinning layer for the bias layer may be provided at a lower portion or an upper portion of the bias layer. In such a case, the magnetization direction of the bias layer 214 is determined by heat treatment in a magnetic field similarly to the pinning layer 206.

The bias layer 214 and the insulating layer 213 recited above are applicable to any sensing element according to the embodiment. By using the stacked structure of the bias layer 214 and the pinning layer for the bias layer, the orientation of the magnetization of the bias layer 214 can be maintained easily even when a large external magnetic field is applied to the bias layer 214 in a short period of time.

Figure 64:
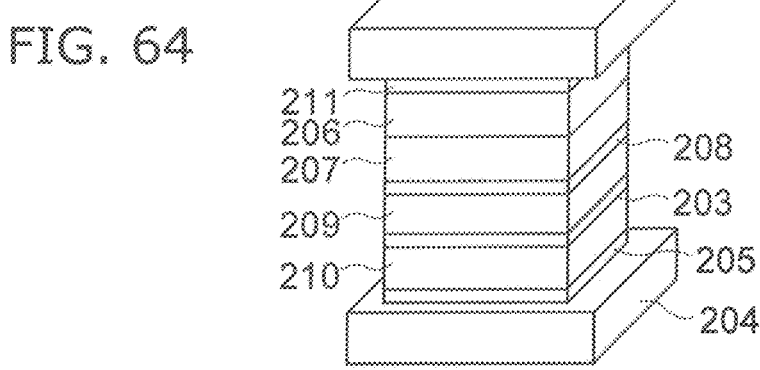
FIG. 64 is a schematic perspective view illustrating a portion of another pressure sensor according to the embodiment.

FIG. 64 is a schematic perspective view illustrating a portion of another pressure sensor according to the embodiment.

In a sensing element 50B as shown in FIG. 64, the lower electrode 204, the foundation layer 205, the free magnetic layer 210, the intermediate layer 203, the first fixed magnetic layer 209, the magnetic coupling layer 208, the second fixed magnetic layer 207, the pinning layer 206, the capping layer 211, and the upper electrode 212 are stacked in order. The sensing element 50B is, for example, a top spin-valve type.

The foundation layer 205 includes, for example, a stacked film of tantalum and copper (Ta/Cu). The thickness (the length in the Z-axis direction) of the Ta layer is, for example, 3 nm. The thickness of the Cu layer is, for example, 5 nm. The free magnetic layer 210 includes, for example, $Co_{40}Fe_{40}B_{20}$ having a thickness of 4 nm. The intermediate layer 203 includes, for example, a MgO layer having a thickness of 1.6 nm. The first fixed magnetic layer 209 includes, for example, $Co_{40}Fe_{40}B_{20}/Fe_{50}Co_{50}$. The thickness of the $Co_{40}Fe_{40}B_{20}$ layer is, for example, 2 nm. The thickness of the $Fe_{50}Co_{50}$ layer is, for example, 1 nm. The magnetic coupling layer 208 includes, for example, a Ru layer having a thickness of 0.9 nm. The second fixed magnetic layer 207 includes, for example, a $Co_{75}Fe_{25}$ layer having a thickness of 2.5 nm. The pinning layer 206 includes, for example, an IrMn layer having a thickness of 7 nm. The capping layer 211 includes, for example, Ta/Ru. The thickness of the Ta layer is, for example, 1 nm. The thickness of the Ru layer is, for example, 5 nm.

The materials of the layers included in the sensing element 50B may be vertically inverted materials of the layers included in the sensing element 50A. The diffusion suppression layer recited above may be provided between the foundation layer 205 and the free magnetic layer 210 of the sensing element 50B.

Figure 65:
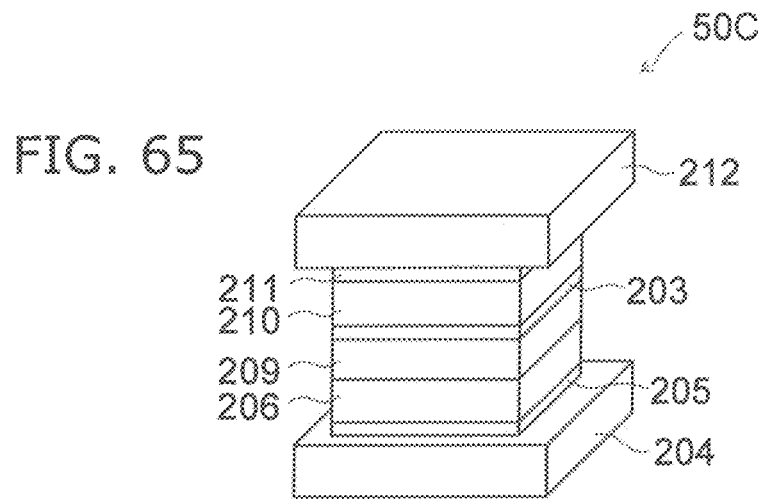
FIG. 65 is a schematic perspective view illustrating a portion of another pressure sensor according to the embodiment.

FIG. 65 is a schematic perspective view illustrating a portion of another pressure sensor according to the embodiment.

In a sensing element 50C as shown in FIG. 65, the lower electrode 204, the foundation layer 205, the pinning layer 206, the first fixed magnetic layer 209, the intermediate layer 203, the free magnetic layer 210, and the capping layer 211 are stacked in this order. For example, the sensing element 50C has a single pinned structure that uses a single fixed magnetic layer.

The foundation layer 205 includes, for example, Ta/Ru. The thickness (the length in the Z-axis direction) of the Ta layer is, for example, 3 nm. The thickness of the Ru layer is, for example, 2 nm. The pinning layer 206 includes, for example, an IrMn layer having a thickness of 7 nm. The first fixed magnetic layer 209 includes, for example, a $Co_{40}Fe_{40}B_{20}$ layer having a thickness of 3 nm. The intermediate layer 203 includes, for example, a MgO layer having a thickness of 1.6 nm. The free magnetic layer 210 includes, for example, $Co_{40}Fe_{40}B_{20}$ having a thickness of 4 nm. The capping layer 211 includes, for example, Ta/Ru. The thickness of the Ta layer is, for example, 1 nm. The thickness of the Ru layer is, for example, 5 nm.

For example, materials similar to the materials of the layers of the sensing element 50A are used as the materials of the layers of the sensing element 50C.

Figure 66:
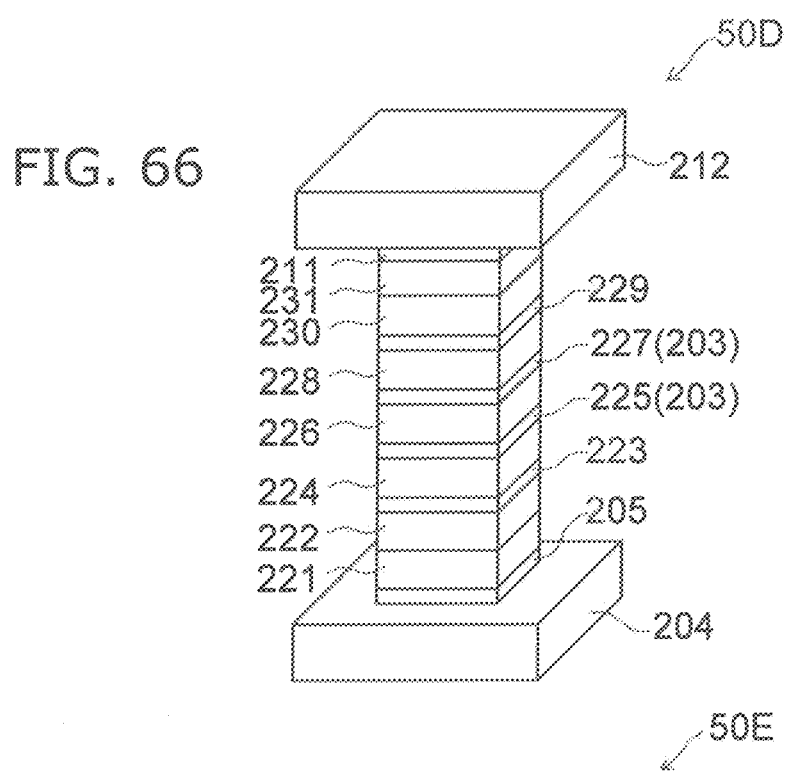
FIG. 66 is a schematic perspective view illustrating a portion of another pressure sensor according to the embodiment.

FIG. 66 is a schematic perspective view illustrating a portion of another pressure sensor according to the embodiment.

In a sensing element 50O as shown in FIG. 66, the lower electrode 204, the foundation layer 205, a lower pinning layer 221, a lower second fixed magnetic layer 222, a lower magnetic coupling layer 223, a lower first fixed magnetic layer 224, a lower intermediate layer 225, a free magnetic layer 226, an upper intermediate layer 227, an upper first fixed magnetic layer 228, an upper magnetic coupling layer 229, an upper second fixed magnetic layer 230, an upper pinning layer 231, and the capping layer 211 are stacked in order.

The foundation layer 205 includes, for example, Ta/Ru. The thickness (the length in the Z-axis direction) of the Ta layer is, for example, 3 nanometers (nm). The thickness of the Ru layer is, for example, 2 nm. The lower pinning layer 221 includes, for example, an IrMn layer having a thickness of 7 nm. The lower second fixed magnetic layer 222 includes, for example, a $Co_{75}Fe_{25}$ layer having a thickness of 2.5 nm. The lower magnetic coupling layer 223 includes, for example, a Ru layer having a thickness of 0.9 nm. The lower first fixed magnetic layer 224 includes, for example, a $Co_{40}Fe_{40}B_{20}$ layer having a thickness of 3 nm. The lower intermediate layer 225 includes, for example, a MgO layer having a thickness of 1.6 nm. The free magnetic layer 226 includes, for example, $Co_{40}Fe_{40}B_{20}$ having a thickness of 4 nm. The upper intermediate layer 227 includes, for example, a MgO layer having a thickness of 1.6 nm. The upper first fixed magnetic layer 228 includes, for example, $Co_{40}Fe_{40}B_{20}/Fe_{50}Co_{50}$. The thickness of the $Co_{40}Fe_{40}B_{20}$ layer is, for example, 2 nm. The thickness of the $Fe_{50}Co_{50}$ layer is, for example, 1 nm.

The upper magnetic coupling layer 229 includes, for example, a Ru layer having a thickness of 0.9 nm. The upper second fixed magnetic layer 230 includes, for example, a $Co_{75}Fe_{25}$ layer having a thickness of 2.5 nm. The upper pinning layer 231 includes, for example, an IrMn layer having a thickness of 7 nm. The capping layer 211 includes, for example, Ta/Ru. The thickness of the Ta layer is, for example, 1 nm. The thickness of the Ru layer is, for example, 5 nm.

For example, materials similar to the materials of the layers of the sensing element 50A are used as the materials of the layers of the sensing element 50D.

Figure 67:
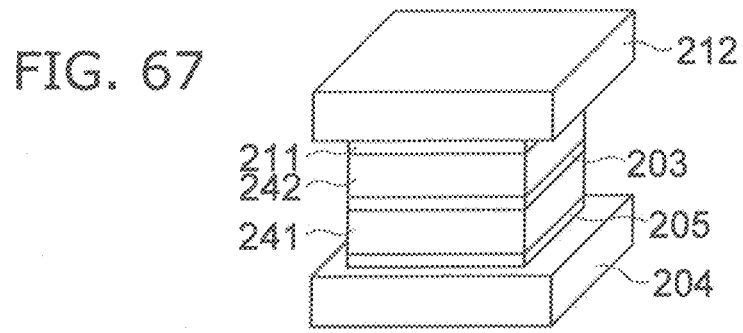
FIG. 67 is a schematic perspective view illustrating a portion of another pressure sensor according to the embodiment.

FIG. 67 is a schematic perspective view illustrating a portion of another pressure sensor according to the embodiment.

In a sensing element 50E as shown in FIG. 67, the lower electrode 204, the foundation layer 205, a first free magnetic layer 241, the intermediate layer 203, a second free magnetic layer 242, the capping layer 211, and the upper electrode 212 are stacked in this order.

The foundation layer 205 includes, for example, Ta/Cu. The thickness (the length in the Z-axis direction) of the Ta layer is, for example, 3 nm. The thickness of the Cu layer is, for example, 5 nm. The first free magnetic layer 241 includes, for example, $Co_{40}Fe_{40}B_{20}$ having a thickness of 4 nm. The intermediate layer 203 includes, for example, $Co_{40}Fe_{40}B_{20}$ having a thickness of 4 nm. The capping layer 211 includes, for example, Cu/Ta/Ru. The thickness of the Cu layer is, for example, 5 nm. The thickness of the Ta layer is, for example, 1 nm. The thickness of the Ru layer is, for example, 5 nm.

Materials similar to the materials of the layers of the sensing element 50A are used as the materials of the layers of the sensing element 50E. For example, materials similar to those of the free magnetic layer 210 of the sensing element 50A may be used as the materials of the first free magnetic layer 241 and the second free magnetic layer 242.

Figure 68:
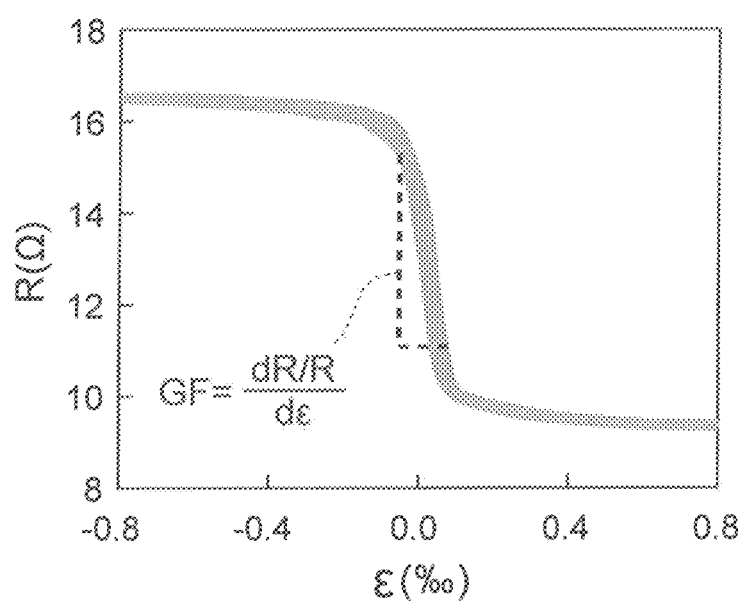
FIG. 68 is a graph illustrating characteristics of the sensor.

FIG. 68 is a graph illustrating characteristics of the sensor.

FIG. 68 illustrates the electrical resistance of the magnetic element. The magnetic element has the following structure: Cu (1 nm)/Ta (2 nm)/Ru (20 nm)/Mg—O (1.52 nm)/$Co_{40}Fe_{40}B_{20}$ (0.5 nm)/$Fe_{80}B_2$ (8 nm)/Mg—O (1.62 nm)/$Co_{40}Fe_{40}B_{20}$ (3 nm)/Ru (0.9 nm)/$Co_{75}Fe_{25}$ (2.5 nm)/$Ir_{22}Mn_{78}$ (7 nm)/Ta (1 nm)/Ru (2 nm).

The horizontal axis of FIG. 63 is a strain ε. The vertical axis is an electrical resistance R. The electrical resistance R changes according to the change of the strain ε.

A gauge factor GF which is a performance indicator of the strain sensing element is represented by GF=(dR/R)/dε. In FIG. 68, the gauge factor GF is calculated to be 5000. A high gauge factor is obtained by using the magnetic element as the strain sensing element.

According to the embodiments, a sensor and a sensor package can be provided in which the sensitivity can be increased.

The embodiments include, for example, the following configurations.

(Configuration 1)

A sensor, comprising:

a first support portion;

a first movable portion extending in a first extension direction and being connected to the first support portion;

a first piezoelectric element fixed to the first movable portion, the first piezoelectric element including a first electrode, a second electrode provided between the first electrode and the first movable portion, and a first piezoelectric layer provided between the first electrode and the second electrode; and a first magnetic element fixed to the first movable portion, the first magnetic element including a first magnetic layer, a second magnetic layer, and a first intermediate layer provided between the first magnetic layer and the second magnetic layer, a direction connecting the first magnetic element and the first piezoelectric element being aligned with a first crossing direction crossing the first extension direction.

(Configuration 2)

The sensor according to configuration 1, further comprising a second piezoelectric element separated from the first piezoelectric element in the first crossing direction and being fixed to the first movable portion, the second piezoelectric element including:

a third electrode;

a fourth electrode provided between the third electrode and the first movable portion; and a second piezoelectric layer provided between the third electrode and the fourth electrode, the first magnetic element being positioned between the first piezoelectric element and the second piezoelectric element in the first crossing direction.

(Configuration 3)

The sensor according to configuration 2, wherein a length in the first extension direction of the first piezoelectric element is longer than a length in the first extension direction of the first magnetic element, and a length in the first extension direction of the second piezoelectric element is longer than the length in the first extension direction of the first magnetic element.

(Configuration 4)

The sensor according to configuration 2 or 3, wherein the first magnetic element is multiply provided, and at least a portion of the plurality of first magnetic elements is connected in series.

(Configuration 5)

The sensor according to configuration 4, wherein the plurality of first magnetic elements are arranged along the first extension direction.

(Configuration 6)

The sensor according to one of configurations 2 to 5, further comprising:

a second movable portion extending in the first extension direction and being connected to the first support portion;

a third piezoelectric element fixed to the second movable portion, the third piezoelectric element including a fifth electrode, a sixth electrode provided between the fifth electrode and the second movable portion, and a third piezoelectric layer provided between the fifth electrode and the sixth electrode;

a fourth piezoelectric element fixed to the second movable portion and separated from the third piezoelectric element in the first crossing direction, the fourth piezoelectric element including a seventh electrode, an eighth electrode provided between the seventh electrode and the second movable portion, and a fourth piezoelectric layer provided between the seventh electrode and the eighth electrode; and a second magnetic element fixed to the second movable portion and provided between the third piezoelectric element and the fourth piezoelectric element in the first crossing direction, the second magnetic element including a third magnetic layer, a fourth magnetic layer, and a second intermediate layer provided between the third magnetic layer and the fourth magnetic layer.

(Configuration 7)

The sensor according to configuration 6, wherein a length in the first extension direction of the third piezoelectric element is longer than a length in the first extension direction of the second magnetic element, and a length in the first extension direction of fourth second piezoelectric element is longer than the length in the first extension direction of the second magnetic element.

(Configuration 8)

The sensor according to configuration 6 or 7, wherein the second magnetic element is multiply provided, and at least two of the plurality of second magnetic elements is connected in series.

(Configuration 9)

The sensor according to configuration 6 or 7, further comprising a controller electrically connected to the first to eighth electrodes, the controller performing an operation of setting a polarity of a first potential of the first electrode referenced to a second potential of the second electrode to be the reverse of a polarity of a third potential of the third electrode referenced to a fourth potential of the fourth electrode, (Configuration 10)

The sensor according to one of configurations 2 to 9, further comprising:

a second support portion;

a third movable portion extending in a second extension direction and being connected to the second support portion, the second extension direction crossing the first extension direction;

a fifth piezoelectric element fixed to the third movable portion, the fifth piezoelectric element including a ninth electrode, a tenth electrode provided between the ninth electrode and the third movable portion, and a fifth piezoelectric layer provided between the ninth electrode and the tenth electrode;

a sixth piezoelectric element fixed to the third movable portion and separated from the fifth piezoelectric element in a second crossing direction crossing the second extension direction, the sixth piezoelectric element including an eleventh electrode, a twelfth electrode provided between the eleventh electrode and the third movable portion, and a sixth piezoelectric layer provided between the eleventh electrode and the twelfth electrode;

a third magnetic element fixed to the third movable portion and provided between the fifth piezoelectric element and the sixth piezoelectric element in the second crossing direction, the third magnetic element including a fifth magnetic layer, a sixth magnetic layer, and a third intermediate layer provided between the fifth magnetic layer and the sixth magnetic layer;

a fourth movable portion extending in the second extension direction and being connected to the second support portion;

a seventh piezoelectric element fixed to the fourth movable portion, the seventh piezoelectric element including a thirteenth electrode, a fourteenth electrode provided between the thirteenth electrode and the fourth movable portion, and a seventh piezoelectric layer provided between the thirteenth electrode and the fourteenth electrode;

an eighth piezoelectric element fixed to the fourth movable portion and separated from the seventh piezoelectric element in the second crossing direction, the eighth piezoelectric element including a fifteenth electrode, a sixteenth electrode provided between the fifteenth electrode and the fourth movable portion, and an eighth piezoelectric layer provided between the fifteenth electrode and the sixteenth electrode; and a fourth magnetic element fixed to the fourth movable portion and provided between the seventh piezoelectric element and the eighth piezoelectric element in the second crossing direction, the fourth magnetic element including a seventh magnetic layer, an eighth magnetic layer, and a fourth intermediate layer provided between the seventh magnetic layer and the eighth magnetic layer.

(Configuration 11)

The sensor according to one of configurations 2 to 10, further comprising:

a third support portion;

a fifth movable portion connected to the third support portion, the fifth movable portion including a first extension portion and a first connection portion, the first extension portion extending in a third extension direction, the first connection portion extending in a fourth extension direction and being connected to the first extension portion, the fourth extension direction crossing the third extension direction;

a ninth piezoelectric element fixed to the first extension portion, the ninth piezoelectric element including a seventeenth electrode, an eighteenth electrode provided between the seventeenth electrode and the first extension portion, and a ninth piezoelectric layer provided between the seventeenth electrode and the eighteenth electrode;

a tenth piezoelectric element fixed to the first extension portion and separated from the ninth piezoelectric element in a third crossing direction crossing the third extension direction, the tenth piezoelectric element including a nineteenth electrode, a twentieth electrode provided between the nineteenth electrode and the first extension portion, and a tenth piezoelectric layer provided between the nineteenth electrode and the twentieth electrode;

a fifth magnetic element fixed to the first connection portion, the fifth magnetic element including a ninth magnetic layer, a tenth magnetic layer, and a fifth intermediate layer provided between the ninth magnetic layer and the tenth magnetic layer;

a sixth movable portion connected to the third support portion, the sixth movable portion including a second extension portion and a second connection portion, the second extension portion extending in the third extension direction, the second connection portion extending in the fourth extension direction and being connected to the second extension portion;

an eleventh piezoelectric element fixed to the second extension portion, the eleventh piezoelectric element including a twenty-first electrode, a twenty-second electrode provided between the twenty-first electrode and the second extension portion, and an eleventh piezoelectric layer provided between the twenty-first electrode and the twenty-second electrode;

a twelfth piezoelectric element fixed to the second extension portion and separated from the eleventh piezoelectric element in the third crossing direction, the twelfth piezoelectric element including a twenty-third electrode, a twenty-fourth electrode provided between the twenty-third electrode and the second extension portion, and a twelfth piezoelectric layer provided between the twenty-third electrode and the twenty-fourth electrode; and a sixth magnetic element fixed to the second connection portion, the sixth magnetic element including an eleventh magnetic layer, a twelfth magnetic layer, and a sixth intermediate layer provided between the eleventh magnetic layer and the twelfth magnetic layer.

(Configuration 12)

The sensor according to configurations 2 to 10, further comprising:

a third support portion;

a fifth movable portion extending in a third extension direction;

a fifth movable connection portion extending along a third crossing direction and connecting the fifth movable portion and the third support portion, the third crossing direction crossing the third extension direction;

a ninth piezoelectric element fixed to the fifth movable portion, the ninth piezoelectric element including a seventeenth electrode, an eighteenth electrode provided between the seventeenth electrode and the fifth movable portion, and a ninth piezoelectric layer provided between the seventeenth electrode and the eighteenth electrode;

a tenth piezoelectric element fixed to the fifth movable portion and separated from the ninth piezoelectric element in the third crossing direction, the tenth piezoelectric element including a nineteenth electrode, a twentieth electrode provided between the nineteenth electrode and the fifth movable portion, and a tenth piezoelectric layer provided between the nineteenth electrode and the twentieth electrode;

a sixth movable portion extending in the third extension direction;

a sixth movable connection portion extending along the third crossing direction and connecting the sixth movable portion and the third support portion, at least a portion of the third support portion being positioned between the fifth movable connection portion and the sixth movable connection portion in the third crossing direction;

an eleventh piezoelectric element fixed to the sixth movable portion, the eleventh piezoelectric element including a twenty-first electrode, a twenty-second electrode provided between the twenty-first electrode and the sixth movable portion, and an eleventh piezoelectric layer provided between the twenty-first electrode and the twenty-second electrode;

a twelfth piezoelectric element fixed to the sixth movable portion and separated from the eleventh piezoelectric element in the third crossing direction, the twelfth piezoelectric element including a twenty-third electrode, a twenty-fourth electrode provided between the twenty-third electrode and the sixth movable portion, and a twelfth piezoelectric layer provided between the twenty-third electrode and the twenty-fourth electrode;

a seventh movable portion extending in the third extension direction and being connected to the third support portion, a position of the seventh movable portion in the third crossing direction being between a position of the fifth movable portion in the third crossing direction and a position of the sixth movable portion in the third crossing direction, the seventh movable portion including a first movable region and a second movable region, the second movable region being between the first movable region and the sixth movable portion;

a fifth magnetic element fixed to the first movable region, the fifth magnetic element including a ninth magnetic layer, a tenth magnetic layer, and a fifth intermediate layer provided between the ninth magnetic layer and the tenth magnetic layer; and a sixth magnetic element fixed to the second movable region, the sixth magnetic element including an eleventh magnetic layer, a twelfth magnetic layer, and a sixth intermediate layer provided between the eleventh magnetic layer and the twelfth magnetic layer.

(Configuration 13)

The sensor according to one of configurations 2 to 12, wherein at least one of first magnetization of the first magnetic layer or second magnetization of the second magnetic layer is tilted with respect to the first extension direction.

(Configuration 14)

The sensor according to one of configurations 2 to 13, further comprising: a first magnetic portion fixed to the first movable portion, magnetization of the first magnetic portion being tilted with respect to the first extension direction.

(Configuration 15)

A sensor, comprising:

a first support portion;

a first intermediate body;

a first connecting body connected to the first support portion and the first intermediate body between the first support portion and the first intermediate body;

a first support portion-side electrode connected to the first support portion;

a first counter electrode opposing the first support portion-side electrode and being connected to the first intermediate body;

a first film connected to the first intermediate body, the first film being deformable;

a first magnetic element fixed to the first film, the first magnetic element including a first magnetic layer, a second magnetic layer, and a first intermediate layer provided between the first magnetic layer and the second magnetic layer.

(Configuration 16)

The sensor according to configuration 15, wherein the first support portion includes a first support portion connection region connected to the first connecting body, the first intermediate body includes a first intermediate body connection region connected to the first connecting body, a direction connecting the first support portion connection region and the first intermediate body connection region is aligned with a first direction, a length of the first connecting body in a second direction is shorter than a length of the first connecting body in a third direction, the third direction is aligned with a direction connecting the first magnetic layer and the second magnetic layer, and the second direction crosses the first direction and the third direction.

(Configuration 17)

The sensor according to configuration 15, wherein
the first support portion includes a first support portion connection region connected to the first connecting body,
the first intermediate body includes a first intermediate body connection region connected to the first connecting body,
a direction connecting the first support portion connection region and the first intermediate body connection region is aligned with a first direction,
a length of the first film in a second direction is longer than a length of the first film in a third direction,
the third direction is aligned with a direction connecting the first magnetic layer and the second magnetic layer, and
the second direction crosses the first direction and the third direction.

(Configuration 18)

The sensor according to configuration 15, wherein
a length of the first film in a second direction is longer than a length of the first film in a third direction,
the third direction is aligned with a direction connecting the first magnetic layer and the second magnetic layer, and
the second direction crosses the first direction and the third direction.

(Configuration 19)

The sensor according to configuration 15, further comprising a first weight portion connected to the first film,
the first film being provided between the first weight portion and the first intermediate body,
the first support portion including a first support portion connection region connected to the first connecting body,
the first intermediate body including a first intermediate body connection region connected to the first connecting body,
a direction connecting the first support portion connection region and the first intermediate body connection region being aligned with a first direction,
the first weight portion having at least one of a length along a third direction or a length along a second direction, the length along the third direction being longer than a length along the third direction of the first film, the length along the second direction being longer than a length along the second direction of the first film,
the third direction being aligned with a direction connecting the first magnetic layer and the second magnetic layer,
the second direction crossing the first direction and the third direction.

(Configuration 20)

The sensor according to one of configurations 15 to 19, further comprising:
a second support portion;
a second intermediate body;
a second connecting body connected to the second support portion and the second intermediate body between the second support portion and the second intermediate body;
a second support portion-side electrode connected to the second support portion;
a second counter electrode opposing the second support portion-side electrode and being connected to the second intermediate body;
a second film connected to the second intermediate body, the second film being deformable;
a second magnetic element fixed to the second film, the second magnetic element including a third magnetic layer, a fourth magnetic layer, and a second intermediate layer provided between the third magnetic layer and the fourth magnetic layer; and
a controller electrically connected to the first support portion-side electrode, the first counter electrode, the second support portion-side electrode, and the second counter electrode,
a direction connecting the second support portion and the second intermediate body being aligned with a direction connecting the first support portion and the first intermediate body,
a direction from the first support portion-side electrode toward the first counter electrode being the reverse of a direction from the second support portion-side electrode toward the second counter electrode, the controller performing an operation of setting a polarity of a potential of the first counter electrode referenced to a potential of the first support portion-side electrode to be the same as a polarity of a potential of the second counter electrode referenced to a potential of the second support portion-side electrode.

(Configuration 21)

The sensor according to one of configurations 15 to 19, further comprising:
a second support portion;
a second intermediate body;
a second connecting body connected to the second support portion and the second intermediate body between the second support portion and the second intermediate body;
a second support portion-side electrode connected to the second support portion;
a second counter electrode opposing the second support portion-side electrode and being connected to the second intermediate body;
a second film connected to the second intermediate body, the second film being deformable;
a second magnetic element fixed to the second film, the second magnetic element including a third magnetic layer, a fourth magnetic layer, and a second intermediate layer provided between the third magnetic layer and the fourth magnetic layer; and
a controller electrically connected to the first support portion-side electrode, the first counter electrode, the second support portion-side electrode, and the second counter electrode,
a direction connecting the second support portion and the second intermediate body being aligned with a direction connecting the first support portion and the first intermediate body,
a direction from the first support portion-side electrode toward the first counter electrode being the same as a direction from the second support portion-side electrode toward the second counter electrode, the controller performing an operation of setting a polarity of a potential of the first counter electrode referenced to a potential of the first support portion-side electrode to be the reverse of a polarity of a potential of the second counter electrode referenced to a potential of the second support portion-side electrode.

(Configuration 22)

The sensor according to one of configurations 15 to 21, wherein at least one of first magnetization of the first magnetic layer or second magnetization of the second magnetic layer is tilted with respect to a direction connecting the first support portion and the first intermediate body.

(Configuration 23)

A sensor package, comprising:
the sensor according to one of configurations 1 to 22; and
a housing.

(Configuration 24)

An angular velocity sensor, comprising:
a first support portion;
a first movable portion extending in a first extension direction and being connected to the first support portion;
a first piezoelectric element fixed to the first movable portion, the first piezoelectric element being configured to vibrate the first movable portion; and
a first magnetic element fixed to the first movable portion, the first magnetic element including a first magnetic layer, a second magnetic layer, and a first intermediate layer provided between the first magnetic layer and the second magnetic layer, a value corresponding to an electric resistance between the first magnetic layer and the second magnetic layer being configured to change in accordance with an angular velocity applied to the first movable portion.

(Configuration 25)

The sensor according to configurations 24, further comprising:
a second movable portion extending in the first extension direction and being connected to the first support portion;
a second piezoelectric element fixed to the second movable portion, the second piezoelectric element being configured to vibrate the second movable portion; and
a second magnetic element fixed to the second movable portion, the second magnetic element including a third magnetic layer, a fourth magnetic layer, and a second intermediate layer provided between the third magnetic layer and the fourth magnetic layer, a value corresponding to an electric resistance between the third magnetic layer and the fourth magnetic layer being configured to change in accordance with an angular velocity applied to the second movable portion.

(Configuration 26)

An angular velocity sensor; comprising:
a first support portion;
a first intermediate body;
a first connecting body connected to the first support portion and the first intermediate body between the first support portion and the first intermediate body;
a first support portion-side electrode connected to the first support portion;
a first counter electrode opposing the first support portion-side electrode and being connected to the first intermediate body;
a first film connected to the first intermediate body, the first film being configured to vibrate in accordance with a signal supplied between the to the first support portion-side electrode and first counter electrode; and
a first magnetic element fixed to the first film, the first magnetic element including a first magnetic layer, a second magnetic layer, and a first intermediate layer provided between the first magnetic layer and the second magnetic layer, a value corresponding to an electric resistance between the first magnetic layer and the second magnetic layer being configured to change in accordance with an angular velocity applied to the first film.

(Configuration 27)

A sensor package, comprising:
the angular velocity sensor according to one of configurations 24 to 26; and
a housing.

The "sensor" may be a "sensor device", for example. A configuration including the "sensor device" and the controller can be regarded as "sensor". The "sensor" may include at least one of substrate and cover.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as support portions, movable portions, piezoelectric elements, magnetic elements, controllers, etc., from known art. Such practice is included in the scope of the invention to the extent that similar effects thereto are obtained.

Further; any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention, While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
   a first support portion;
   a first movable portion extending in a first extension direction and being connected to the first support portion;
   a first piezoelectric element fixed to the first movable portion, the first piezoelectric element including a first electrode, a second electrode provided between the first electrode and the first movable portion, and a first piezoelectric layer provided between the first electrode and the second electrode; and
   a first magnetic element fixed to the first movable portion, the first magnetic element including a first magnetic layer, a second magnetic layer, and a first intermediate layer provided between the first magnetic layer and the second magnetic layer,
   wherein a length in the first extension direction of the first piezoelectric element is longer than a length in the first extension direction of the first magnetic element.

2. The sensor according to claim 1, further comprising a second piezoelectric element,
   a direction connecting the first magnetic element and the first piezoelectric element being aligned with a first crossing direction crossing the first extension direction, the second piezoelectric element being fixed to the first movable portion and separated from the first piezoelectric element in the first crossing direction, the second piezoelectric element including:
- a third electrode;
- a fourth electrode provided between the third electrode and the first movable portion; and
- a second piezoelectric layer provided between the third electrode and the fourth electrode, the first magnetic element being positioned between the first piezoelectric element and the second piezoelectric element in the first crossing direction.

3. The sensor according to claim 2, wherein a length in the first extension direction of the second piezoelectric element is longer than the length in the first extension direction of the first magnetic element.

4. The sensor according to claim 2, wherein the first magnetic element is multiply provided, and at least a portion of the plurality of first magnetic elements is connected in series.

5. The sensor according to claim 4, wherein the plurality of first magnetic elements are arranged along the first extension direction.

6. The sensor according to claim 2, further comprising:
a second movable portion extending in the first extension direction and being connected to the first support portion;
a third piezoelectric element fixed to the second movable portion, the third piezoelectric element including a fifth electrode, a sixth electrode provided between the fifth electrode and the second movable portion, and a third piezoelectric layer provided between the fifth electrode and the sixth electrode;
a fourth piezoelectric element fixed to the second movable portion and separated from the third piezoelectric element in the first crossing direction, the fourth piezoelectric element including a seventh electrode, an eighth electrode provided between the seventh electrode and the second movable portion, and a fourth piezoelectric layer provided between the seventh electrode and the eighth electrode; and
a second magnetic element fixed to the second movable portion and provided between the third piezoelectric element and the fourth piezoelectric element in the first crossing direction, the second magnetic element including a third magnetic layer, a fourth magnetic layer, and a second intermediate layer provided between the third magnetic layer and the fourth magnetic layer.

7. The sensor according to claim 6, further comprising a controller electrically connected to the first to eighth electrodes, the controller performing an operation of setting a polarity of a first potential of the first electrode referenced to a second potential of the second electrode to be the reverse of a polarity of a third potential of the third electrode referenced to a fourth potential of the fourth electrode.

8. The sensor according to claim 2, further comprising:
a second support portion;
a third movable portion extending in a second extension direction and being connected to the second support portion, the second extension direction crossing the first extension direction;
a fifth piezoelectric element fixed to the third movable portion, the fifth piezoelectric element including a ninth electrode, a tenth electrode provided between the ninth electrode and the third movable portion, and a fifth piezoelectric layer provided between the ninth electrode and the tenth electrode;
a sixth piezoelectric element fixed to the third movable portion and separated from the fifth piezoelectric element in a second crossing direction crossing the second extension direction, the sixth piezoelectric element including an eleventh electrode, a twelfth electrode provided between the eleventh electrode and the third movable portion, and a sixth piezoelectric layer provided between the eleventh electrode and the twelfth electrode;
a third magnetic element fixed to the third movable portion and provided between the fifth piezoelectric element and the sixth piezoelectric element in the second crossing direction, the third magnetic element including a fifth magnetic layer, a sixth magnetic layer, and a third intermediate layer provided between the fifth magnetic layer and the sixth magnetic layer;
a fourth movable portion extending in the second extension direction and being connected to the second support portion;
a seventh piezoelectric element fixed to the fourth movable portion, the seventh piezoelectric element including a thirteenth electrode, a fourteenth electrode provided between the thirteenth electrode and the fourth movable portion, and a seventh piezoelectric layer provided between the thirteenth electrode and the fourteenth electrode;
an eighth piezoelectric element fixed to the fourth movable portion and separated from the seventh piezoelectric element in the second crossing direction, the eighth piezoelectric element including a fifteenth electrode, a sixteenth electrode provided between the fifteenth electrode and the fourth movable portion, and an eighth piezoelectric layer provided between the fifteenth electrode and the sixteenth electrode; and
a fourth magnetic element fixed to the fourth movable portion and provided between the seventh piezoelectric element and the eighth piezoelectric element in the second crossing direction, the fourth magnetic element including a seventh magnetic layer, an eighth magnetic layer, and a fourth intermediate layer provided between the seventh magnetic layer and the eighth magnetic layer.

9. The sensor according to claim 2, further comprising:
a third support portion;
a fifth movable portion connected to the third support portion, the fifth movable portion including a first extension portion and a first connection portion, the first extension portion extending in a third extension direction, the first connection portion extending in a fourth extension direction and being connected to the first extension portion, the fourth extension direction crossing the third extension direction;
a ninth piezoelectric element fixed to the first extension portion, the ninth piezoelectric element including a seventeenth electrode, an eighteenth electrode provided between the seventeenth electrode and the first extension portion, and a ninth piezoelectric layer provided between the seventeenth electrode and the eighteenth electrode;
a tenth piezoelectric element fixed to the first extension portion and separated from the ninth piezoelectric element in a third crossing direction crossing the third extension direction, the tenth piezoelectric element including a nineteenth electrode, a twentieth electrode provided between the nineteenth electrode and the first extension portion, and a tenth piezoelectric layer provided between the nineteenth electrode and the twentieth electrode;
a fifth magnetic element fixed to the first connection portion, the fifth magnetic element including a ninth magnetic layer, a tenth magnetic layer, and a fifth intermediate layer provided between the ninth magnetic layer and the tenth magnetic layer;
a sixth movable portion connected to the third support portion, the sixth movable portion including a second extension portion and a second connection portion, the second extension portion extending in the third extension direction, the second connection portion extending in the fourth extension direction and being connected to the second extension portion;
an eleventh piezoelectric element fixed to the second extension portion, the eleventh piezoelectric element including a twenty-first electrode, a twenty-second electrode provided between the twenty-first electrode and the second extension portion, and an eleventh piezoelectric layer provided between the twenty-first electrode and the twenty-second electrode;
a twelfth piezoelectric element fixed to the second extension portion and separated from the eleventh piezoelectric element in the third crossing direction, the twelfth piezoelectric element including a twenty-third electrode, a twenty-fourth electrode provided between the twenty-third electrode and the second extension portion, and a twelfth piezoelectric layer provided between the twenty-third electrode and the twenty-fourth electrode; and
a sixth magnetic element fixed to the second connection portion, the sixth magnetic element including an eleventh magnetic layer, a twelfth magnetic layer, and a sixth intermediate layer provided between the eleventh magnetic layer and the twelfth magnetic layer.

10. The sensor according to claim 2, further comprising:
a third support portion;
a fifth movable portion extending in a third extension direction;
a fifth movable connection portion extending along a third crossing direction and connecting the fifth movable portion to the third support portion, the third crossing direction crossing the third extension direction;
a ninth piezoelectric element fixed to the fifth movable portion, the ninth piezoelectric element including a seventeenth electrode, an eighteenth electrode provided between the seventeenth electrode and the fifth movable portion, and a ninth piezoelectric layer provided between the seventeenth electrode and the eighteenth electrode;
a tenth piezoelectric element fixed to the fifth movable portion and separated from the ninth piezoelectric element in the third crossing direction, the tenth piezoelectric element including a nineteenth electrode, a twentieth electrode provided between the nineteenth electrode and the fifth movable portion, and a tenth piezoelectric layer provided between the nineteenth electrode and the twentieth electrode;
a sixth movable portion extending in the third extension direction;
a sixth movable connection portion extending along the third crossing direction and connecting the sixth movable portion to the third support portion, at least a portion of the third support portion being positioned between the fifth movable connection portion and the sixth movable connection portion in the third crossing direction;
an eleventh piezoelectric element fixed to the sixth movable portion, the eleventh piezoelectric element including a twenty-first electrode, a twenty-second electrode provided between the twenty-first electrode and the sixth movable portion, and an eleventh piezoelectric layer provided between the twenty-first electrode and the twenty-second electrode;
a twelfth piezoelectric element fixed to the sixth movable portion and separated from the eleventh piezoelectric element in the third crossing direction, the twelfth piezoelectric element including a twenty-third electrode, a twenty-fourth electrode provided between the twenty-third electrode and the sixth movable portion, and a twelfth piezoelectric layer provided between the twenty-third electrode and the twenty-fourth electrode;
a seventh movable portion extending in the third extension direction and being connected to the third support portion, a position of the seventh movable portion in the third crossing direction being between a position of the fifth movable portion in the third crossing direction and a position of the sixth movable portion in the third crossing direction, the seventh movable portion including a first movable region and a second movable region, the second movable region being between the first movable region and the sixth movable portion;
a fifth magnetic element fixed to the first movable region, the fifth magnetic element including a ninth magnetic layer, a tenth magnetic layer, and a fifth intermediate layer provided between the ninth magnetic layer and the tenth magnetic layer; and
a sixth magnetic element fixed to the second movable region, the sixth magnetic element including an eleventh magnetic layer, a twelfth magnetic layer, and a sixth intermediate layer provided between the eleventh magnetic layer and the twelfth magnetic layer.

11. A sensor package, comprising:
a sensor; and
a housing,
the sensor including:
 a first support portion;
 a first movable portion extending in a first extension direction and being connected to the first support portion;
 a first piezoelectric element fixed to the first movable portion, the first piezoelectric element including a first electrode, a second electrode provided between the first electrode and the first movable portion, and a first piezoelectric layer provided between the first electrode and the second electrode; and
 a first magnetic element fixed to the first movable portion, the first magnetic element including a first magnetic layer, a second magnetic layer, and a first intermediate layer provided between the first magnetic layer and the second magnetic layer,
wherein a length in the first extension direction of the first piezoelectric element is longer than a length in the first extension direction of the first magnetic element.

* * * * *